(12) United States Patent
Masui et al.

(10) Patent No.: US 7,200,091 B2
(45) Date of Patent: Apr. 3, 2007

(54) LIGHT SOURCE DRIVING UNIT AND OPTICAL STORAGE APPARATUS

(75) Inventors: Naruhiro Masui, Kanagawa (JP);
Hidetoshi Ema, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 810 days.

(21) Appl. No.: 10/274,193

(22) Filed: Oct. 21, 2002

(65) Prior Publication Data
US 2003/0112732 A1    Jun. 19, 2003

(30) Foreign Application Priority Data

| Oct. 22, 2001 | (JP) | ............................. 2001-323544 |
| Oct. 22, 2001 | (JP) | ............................. 2001-323582 |
| Oct. 31, 2001 | (JP) | ............................. 2001-334257 |
| Oct. 31, 2001 | (JP) | ............................. 2001-334282 |
| Oct. 31, 2001 | (JP) | ............................. 2001-334303 |
| Apr. 26, 2002 | (JP) | ............................. 2002-126941 |

(51) Int. Cl.
*G11B 20/10* (2006.01)

(52) U.S. Cl. ................................ 369/59.11; 369/53.26
(58) Field of Classification Search ..................... None
See application file for complete search history.

(56) References Cited

U.S. PATENT DOCUMENTS 5,438,581 A    8/1995   Reele 5,818,808 A    10/1998  Takada
5,828,808 A    10/1998  Kang
6,222,814 B1   4/2001   Ichimura
2001/0017833 A1  8/2001  Yamada et al.
2002/0080702 A1  6/2002  Asada et al.

FOREIGN PATENT DOCUMENTS

| EP | 0 957 475 A1 | 11/1999 |
| JP | 3-283021 | 12/1991 |
| JP | 9-7176 | 1/1997 |
| JP | 11-213429 | 8/1999 |
| JP | 11-283249 | 10/1999 |
| JP | 2000/276736 | 10/2000 |
| JP | 2001-222819 | 8/2001 |

*Primary Examiner*—Paul Huber
(74) *Attorney, Agent, or Firm*—Dickstein Shapiro LLP

(57) ABSTRACT

A light source driving unit includes a modulating signal generating section generating modulating signals based on driving waveform generating information of a light source, a current source selecting section selecting one or more currents output from current sources based on the modulating signals, a light source driving section generating a current having multi-levels based on the one or more currents selected and supplying the generated current to the light source to drive the light source so that light in multi-levels is generated from the light source, and a cancelling section adding a signal error amount which cancels differences in amounts of signal delays generated between the modulating signal generating section and the light source driving section at a stage prior to the current source selecting section.

6 Claims, 53 Drawing Sheets

State Machine

FIG.44

| | | | | |
|---|---|---|---|---|
| TSS: | (3/4/5/6+ Space) | | (3/4/5/[6,8,10,14]/[7,9,11] Mark) | 20 |
| TSP: | (3/4/5/6+ Space) | | (3/4/5/[6,8,10,14]/[7,9,11] Mark) | 20 |
| TSMS: | | | | 1 |
| TSMP: | | | | 1 |
| TMS: | | | (3/4/5/[6,8,10,14]/[7,9,11] Mark) | 5 |
| TMP: | | | (3/4/5/[6,8,10,14]/[7,9,11] Mark) | 5 |
| NMP: | | | (3/4/5/6/7/8/9/10/11/14 Mark) | 10 |
| TLMP: | (3/4/5/[6,8,10,14]/[7,9,11] Mark) | | (3/4/5/6 + Space) | 20 |
| TEMP: | (3/4/5/[6,8,10,14]/[7,9,11] Mark) | | (3/4/5/6 + Space) | 20 |
| TES: | (3/4/5/[6,8,10,14]/[7,9,11] Mark) | | (3/4/5/6 + Space) | 20 |
| TEP: | (3/4/5/[5,7,9,11]/[6,8,10,14] Mark) | | (3/4 + Space) | 8 |
| PSP: | (3/4/5/6+ Space) | | (3/4/5/[6,8,10,14]/[7,9,11] Mark) | 20 |
| PEP: | (3/4/5/[5,7,9,11]/[6,8,10,14] Mark) | | (3/4+ Space) | 8 |

Seq. 1

Seq.2

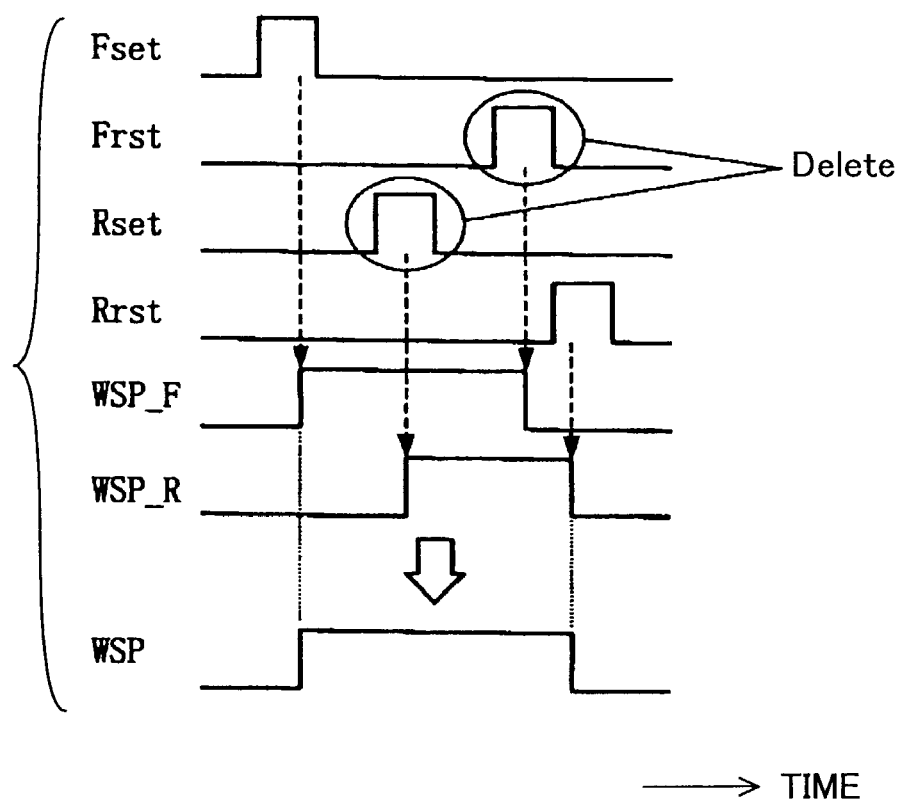

LIGHT SOURCE DRIVING UNIT AND OPTICAL STORAGE APPARATUS

BACKGROUND OF THE INVENTION

This application claims the benefit of Japanese Patent Applications No. 2001-323544 filed Oct. 22, 2001, No. 2001-323582 filed Oct. 22, 2001, No. 2001-334257 filed Oct. 31, 2001, No. 2001-334282 filed Oct. 31, 2001, No. 2001-334303 filed Oct. 31, 2001, and No. 2002-126941 filed Apr. 26, 2002, in the Japanese Patent Office, the disclosures of which are hereby incorporated by reference.

1. Field of the Invention

The present invention generally relates to light source driving units and optical storage apparatuses, and more particularly to a light source driving unit, such as a laser driving (or controlling) unit, which drives (or controls) a light source by a light modulating waveform having multi-values or multi-levels, and to an optical storage apparatus which uses such a light source driving unit.

The light source driving unit according to the present invention may be used in image forming apparatuses and information recording and/or reproducing apparatuses. The optical storage apparatus according to the present invention includes information recording and/or reproducing apparatuses such as MD drives, MO drives, CD-R drives, CD-RW drives, DVD-R drives, DVD-RW drives, DVD+RW drives and DVD-RAM drives.

2. Description of the Related Art

In an optical disk drive which carries out a recording by modulating light, techniques for controlling a light modulating waveform which drives a light source to have multi-values or multi-levels are essential, in order to realize a 1-beam overwrite or to control a shape of a recording mark for increasing the recording density on an optical disk. Hence, in a light source driving unit (hereinafter also referred to as a laser diode driver or simply LD driver), it is necessary to switch a plurality of laser diode driving currents, and a number of input signal lines increases depending on the number of laser diode driving currents.

Because the demands to further improve the high-speed recording and high-density recording with respect to the information recording medium are increasing, and further increase in a data transfer rate, further narrowing of a pulse dividing width, and further increase in a number of power levels are unavoidable in the future.

An optical pickup which irradiates a laser beam on the optical disk is movable in a radial direction of the optical disk to carry out a so-called seek operation. Hence, in general, the optical pickup and a circuit board which is mounted with a signal processor and the like are connected via a flexible printed circuit (FPC). An LD driver is disposed in a vicinity of a light source (laser diode: LD) which is provided on the optical pickup. The signal processor and the like on the circuit board and the LD driver on the optical pickup are thus connected via the FPC.

However, it is inevitable that the FPC must have a certain length in order to allow movement of the optical pickup. Hence, light modulation control signals which are supplied to the LD driver via the FPC are subjected to waveform distortions and delays caused by signal lines of the FPC. As a result, an-error is introduced in switching timings of the LD driving currents due to the waveform distortions and delays of the light modulation control signals, and a waveform distortion is generated in the LD driving current at a timing when switches for switching the LD driving currents are switched simultaneously. This waveform distortion of the LD driving current makes it difficult to emit the laser beam with a desired light waveform. Of the delays of the light modulation control signals, a difference in the delays of the plurality of light modulation control signals is often referred to as a skew.

FIG. 1 is a system block diagram showing an example of a conventional LD driver, and FIG. 2 is a timing chart for explaining the operation of the conventional LD driver.

In FIG. 1, a current source section 300 supplies currents Ib, Ie and Iw respectively corresponding to light irradiation levels of a laser diode (LD) 303 which is used as a light source. A switching section 301 includes switches SW1 and SW2 which are respectively switched in response to control signals S1 and S2. An adding circuit 302 adds the currents Ib, Ie and Iw which are selectively output via the switching section 301, and outputs a LD driving current for driving the laser diode 303. When the control signal S1 has a high level and the control signal S2 has a low level, a current Ib+Ie is supplied to the laser diode 303 to emit light with an erase power Pe. When the control signal S1 has a low level and the control signal S2 has a high level, a current Ib+Iw is supplied to the laser diode 303 to emit light with a write power Pw.

However, if a delay is generated in the control signal S1 as indicated by m in FIG. 2 and a skew is generated between the control signals S1 and S2, a waveform distortion is generated in the light waveform when the power of the light emitted from the laser diode 303 changes from the erase power Pe to the write power Pw, as indicated by a portion surrounded by dotted lines in FIG. 2.

When the laser diode 303 cannot emit the light (laser beam) with the desired light waveform, the accuracy of the mark shape and the mark position on the optical disk deteriorates, to thereby cause data error. The effects of the waveform distortion in the light waveform is particularly notable when carrying out a high-speed recording with respect to the skew peculiar to the optical disk drive.

For example, if a skew of approximately 1 ns is generated in the optical disk drive, 1 channel clock period T is approximately 230 ns when carrying out a CD 1-times speed recording. Hence, a pulse width must normally be set with a resolving power of approximately T/32 (approximately 7 ns) with respect to the channel clock period T. In this case, the skew of approximately 1 ns does not generate serious problems and is tolerable. Of course, a resolving power of approximately T/40 may be required depending on the optical disk used.

But if a CD 48-times speed recording is to be carried out, the channel clock period T is approximately 4.8 ns, and the pulse width must be set with a resolving power of approximately 150 ps. In this case, the skew of 1 ns is not tolerable, and if such a skew is generated, the laser diode 303 cannot emit the light (laser beam) with the desired,light waveform, the accuracy of the mark shape and the mark position on the optical disk deteriorates, to thereby cause the data error.

Furthermore, radiation from the FPC causes noise to be generated in the signals.

For example, a light source driving unit was proposed in a Japanese Laid-Open Patent Application No. 11-283249 to solve this problem. The proposed light source driving unit includes a laser diode driving means for supplying currents from a plurality of current sources to a laser diode via a switching means, and a driving waveform restoration means for restoring a driving waveform (light modulating waveform) which drives the laser diode in correspondence with a binarized recording signal to be recorded on the information recording medium and controls the switching means. The laser diode driving means and the driving waveform restoration means are provided on a single laser driving integrated circuit, so as to prevent the generation of skew by reducing the length of the wirings between the laser diode driving means and the driving waveform restoration means.

However, even when the laser diode driving means and the driving waveform restoration means are provided on the same integrated circuit, it is extremely difficult to make the delays of switches, the delays of circuits which generate switching control signals, the lengths of control signal lines, the load conditions and the like identical with respect to all of the light modulating control signals, and the skew is inevitably generated. Hence, when further improvements made in the high-speed recording, even a slight skew will not be tolerated, and the simple reduction of the skew will not solve the above described problems for the super high-speed recording.

When the high-speed recording and the high-density recording with respect to the information recording medium are further improved, a light modulating control signal generator (driving waveform restoration means) will need to operate at a higher operation speed and a higher integration density will be required. An extremely fine CMOS process is suitable for the purpose when realizing such high-speed operation and high integration density of the light modulating control signal generator. But on the other hand, the laser diode driver is connected to the laser diode which has an operating voltage of approximately 1 V to several V, and a high withstand voltage process (for example, 5 V or 3.3 V) is required.

However, it is normally difficult to realize a high withstand voltage in the case of the extremely fine CMOS process, because the withstand voltage is only approximately 1.8 V in the case of a CMOS process of 0.18 μm. As a result, there are problems in that it is difficult to realize the high-speed operation of the light modulating control signal generator, the cost of the LD driver considerably increases, the power consumption of the LD driver increases, and the size of the integrated circuit as a whole increases.

Furthermore, complex light modulating waveforms are required depending on the information recording media. For example, when carrying out a high-speed recording, the passing time of the irradiated light beam on the information recording medium becomes short, and the amount of energy irradiated on the information recording medium decreases, and the amount of heat generated may become smaller than that required to form the recording marks on the information recording medium. Hence, in order to accurately carry out the recording, the recording should be made using a pulse train having an extremely narrow pulse width, but such a narrow pulse width would require a high laser power of the light source. Accordingly, there is a proposed method which carries out the recording at a relatively low laser power by decreasing the frequency of the multi-pulse train (or sequence).

On the other hand, when the recording is carried out at a low speed with respect to the information recording medium which has an improved recording sensitivity for use in the high-speed recording, the heat generated may become excessively large to make it impossible to accurately form the recording marks on the information recording medium. Hence, there is a proposed method which carries out the recording by increasing the frequency of the multi-pulse train.

Therefore, various recording methods have been proposed for the various kinds of information recording media, but none of the proposed methods can cope with the various kinds of information recording media using the same circuit.

In order to cope with the various kinds of information recording media, various light modulating waveforms are required by changing the frequency of the multi-pulse train and providing multi-levels.

SUMMARY OF THE INVENTION

Accordingly, it is a general object of the present invention to provide a novel and useful light source driving unit and optical storage apparatus, in which the problems described above are eliminated.

Another and more specific object of the present invention is to provide a light source driving unit which can suppress an error of a light modulating waveform from a desired value, which is caused by skew or waveform distortion of a light modulating control signal, when carrying out a high-speed recording and a high-density recording with respect to an information recording medium, and to provide an optical storage apparatus which uses such a light source driving unit.

Still another object of the present invention is to provide a light source driving unit comprising a modulating signal generating section generating a plurality of modulating signals based on driving waveform generating information of a light source; a current source selecting section selecting one or a plurality of currents output from a plurality of current sources based on the plurality of modulating signals generated by the modulating signal generating section; a light source driving section generating a current having multi-levels based on the one or plurality of currents selected by the current source selecting section, and supplying the generated current to the light source to drive the light source so that light in multi-levels is generated from the light source; and a cancelling section adding a signal error amount which cancels differences in amounts of signal delays generated between the modulating signal generating section and the light source driving section at a stage prior to the current source selecting section.

A further object of the present invention is to provide a light source driving unit comprising a driving waveform generating information holding section holding driving waveform generating information based on a driving waveform of a light source; a modulating signal generating section generating a plurality of modulating signals for selecting one or a plurality of currents output from a plurality of current sources based on the driving waveform generating information held in the driving waveform generating information holding section; a light source driving section generating a current having multi-levels based on the one or plurality of currents selected by the plurality of modulating signals generated by the modulating signal generating section, and supplying the generated current to the light source to drive the light source so that light in multi-levels is generated from the light source; and a delay adjusting section delaying each of the plurality of modulating signals generated by the modulating signal generating section by a predetermined amount, so as not to delay a selecting timing of the one or plurality of currents by the plurality of modulating signals generated by the modulating signal generating section.

Another object of the present invention is to provide a light source driving unit comprising a driving waveform generating information holding section holding driving waveform generating information based on a driving waveform of a light source; a modulating signal generating section generating a plurality of modulating signals for selecting one or a plurality of currents output from a plurality of current sources based on the driving waveform generating information held in the driving waveform generating information holding section; a light source driving section generating a current having multi-levels based on the one or plurality of currents selected by the plurality of modulating signals generated by the modulating signal generating section, and supplying the generated current to the light source to drive the light source so that light in multi-levels is generated from the light source; and a delay adjusting section delaying a generating timing of each of the plurality of modulating signals in the modulating signal generating section by a predetermined amount, so as not to delay a selecting timing of the one or plurality of currents by the plurality of modulating signals generated by the modulating signal generating section.

Still another object of the present invention is to provide a light source driving unit comprising a driving waveform generating information holding section holding driving waveform generating information based on a driving waveform of a light source; a current selection signal generating section generating a plurality of selection signals for selecting multi-level currents to be output from a plurality of current sources based on the driving waveform generating information held in the driving waveform generating information holding section; a modulating signal generating section generating a modulating signal for selecting one of the currents output from the plurality of current sources based on the driving waveform generating information held in the driving waveform generating information holding section; a light source driving section supplying the current selected by the modulating signal generated by the modulating signal generating section to drive the light source so that light in multi-levels is generated from the light source; and a control section carrying out a control so that, during a predetermined time in which an arbitrary one of the plurality of selection signals generated by the current selection signal generating section changes, a current component corresponding to the arbitrary selection signal and supplied to the light source remains unchanged.

A further object of the present invention is to provide a light source driving unit comprising a driving waveform generating information holding section holding driving waveform generating information based on a driving waveform of a light source; a modulating signal generating section generating a modulating signal for selecting one of currents output from first and second current sources based on the driving waveform generating information held in the driving waveform generating information holding section; a current selection signal generating section generating a first selection signal for selecting a multi-level current to be output from the-first current source in synchronism with one of rising and falling edges of the modulating signal generated by the modulating signal generating section, and a second selection signal for selecting a multi-level current to be output from the second current source in synchronism with other of rising and falling edges of the modulating signal generated by the modulating signal generating section, based on the driving waveform generating information held in the driving waveform generating information holding section; a light source driving section supplying the current selected by the modulating signal generated by the modulating signal generating section to drive the light source so that light in multi-levels is generated from the light source; and a control section carrying out a control so that the current output from the first current source responsive to the first selection signal is supplied to the light source when the modulating signal generated by the modulating signal generating section has a first logic level, and the current output from the second current source responsive to the second selection signal is supplied to the light source when the modulating signal generated by the modulating signal generating section has a second logic level different from the first logic level.

Another object of the present invention is to provide a light source driving unit comprising a driving waveform generating information holding section holding driving waveform generating information based on a driving waveform of a light source; a modulating signal generating section generating a modulating signal for selecting a multi-level current to be output from a current source based on the driving waveform generating information held in the driving waveform generating information holding section; a light source driving section supplying the multi-level current selected by the modulating signal generated by the modulating signal generating section to drive the light source so that light in multi-levels is generated from the light source; and a control section carrying out a control to hold the current supplied to the light source for a predetermined time from an edge of the modulating signal generated by the modulating signal generating section based on the driving waveform generating information.

Still another object of the present invention is to provide a light source driving unit comprising a driving waveform generating information holding section holding driving waveform generating information based on a driving waveform of a light source; a modulating signal generating section generating a plurality of modulating signals for selecting one or a plurality of currents output from a plurality of current sources based on the driving waveform generating information held in the driving waveform generating information holding section; a light source driving section generating a multi-level current based on the one or plurality of currents selected by the plurality of modulating signals generated by the modulating signal generating section, and supplying the generated current to the light source to drive the light source so that light in multi-levels is generated from the light source; and a compensating section carrying out a compensation by subtracting an excess amount or adding a lacking amount of the multi-level current generated by the light source driving section based on differences among delay times of the plurality of modulating signals generated by the modulating signal generating section.

A further object of the present invention is to provide a light source driving unit comprising a driving waveform generating information holding section holding driving waveform generating information based on a driving waveform of a light source; a modulating signal generating section generating a plurality of modulating signals for selecting one or a plurality of currents output from a plurality of current sources based on the driving waveform generating information held in the driving waveform generating information holding section; a light source driving section generating a multi-level current based on the one or plurality of currents selected by the plurality of modulating signals generated by the modulating signal generating section, and supplying the generated current to the light source to drive the light source so that light in multi-levels is generated from the light source; and a compensating section carrying out a compensation by subtracting an excess amount or adding a lacking amount of the multi-level current generated by the light source driving section, based on differences among delay times of the plurality of modulating signals generated by the modulating signal generating section and the one or plurality of currents selected by the plurality of modulating signals generated by the modulating signal generating section.

Another object of the present invention is to provide an optical storage apparatus comprising a light source irradiating light on an information recording medium to record information on and/or reproduce information from the information recording medium; and a light source driving unit which drives the light source, the light source driving unit comprising a modulating signal generating section generating a plurality of modulating signals based on driving waveform generating information of the light source; a current source selecting section selecting one or a plurality of currents output from a plurality of current sources based on the plurality of modulating signals generated by the modulating signal generating section; a light source driving section generating a current having multi-levels based on the one or plurality of currents selected by the current source selecting section, and supplying the generated current to the light source to drive the light source so that light in multi-levels is generated from the light source; and a cancelling section adding a signal error amount which cancels differences in amounts of signal delays generated between the modulating signal generating section and the light source driving section at a stage prior to the current source selecting section.

Still another object of the present invention is to provide an optical storage apparatus comprising a light source irradiating light on an information recording medium to record information on and/or reproduce information from the information recording medium; and a light source driving unit which drives the light source, the light source driving unit comprising a driving waveform generating information holding section holding driving waveform generating information based on a driving waveform of the light source; a modulating signal generating section generating a plurality of modulating signals for selecting one or a plurality of currents output from a plurality of current sources based on the driving waveform generating information held in the driving waveform generating information holding section; a light source driving section generating a current having multi-levels based on the one or plurality of currents selected by the plurality of modulating signals generated by the modulating signal generating section, and supplying the generated current to the light source to drive the light source so that light in multi-levels is generated from the light source; and a delay adjusting section delaying each of the plurality of modulating signals generated by the modulating signal generating section by a predetermined amount, so as not to delay a selecting timing of the one or plurality of currents by the plurality of modulating signals generated by the modulating signal generating section.

A further object of the present invention is to provide an optical storage apparatus comprising a light source irradiating light on an information recording medium to record information on and/or reproduce information from the information recording medium; and a light source driving unit which drives the light source, the light source driving unit comprising a driving waveform generating information holding section holding driving waveform generating information based on a driving waveform of the light source; a modulating signal generating section generating a plurality of modulating signals for selecting one or a plurality of currents output from a plurality of current sources based on the driving waveform generating information held in the driving waveform generating information holding section; a light source driving section generating a current having multi-levels based on the one or plurality of currents selected by the plurality of modulating signals generated by the modulating signal generating section, and supplying the generated current to the light source to drive the light source so that light in multi-levels is generated from the light source; and a delay adjusting section delaying a generating timing of each of the plurality of modulating signals in the modulating signal generating section by a predetermined amount, so as not to delay a selecting timing of the one or plurality of currents by the plurality of modulating signals generated by the modulating signal generating section.

Another object of the present invention is to provide an optical storage apparatus comprising a light source irradiating light on an information recording medium to record information on and/or reproduce information from the information recording medium; and a light source driving unit which drives the light source, the light source driving unit comprising a driving waveform generating information holding section holding driving waveform generating information based on a driving waveform of the light source; a current selection signal generating section generating a plurality of selection signals for selecting multi-level currents to be output from a plurality of current sources based on the driving waveform generating information held in the driving waveform generating information holding section; a modulating signal generating section generating a modulating signal for selecting one of the currents output from the plurality of current sources based on the driving waveform generating information held in the driving waveform generating information holding section; a light source driving section supplying the current selected by the modulating signal generated by the modulating signal generating section to drive the light source so that light in multi-levels is generated from the light source; and a control section carrying out a control so that, during a predetermined time in which an arbitrary one of the plurality of selection signals generated by the current selection signal generating section changes, a current component corresponding to the arbitrary selection signal and supplied to the light source remains unchanged.

Still another object of the present invention is to provide an optical storage apparatus comprising a light source irradiating light on an information recording medium to record information on and/or reproduce information from the information recording medium; and a light source driving unit which drives the light source, the light source driving unit comprising a driving waveform generating information holding section holding driving waveform generating information based on a driving waveform of the light source; a modulating signal generating section generating a modulating signal for selecting one of currents output from first and second current sources based on the driving waveform generating information held in the driving waveform generating information holding section; a current selection signal generating section generating a first selection signal for selecting a multi-level current to be output from the first current source in synchronism with one of rising and falling edges of the modulating signal generated by the modulating signal generating section, and a second selection signal for selecting a multi-level current to be output from the second current source in synchronism with other of rising and falling edges of the modulating signal generated by the modulating signal generating section, based on the driving waveform generating information held in the driving waveform generating information holding section; a light source driving section supplying the current selected by the modulating signal generated by the modulating signal generating section to drive the light source so that light in multi-levels is generated from the light source; and a control section carrying out a control so that the current output from the first current source responsive to the first selection signal is supplied to the light source when the modulating signal generated by the modulating signal generating section has a first logic level, and the current output from the second current source responsive to the second selection signal is supplied to the light source when the modulating signal generated by the modulating signal generating section has a second logic level different from the first logic level.

A further object of the present invention is to provide an optical storage apparatus comprising a light source irradiating light on an information recording medium to record information on and/or reproduce information from the information recording medium; and a light source driving unit which drives the light source, the light source driving unit comprising a driving waveform generating information holding section holding driving waveform generating information based on a driving waveform of the light source; a modulating signal generating section generating a modulating signal for selecting a multi-level current to be output from a current source based on the driving waveform generating information held in the driving waveform generating information holding section; a light source driving section supplying the multi-level current selected by the modulating signal generated by the modulating signal generating section to drive the light source so that light in multi-levels is generated from the light source; and a control section carrying out a control to hold the current supplied to the light source for a predetermined time from an edge of the modulating signal generated by the modulating signal generating section based on the driving waveform generating information.

Another object of the present invention is to provide an optical storage apparatus comprising a light source irradiating light on an information recording medium to record information on and/or reproduce information from the information recording medium; and a light source driving unit which drives the light source, the light source driving unit comprising a driving waveform generating information holding section holding driving waveform generating information based on a driving waveform of the light source; a modulating signal generating section generating a plurality of modulating signals for selecting one or a plurality of currents output from a plurality of current sources based on the driving waveform generating information held in the driving waveform generating information holding section; a light source driving section generating a multi-level current based on the one or plurality of currents selected by the plurality of modulating signals generated by the modulating signal generating section, and supplying the generated current to the light source to drive the light source so that light in multi-levels is generated from the light source; and a compensating section carrying out a compensation by subtracting an excess amount or adding a lacking amount of the multi-level current generated by the light source driving section based on differences among delay times of the plurality of modulating signals generated by the modulating signal generating section.

Still another object of the present invention is to provide an optical storage apparatus comprising a light source irradiating light on an information recording medium to record information on and/or reproduce information from the information recording medium; and a light source driving unit which drives the light source, the light source driving unit comprising a driving waveform generating information holding section holding driving waveform generating information based on a driving waveform of the light source; a modulating signal generating section generating a plurality of modulating signals for selecting one or a plurality of currents output from a plurality of current sources based on the driving waveform generating information held in the driving waveform generating information holding section; a light source driving section generating a multi-level current based on the one or plurality of currents selected by the plurality of modulating signals generated by the modulating signal generating section, and supplying the generated current to the light source to drive the light source so that light in multi-levels is generated from the light source; and a compensating section carrying out a compensation by subtracting an excess amount or adding a lacking amount of the multi-level current generated by the light source driving section, based on differences among delay times of the plurality of modulating signals generated by the modulating signal generating section and the one or plurality of currents selected by the plurality of modulating signals generated by the modulating signal generating section.

A further object of the present invention is to provide a light source driving unit for driving a light source to emit light at multiple irradiating levels, comprising a state control section controlling states corresponding to the multiple irradiating levels, by controlling transitions of the states based on a modulating signal which indicates a transition timing of the irradiating level of the light source, a state transition signal which instructs a state transition and a preset transition rule, and generating modulating data corresponding to a selected state; and a modulating section modulating a driving current supplied to the light source based on the modulating signal and the modulating data.

Another object of the present invention is to provide a light source driving unit for driving a light source to emit light at multiple irradiating levels, comprising a first state control section controlling a first group of states amounting to a portion of states corresponding to the multiple irradiating levels, by controlling transitions of the states based on a modulating signal which indicates a transition timing of the irradiating level of the light source, a state transition signal which instructs a state transition and a preset first transition rule, and generating a first modulating data corresponding to a selected state; a second state control section controlling a second group of states amounting to another portion of the states corresponding to the multiple irradiating levels, by controlling transitions of the states based on the modulating signal, the state transition signal and a preset second transition rule, and generating a second modulating data corresponding to a selected state; and a modulating section modulating a driving current supplied to the light source by selecting one of the first and second modulating data based on the modulating signal.

Still another object of the present invention is to provide a light source driving unit for driving a light source to emit light at multiple irradiating levels, comprising a state control section controlling states corresponding to the multiple irradiating levels, by controlling transitions of the states based on a modulating signal which indicates a transition timing of the irradiating level of the light source, a state transition signal which instructs a state transition and a preset transition rule, and generating modulating data corresponding to a selected state; and a modulating section modulating a driving current supplied to the light source based on the modulating signal and the modulating data, the transition rule being modified in response to a transition rule modifying signal which instructs modifying of the transition rule.

A further object of the present invention is to provide a light source driving unit for driving a light source to emit light at multiple irradiating levels, comprising a first state control section controlling a first group of states amounting to a portion of states corresponding to the multiple irradiating levels, by controlling transitions of the states based on a modulating signal which indicates a transition timing of the irradiating level of the light source, a state transition signal which instructs a state transition and a preset first transition rule, and generating a first modulating data corresponding to a selected state; a second state control section controlling a second group of states amounting to another portion of the states corresponding to the multiple irradiating levels, by controlling transitions of the states based on the modulating signal, the state transition signal and a preset second transition rule, and generating a second modulating data corresponding to a selected state; and a modulating section modulating a driving current supplied to the light source by selecting one of the first and second modulating data based on the modulating signal, at least one of the first and second transition rules being modified in response to a transition rule modifying signal which instructs modifying of the transition rule.

Another object of the present invention is to provide a light source driving unit for driving a light source to emit light at multiple irradiating levels, comprising a state control section controlling states corresponding to the multiple irradiating levels, by controlling transitions of the states based on a modulating signal which indicates a transition timing of the irradiating level of the light source, a state transition signal which instructs a state transition and a preset transition rule, and generating modulating data corresponding to a selected state, at least one predetermined state corresponding to a plurality of irradiating levels; a modulating section modulating a driving current supplied to the light source based on the modulating signal and the modulating data; and an irradiating level selecting section selecting one of the plurality of irradiating levels corresponding to the predetermined state based on irradiating level selecting information, and dynamically making the selected irradiating level correspond to one of the states.

Still another object of the present invention is to provide a light source driving unit for driving a light source to emit light at multiple irradiating levels, comprising a first state control section controlling a first group of states amounting to a portion of states corresponding to the multiple irradiating levels, by controlling transitions of the states based on a modulating signal which indicates a transition timing of the irradiating level of the light source, a state transition signal which instructs a state transition and a preset first transition rule, and generating a first modulating data corresponding to a selected state; a second state control section controlling a second group of states amounting to another portion of the states corresponding to the multiple irradiating levels, by controlling transitions of the states based on the modulating signal, the state transition signal and a preset second transition rule, and generating a second modulating data corresponding to a selected state; a first current source generating a first current based on the first modulating data; a second current source generating a second current based on the second modulating data; a switch selecting one of the first and second currents based on the modulating signal; and a current driving section supplying a driving current to the light source, the driving current being a sum of one of the first and second currents selected by the switch and a bias current.

A further object of the present invention is to provide a light source driving unit for driving a light source to emit light at multiple irradiating levels, comprising a state control section controlling states corresponding to the multiple irradiating levels, by controlling transitions of the states based on a modulating signal which indicates a transition timing of the irradiating level of the light source, a state transition signal which instructs a state transition and a preset transition rule, and generating modulating data corresponding to a selected state; a plurality of current sources generating currents based on the modulating data; a switch selecting one of the currents generated by the plurality of current sources; and a current driving section supplying a driving current to the light source, the driving current being a sum of current selected by the switch and a bias current.

Another object of the present invention is to provide a light source driving unit for driving a light source to emit light at multiple irradiating levels, comprising a first state control section controlling a first group of states amounting to a portion of states corresponding to the multiple irradiating levels, by controlling transitions of the states based on a modulating signal which indicates a transition timing of the irradiating level of the light source, a state transition signal which instructs a state transition and a preset first transition rule, and generating a first modulating data corresponding to a selected state and a first state selection signal; a second state control section controlling a second group of states amounting to another portion of the states corresponding to the multiple irradiating levels, by controlling transitions of the states based on the modulating signal, the state transition signal and a preset second transition rule, and generating a second modulating data corresponding to a selected state and a second state selection signal; a first current source outputting, of a plurality of currents generated based on the first modulating data, a first current based on the first state selection signal; a second current source outputting, of a plurality of currents generated based on the second modulating data, a second current based on the second state selection signal; a switch selecting one of the first and second currents based on the modulating signal; and a current driving section supplying a driving current to the light source, the driving current being a sum of one of the first and second currents selected by the switch and a bias current.

Still another object of the present invention is to provide a light source driving unit for driving a light source to emit light at multiple irradiating levels, comprising a first state control section controlling a first group of states amounting to a portion of states corresponding to the multiple irradiating levels, by controlling transitions of the states based on a modulating signal which indicates a transition timing of the irradiating level of the light source, a state transition signal which instructs a state transition and a preset first transition rule, and generating a first modulating data corresponding to a selected state and first adding current data; a second state control section controlling a second group of states amounting to another portion of the states corresponding to the multiple irradiating levels, by controlling transitions of the states based on the modulating signal, the state transition signal and a preset second transition rule, and generating a second modulating data corresponding to a selected state and second adding current data; a first current source generating a first current based on the first modulating data; a second current source generating a second current based on the second modulating data; a third current source generating a first adding current based on the first adding current data; a fourth current source generating a second adding current based on the second adding current data; a switch selecting one of a first current sum of the first current and the first adding current and a second current sum of the second current and the second adding current based on the modulating signal; and a current driving section supplying a driving current to the light source, the driving current being a sum of one of the first and second current sums selected by the switch and a bias current.

A further object of the present invention is to provide an optical storage apparatus comprising a light source irradiating light on an information recording medium to record information on and/or reproduce information from the information recording medium; and a light source driving unit which drives the light source to emit light at multiple irradiating levels, the light source driving unit comprising a first state control-section controlling a first group of states amounting to a portion of states corresponding to the multiple irradiating levels, by controlling transitions of the states based on a modulating signal which indicates a transition timing of the irradiating level of the light source, a state transition signal which instructs a state transition and a preset first transition rule, and generating a first modulating data corresponding to a selected state; a second state control section controlling a second group of states amounting to another portion of the states corresponding to the multiple irradiating levels, by controlling transitions of the states based on the modulating signal, the state transition signal and a preset second transition rule, and generating a second modulating data corresponding to a selected state; a first current source generating a first current based on the first modulating data; a second current source generating a second current based on the second modulating data; a switch selecting one of the first and second currents based on the modulating signal; a current driving section supplying a driving current to the light source, the driving current being a sum of one of the first and second currents selected by the switch and a bias current; and a scale setting section setting an output full scale of each of the first and second current sources, the output full scale being varied between a recording mode and a reproducing mode of the optical storage apparatus.

Another object of the present invention is to provide an optical storage apparatus comprising a light source irradiating light on an information recording medium to record information on and/or reproduce information from the information recording medium; and a light source driving unit which drives the light source to emit light at multiple irradiating levels, the light source driving unit comprising a state control section controlling states corresponding to the multiple irradiating levels, by controlling transitions of the states based on a modulating signal which indicates a transition timing of the irradiating level of the light source, a state transition signal which instructs a state transition and a preset transition rule, and generating modulating data corresponding to a selected state; a plurality of current sources generating currents based on the modulating data; a switch selecting one of the currents generated by the plurality of current sources; a current driving section supplying a driving current to the light source, the driving current being a sum of current selected by the switch and a bias current; and a scale setting section setting an output full scale of each of the plurality of current sources, the output full scale being varied between a recording mode and a reproducing mode of the optical storage apparatus.

Still another object of the present invention is to provide an optical storage apparatus comprising a light source irradiating light on an information recording medium to record information on and/or reproduce information from the information recording medium; and a light source driving unit which drives the light source to emit light at multiple irradiating levels, the light source driving unit comprising a first state control section controlling a first group of states amounting to a portion of states corresponding to the multiple irradiating levels, by controlling transitions of the states based on a modulating signal which indicates a transition timing of the irradiating level of the light source, a state transition signal which instructs a state transition and a preset first transition rule, and generating a first modulating data corresponding to a selected state and a first state selection signal; a second state control section controlling a second group of states amounting to another portion of the states corresponding to the multiple irradiating levels, by controlling transitions of the states based on the modulating signal, the state transition signal and a preset second transition rule, and generating a second modulating data corresponding to a selected state and a second state selection signal; a first current source outputting, of a plurality of currents generated based on the first modulating data, a first current based on the first state selection signal; a second current source outputting, of a plurality of currents generated based on the second modulating data, a second current based on the second state selection signal; a switch selecting one of the first and second currents based on the modulating signal; a current driving section supplying a driving current to the light source, the driving current being a sum of one of the first and second currents selected by the switch and a bias current; and a scale setting section setting an output full scale of each of the first and second current sources, the output full scale being varied between a recording mode and a reproducing mode of the optical storage apparatus.

A further object of the present invention is to provide an optical storage apparatus comprising a light source irradiating light on an information recording medium to record information on and/or reproduce information from the information recording medium; and a light source driving unit which drives the light source to emit light at multiple irradiating levels, the light source driving unit comprising a first state control section controlling a first group of states amounting to a portion of states corresponding to the multiple irradiating levels, by controlling transitions of the states based on a modulating signal which indicates a transition timing of the irradiating level of the light source, a state transition signal which instructs a state transition and a preset first transition rule, and generating a first modulating data corresponding to a selected state and first adding current data; a second state control section controlling a second group of states amounting to another portion of the states corresponding to the multiple irradiating levels, by controlling transitions of the states based on the modulating signal, the state transition signal and a preset second transition rule, and generating a second modulating data corresponding to a selected state and second adding current data; a first current source generating a first current based on the first modulating data; a second current source generating a second current based on the second modulating data; a third current source generating a first adding current based on the first adding current data; a fourth current source generating a second adding current based on the second adding current data; a switch selecting one of a first current sum of the first current and the first adding current and a second current sum of the second current and the second adding current based on the modulating signal; a current driving section supplying a driving current to the light source, the driving current being a sum of one of the first and second current sums selected by the switch and a bias current; and a scale setting section setting an output full scale of each of the first through fourth current sources, the output full scale being varied between a recording mode and a reproducing mode of the optical storage apparatus.

Another object of the present invention is to provide an optical storage apparatus which forms recording marks corresponding to a binary signal which is to be recorded on an information recording medium by irradiating light on the information recording medium from a light source which is driven by a plurality of pulse train waveforms which are based on multiple irradiating levels corresponding to the binary signal, the optical storage apparatus comprising a driving waveform generating information holding section holding timing information indicating each pulse width of the plurality of pulse train waveforms; a modulating signal generating section generating a modulating signal indicating a transition timing of the irradiating level based on the timing information held in the driving waveform generating information holding section; a state transition signal generating section generating a state transition signal instructing a transition of a state corresponding to the irradiating level based on the timing information held in the driving waveform generating information holding section; a state control section controlling the state transition based on the modulating signal generated by the modulating signal generating section, the state transition signal generated by the state transition signal generating section and a preset transition rule, and generating modulating data corresponding to a selected state; and a light source driving section driving the light source based on the modulating signal generated by the modulating signal generating section and the modulating data generated by the state control section.

Still another object of the present invention is to provide an optical storage apparatus which forms recording marks corresponding to a binary signal which is to be recorded on an information recording medium by irradiating light on the information recording medium from a light source which is driven by a plurality of pulse train waveforms which are based on multiple irradiating levels corresponding to the binary signal, the optical storage apparatus comprising a driving waveform generating information holding section holding a plurality of timing information indicating each pulse width of the plurality of pulse train waveforms; a timing information selecting section selecting one of the plurality of timing information based on the binary signal; a modulating signal generating section generating a modulating signal indicating a transition timing of the irradiating level based on the timing information selected by the timing information selecting section; a state transition signal generating section generating a state transition signal instructing a transition of a state corresponding to the irradiating level based on the timing information selected by the timing information selecting section; a state control section controlling the state transition based on the modulating signal generated by the modulating signal generating section, the state transition signal generated by the state transition signal generating section and a preset transition rule, and generating modulating data corresponding to a selected state; and a light source driving section driving the light source based on the modulating signal generated by the modulating signal generating section and the modulating data generated by the state control section.

A further object of the present invention is to provide an optical storage apparatus which forms recording marks corresponding to a binary signal which is to be recorded on an information recording medium by irradiating light on the information recording medium, comprising a light source which emits the light by being driven by a plurality of pulse train waveforms which are based on multiple irradiating levels corresponding to the binary signal; and a section which arbitrarily sets a frequency and a duty cycle of the pulse train waveforms.

Another object of the present invention is to provide an optical storage apparatus which forms recording marks corresponding to a binary signal which is to be recorded on an information recording medium by irradiating light on the information recording medium from a light source which is driven by a plurality of pulse train waveforms which are based on multiple irradiating levels corresponding to the binary signal, the optical storage apparatus comprising a driving waveform generating information holding section holding a plurality of driving waveform generating information made up of timing information indicating each pulse width of the plurality of pulse train waveforms and pulse number information indicating a repetition number of the timing information; an information selecting section selecting one driving waveform generating information based on the binary signal; a modulating signal generating section generating a modulating signal indicating a transition timing of the irradiating level based on the driving waveform generating information selected by the information selecting section; and a light source driving section controlling transitions of states based on the modulating signal generated by the modulating signal generating section, a state transition signal instructing a transition of a state corresponding to the irradiating level and a preset transition rule, and driving the light source based on a selected state.

Still another object of the present invention is to provide an optical storage apparatus which forms recording marks corresponding to a binary signal which is to be recorded on an information recording medium by irradiating light on the information recording medium from a light source which is driven by a plurality of pulse train waveforms which are based on multiple irradiating levels corresponding to the binary signal, the optical storage apparatus comprising a driving waveform generating information holding section holding a plurality of driving waveform generating information made up of timing information indicating each pulse width of the plurality of pulse train waveforms and pulse number information indicating a repetition number of the timing information; an information selecting section selecting one driving waveform generating information based on the binary signal; a modulating signal generating section generating a modulating signal indicating a transition timing of the irradiating level based on the driving waveform generating information selected by the information selecting section; a light source driving section controlling transitions of states based on the modulating signal generated by the modulating signal generating section, a state transition signal instructing a transition of a state corresponding to the irradiating level and a preset transition rule, and driving the light source based on a selected state, at least one predetermined state corresponding to a plurality of irradiating levels; and an irradiating level selecting section selecting one of the plurality of irradiating levels corresponding to the predetermined state based on irradiating level selecting information, and varying the irradiating level corresponding to the selected state to the selected irradiating level.

A further object of the present invention is to provide an optical storage apparatus which forms recording marks corresponding to a binary signal which is to be recorded on an information recording medium by irradiating light on the information recording medium from a light source which is driven by a plurality of pulse train waveforms which are based on multiple irradiating levels corresponding to the binary signal, the optical storage apparatus comprising a driving waveform generating information holding section holding a plurality of driving waveform generating information made up of timing information indicating each pulse width of the plurality of pulse train waveforms and pulse number information indicating a repetition number of the timing information; an information selecting section selecting one driving waveform generating information based on a recording mark length indicated by the binary signal or a combination of adjacent space lengths before and after the recording mark length; a modulating signal generating section generating a modulating signal indicating a transition timing of the irradiating level based on the driving waveform generating information selected by the information selecting section; a light source driving section controlling transitions of states based on the modulating signal generated by the modulating signal generating section, a state transition signal instructing a transition of a state corresponding to the irradiating level and a preset transition rule, and driving the light source based on a selected state, at least one predetermined state corresponding to a plurality of irradiating levels; and an irradiating level selecting section selecting one of the plurality of irradiating levels corresponding to the predetermined state based on irradiating level selecting information which is generated depending on the recording mark length or the combination of the adjacent space lengths before and after the recording mark length, and varying the irradiating level corresponding to the selected state to the selected irradiating level.

Another object of the present invention is to provide a light source driving unit for driving a light source to irradiate light at multiple irradiating levels, comprising a modulating signal generating section generating a modulating signal indicating a transition timing of the irradiating level of the light source; a state transition signal generating section generating a state transition signal instructing a transition of a state corresponding to the irradiating level; a light source driving section controlling transitions of states based on the modulating signal generated by the modulating signal generating section, the state transition signal generated by the state transition signal generating section and a preset transition rule, and driving the light source based on a selected state; and a command signal generating section generating a command signal instructing a predetermined operation with respect to the light source driving section.

Still another object of the present invention is to provide a light source driving unit for driving a light source to irradiate light at multiple irradiating levels, comprising a modulating signal generating section generating a modulating signal indicating a transition timing of the irradiating level of the light source; a state transition signal generating section generating a state transition signal instructing a transition of a state corresponding to the irradiating level; a light source driving section controlling transitions of states based on the modulating signal generated by the modulating signal generating section, the state transition signal generated by the state transition signal generating section and a preset transition rule, and driving the light source based on a selected state; and a light emission control section including a light receiving element which monitors a portion of the light emitted from the light source and outputs a detection signal, and controlling an amount of light emission from the light source based on a signal which is obtained by sampling the detection signal at predetermined timings.

Therefore, according to the present invention, it is possible to realize a light source driving unit which can suppress an error of a light modulating waveform from a desired value, which is caused by skew or waveform distortion of a light modulating control signal, when carrying out a high-speed recording and a high-density recording with respect to an information recording medium, and to realize an optical storage apparatus which uses such an advantageous light source driving unit.

Other objects and further features of the present invention will be apparent from the following detailed description when read in conjunction with the accompanying drawings.

BRIEF DESCRIPTION OF THE DRAWINGS

FIG. 44 is a diagram showing a table of combinations of the driving waveform generating information for each of a plurality of timing information;

FIG. 50 is a timing chart showing signal waveforms for explaining a signal delete process of a timing pulse signal controller shown in FIG. 46;

DESCRIPTION OF THE PREFERRED EMBODIMENTS

A description will be given of various embodiments of a light source driving unit and an optical storage apparatus according to the present invention, by referring to FIG. 3 and the subsequent drawings.

First a description will be given of the general structure and general operation of a first embodiment of the optical storage apparatus according to the present invention, which employs a first embodiment of the light source driving unit according to the present invention. In this first embodiment, the present invention is applied to an optical information recording and reproducing apparatus.

Figure 3:
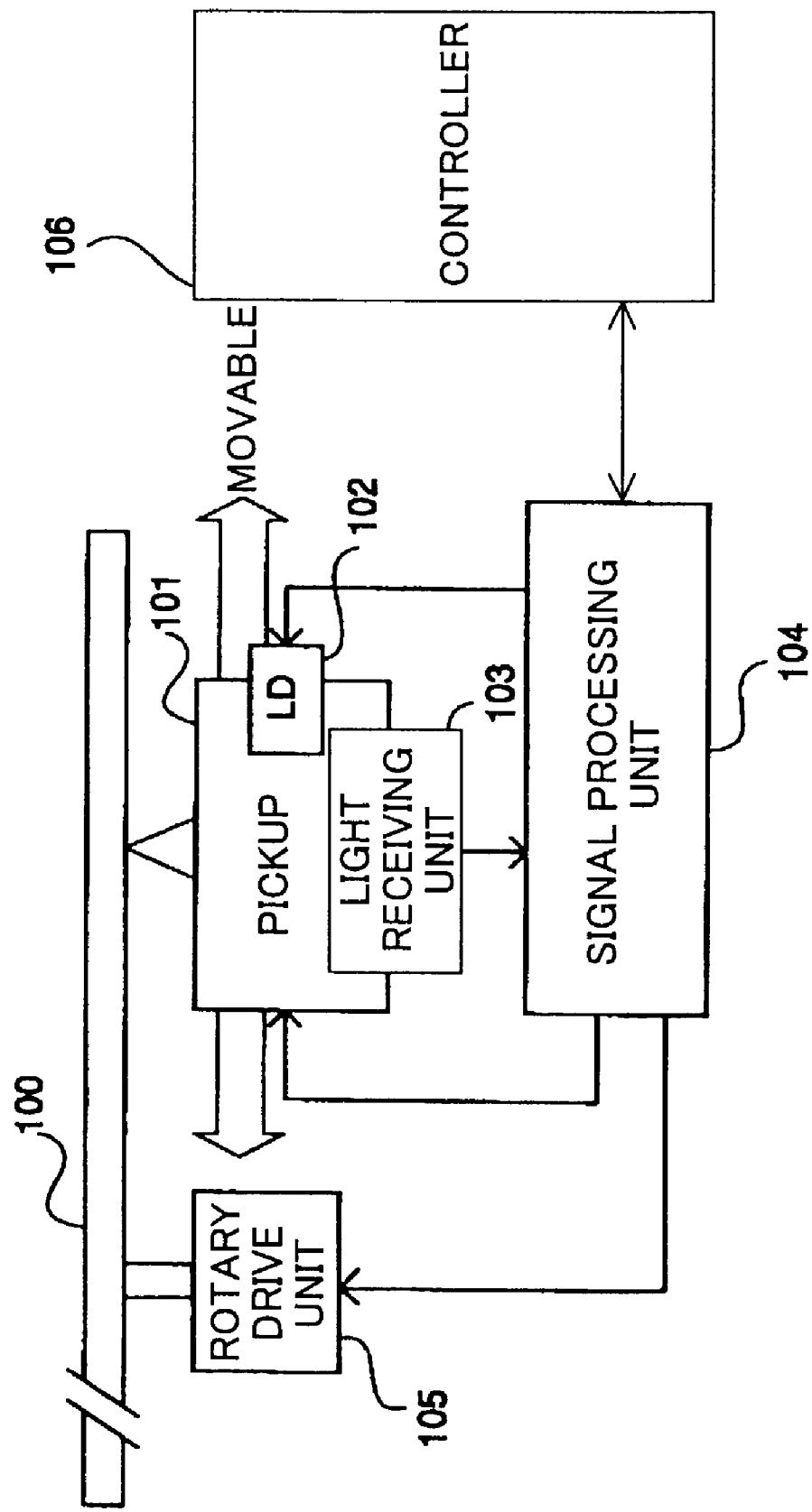
FIG. 3 is a system block diagram showing the structure of a first embodiment of an optical storage apparatus according to the present invention.

FIG. 3 is a system block diagram showing the structure of the first embodiment of the optical storage apparatus.

In this embodiment, an information recording medium 100 is formed by an optical disk which is prerecorded with information which is to be reproduced or, an optical disk on which the information is to be recorded. The optical disk may be a CD-ROM disk, a DVD-ROM disk, a CD-R disk, a CD-RW disk, a DVD-R disk, a DVD-RAM disk, a MD disk or a MO disk.

An optical pickup 101 includes a light source 102 such as a semiconductor laser (LD), a light source driving unit (not shown), and a light receiving unit 103. The light source 102 emits light which is irradiated on the information recording medium 100 to record information. The light source driving unit drives the light source 102. The light receiving unit 103 receives the reflected light from the information recording medium 100 and carries out a photo-electric conversion to reproduce recorded information from the information recording medium 100. The optical pickup 101 further includes a monitoring light receiving unit (not shown) which monitors a portion of the light emitted from the light source 102, and a deviation in the amount of light emitted from the light source 102 is controlled based on a monitor signal output from the monitoring light receiving unit. The optical pickup 101 may also include a tilt detecting light receiving unit (not shown) for detecting a tilt of the information recording medium 100 with respect to the light irradiated thereon. In the case of the information recording and reproducing apparatus which is designed to operate with a plurality of kinds of information recording media (for example, DVDs and CDs) having different media formats, a plurality of light sources may be provided to emit lights having suitable wavelengths for the different kinds of information recording media, and in this case, a light receiving unit for receiving the reflected light from the information recording medium and a monitoring light receiving unit may respectively be provided separately with respect to each light source.

A signal processing unit 104 receives light detection signals from the various light receiving units provided in the optical pickup 101, and carries out various signal processings. For example, the signal processing unit 104 reproduces recorded information from the information recording medium 100 and generates servo error signals, based on the light detection signals. The servo error signals are used to control the optical pickup 101 so that the light is constantly irradiated on the information recording medium 100 within a predetermined tolerable range, with respect to deviations such as surface fluctuation of the information recording medium 100 upon rotation and wobble of the tracks in the radial direction of the information recording medium 100. The focus servo and the tracking servo are included in such a control. The signal processing unit 104 also modulates the information which is to be recorded on the information recording medium 100 according to a predetermined modulation rule or scheme, and outputs a recording signal with respect to the light source 102 or the light source driving unit, so as to control the amount of light emitted from the light source 102.

A rotary drive unit 105 rotates the information recording medium 100 at a predetermined rotational speed during the data recording and reproduction, under the control (spindle servo control) of the signal processing unit 104. For example, in the case of the constant linear velocity (CLV) control, a rotation control signal which is embedded in the information recording medium 100 for the purposes of carrying out a more accurate rotation control is detected via the optical pickup 101, and the rotation control is carried out based on the detected rotation control signal. For example, in the case of an information recording medium exclusively for reproduction (that is, read-only), a synchronizing signal which is arranged at predetermined intervals with respect to the recorded information may be used as the rotation control signal. Further, in the case of a recordable information recording medium, a wobble which is formed by the recording track which wobbles at a predetermined frequency may be used as the rotation control signal.

A controller 106 exchanges recording information, reproduced information and commands with a host computer (not shown), and also control the general operation of the information recording and reproducing apparatus.

The optical pickup 101 and a circuit board (not shown) which is mounted with the signal processing unit 104 and the like are connected via a flexible printed circuit (FPC) or cable so as to enable the optical pickup 101 to make a seek operation in the radial direction of the information recording medium 100. Parts which are mounted on the pickup 101, such as the light source and the light receiving unit 103, may be mounted on the FPC.

Figure 4:
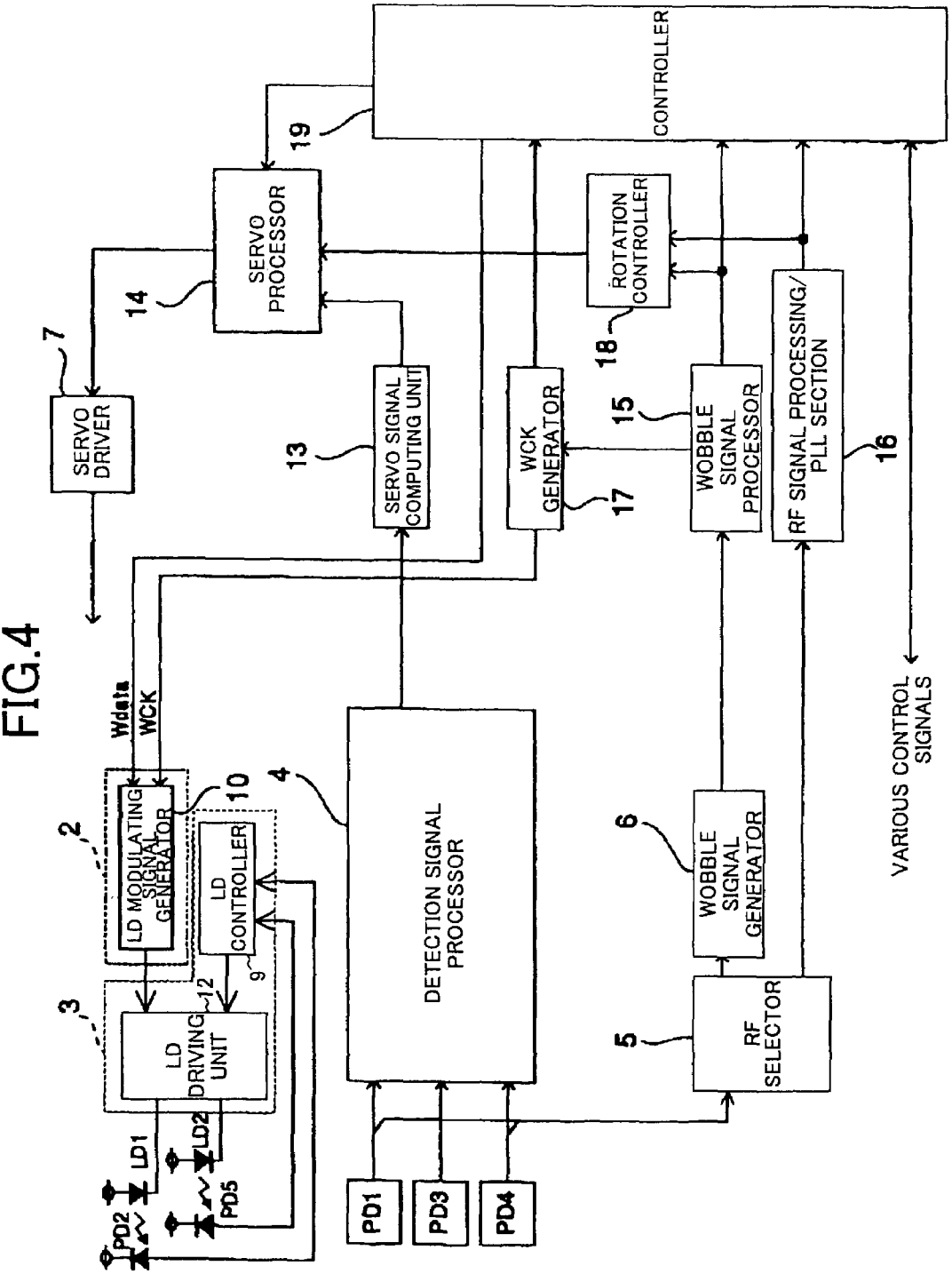
FIG. 4 is a system block diagram showing the structure of a signal processor shown in FIG. 3.

Next, a description will be given of the structure and general operation of the signal processing unit 104 of the information recording and reproducing apparatus, by referring to FIG. 4. FIG. 4 is a system block diagram showing the structure of the signal processing unit 104 shown in FIG. 3.

In this embodiment, two light sources LD1 and LD2 are provided to cope with information recording media having different media formats. The light sources LD1 and LD2 correspond to the light source 102 shown in FIG. 3. In addition, light receiving units PD2 and PD5 are provided to monitor a portion of corresponding lights emitted from the light sources LD1 and LD2 and irradiated on the information recording medium 100. The light receiving units PD2 and PD5 correspond to the light receiving unit 103 shown in FIG. 3.

A light receiving unit PD1 receives the reflected light from the information recording medium 100 when the light source LD1 irradiates the light on the information recording medium 100. A light receiving unit PD4 receives the reflected light from the information recording medium 100 when the light source LD2 irradiates the light on the information recording medium 100.

A light receiving unit PD3 detects an amount of tilt of the information recording medium 100 with respect to the light irradiated on the information recording medium 100. The light receiving units PD1, PD3 and PD4, which correspond to the light receiving unit 103 shown in FIG. 3, are respectively formed by a multi-part photodetector which is made up of multiple photodetector parts.

The optical pickup 101 may be designed to monitor a portion of the lights emitted from the light sources LD1 and LD2 by the same light receiving unit. Similarly, the same light receiving unit may be used to receive the reflected light from the information recording medium 100 regardless of the light source which irradiates the light on the information recording medium 100.

A detection signal processor 4 receives the detection signals output from the light receiving units PD1, PD3 and PD4, and carries out processes such as offset adjustment and gain adjustment with respect to the detection signals.

A servo signal computing processor 13 generates servo error signals from the detection signals output from the detection signal processor 4. At the same time, the servo signal computing processor 13 carries out an offset adjustment and a gain adjustment with respect to the servo error signals, and supplies the adjusted servo error signals to a servo processor 14.

An RF selector 5 receives the detection signals output from the light receiving units PD1 and PD4, and selects signals to be supplied to circuits in subsequent stages or carries out an add-subtract operation or the like with respect to the signals to be supplied to the circuits in the subsequent stages.

A wobble signal generator 6 detects a wobble which is preformatted on the recordable information recording medium, based on the output signal of the RF selector 5, and generates a wobble signal.

A wobble signal processor 15 extracts a binarized wobble signal from the wobble signal which is generated by the wobble signal generator 6, and supplies the binarized wobble signal to a WCK generator 17 and a rotation controller 18. The wobble signal processor 15 also demodulates address information which is modulated into the wobble according to a predetermined rule depending on each information recording medium, and supplies the address information to a controller 19. The controller 19 corresponds to the controller 106 shown in FIG. 3.

An RF signal processing and PLL section 16 generates a binarized RF signal from the reproduced RF signal which is received from the RF selector 5, and carries out a demodulation depending on the modulation rule (scheme) of the information recording medium 100 from which the information is being reproduced. In addition, The RF signal processing and PLL section 16 extracts a reproducing clock from the binarized RF signal The demodulated data is supplied to the controller 19. Further, the RF signal processing and PLL section 16 extracts the rotation control signal from the synchronizing signal which is inserted at predetermined intervals with respect to the binary RF signal, and supplies the rotation control signal to the rotation controller 18.

The rotation controller 18 generates a spindle error signal for controlling rotation, based on the signal output from the wobble signal processor 15 or the RF signal processing and PLL unit 16, and supplies the spindle error signal to the servo processor 14. When carrying out the constant angular velocity (CAV) control to rotate the information recording medium at a constant angular velocity, the spindle error signal may be generated from a disk rotation signal which indicates the rotation of the information recording medium and is output from a rotation control and driving unit (not shown).

The servo processor 14 generates a servo control signal from the various servo error signals, based on an instruction from the controller 19. The servo control signal is supplied to a servo driver 7.

The servo driver 7 generates a servo drive signal based on the servo control signal from the servo processor 14. Each driving unit carries out a servo control operation depending on a corresponding servo drive signal supplied thereto. The servo control operations in this embodiment include a focus control, a tracking control, a seek control, a spindle control and a tilt control.

The WCK generator 17 generates a recording clock signal WCK based on the binarized wobble signal which is received from the wobble signal processor 15. The recording clock signal WCK is supplied to an LD modulating signal generator 10 of an LD modulating signal generator integrated circuit (second integrated circuit) 2, and the controller 19. At the time of the recording, the generation of the recording data and the like are carried out with reference to the recording clock signal WCK.

At the time of the recording, a recording data signal Wdata is supplied from the controller 19 to the LD modulating signal generator 10 in synchronism with the recording clock signal WCK. The recording data signal Wdata is obtained by modulating the recording data which is to be recorded on the information recording medium 100 according to a predetermined rule.

The LD modulating signal generator 10 generates an LD modulating signal for modulating the light source LD1 or LD2, based on the recording clock signal WCK from the WCK generator 17 and the recording data signal Wdata from the controller 19. The LD modulating signal is supplied to an LD driving unit 12 of an LD driving integrated circuit (first integrated circuit) 3.

An LD controller 9 of the LD driving integrated circuit 3 receives the detection signal from the light receiving unit PD2 or PD5, and supplies an LD control signal to control the LD driving unit 12 based on the received detection signal, so that the amount of light emitted from the light source LD1 or LD2 becomes a desired value. In other words, a so-called automatic power control (APC) is carried out to automatically control the recording power.

The LD driving unit 12 supplies a driving current to the light source LD1 or LD2 so as to emit light therefrom, based on the LD control signal from the LD controller 9 and the LD modulating signal from the LD modulating signal generator 10.

The controller 19 also outputs control signals which are supplied to various parts of the information recording and reproducing apparatus.

Next, a description will be given of the light sources LD1 and LD2 which are the target of the driving and control.

Normally, an optical output Po of a laser diode (LD) with respect to an LD driving current ILD can be approximated by a computation process based on the following formula (1), where $\eta$ denotes a differential quantum efficiency and Ith denotes a threshold current.

$$Po=\eta \cdot (ILD-Ith) \qquad (1)$$

Figure 5:
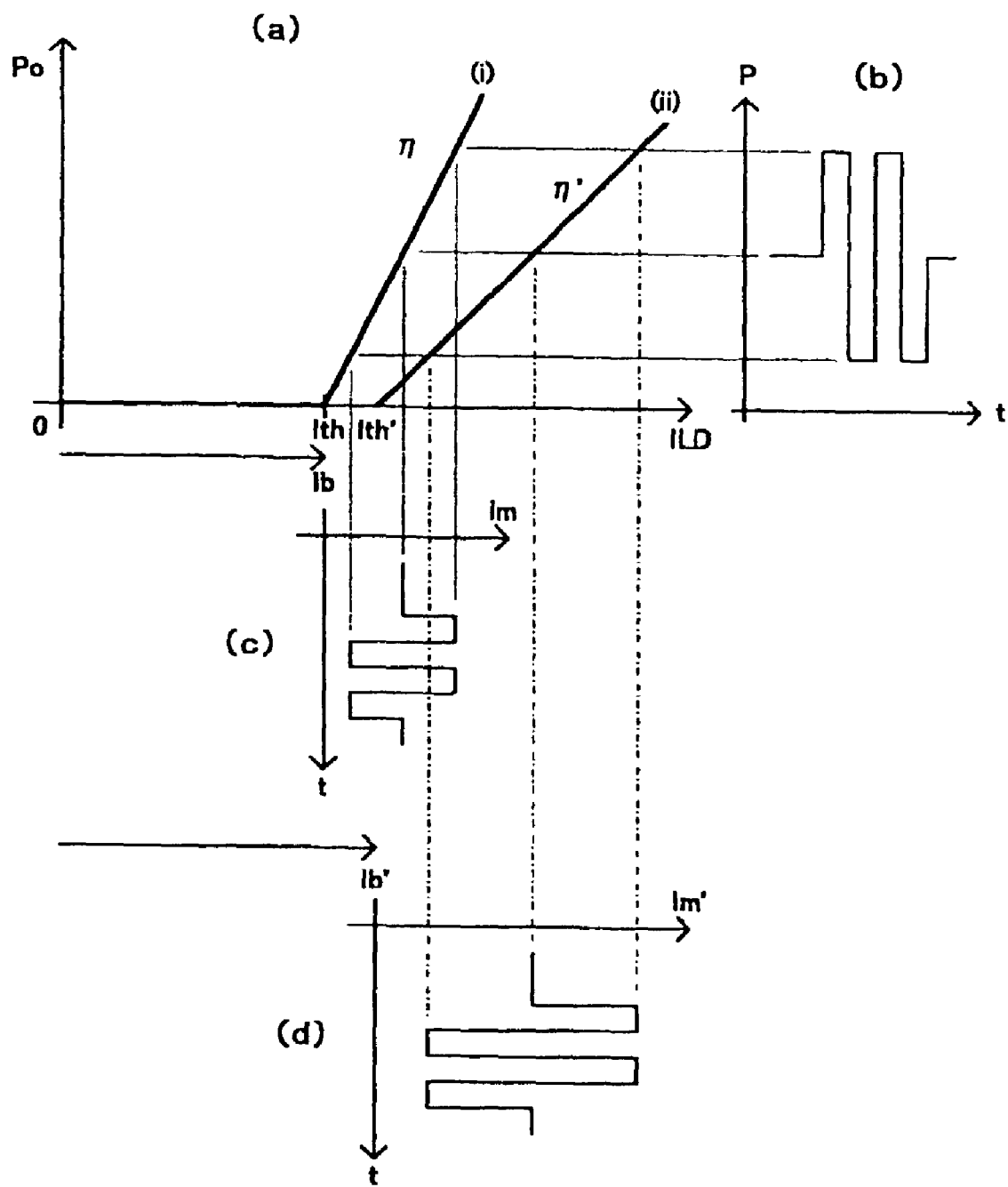
FIG. 5 is a diagram showing a driving current versus optical output characteristic of the light sources.

FIG. 5 is a diagram showing a driving current versus optical output characteristic of the light sources LD1 and LD2. In FIG. 5, (a) shows the characteristic of the optical output Po with respect to the LD driving current ILD applied to the light source (LD), where (i) and (ii) show cases where the differential quantum efficiency ($\eta$, $\eta'$) and the threshold current (Ith, Ith') respectively deviate. In FIG. 5, (c) shows the amount of LD driving current ILD, which take a value corresponding to a sum of a constant bias current Ib and a modulating current Im, and shows the waveform with respect to time t. In a case where the light source (LD) has the characteristic (i) and the LD driving current ILD shown in FIG. 5(c) is applied, an optical modulated waveform P shown in FIG. 5(b) is obtained. Similarly, in a case where the light source (LD) has the-characteristic (ii) and the current corresponding to the sum of the bias current Ib' and the modulating current Im' as shown in FIG. 5(d), the optical modulated waveform P shown in FIG. 5(b) is obtained.

In other words, as shown in FIG. 5(a), when setting the LD driving current ILD to the sum (Ib+Im) of the bias current Ib and the modulating current Im in order to obtain the desired optical modulated waveform P, the bias current Ib should be set approximately equal to the threshold current Ith, and the modulating current Im should be set so that the optical modulated waveform P becomes $P=\eta \cdot Im$ as shown in FIG. 5(b).

But in general, the threshold current Ith and the differential quantum efficiency $\eta$ not only vary depending on the individual light source (LD) but also vary depending on a temperature change. For this reason, it is desirable to control the bias current Ib and the modulating current Im depending on the variation of the threshold current Ith and the differential quantum efficiency $\eta$, in order to constantly obtain the desired optical modulated waveform P.

For example, if the threshold current Ith and the differential quantum efficiency $\eta$ shown in (i) of FIG. 5(a) change to threshold current Ith' and the differential quantum efficiency $\eta'$ as shown in (ii) the bias current Ib' should be controlled to be approximately equal to the threshold current Ith', and the modulating current Im' should be controlled so that the optical modulated waveform P becomes $P=\eta' Im'$.

Figure 1:
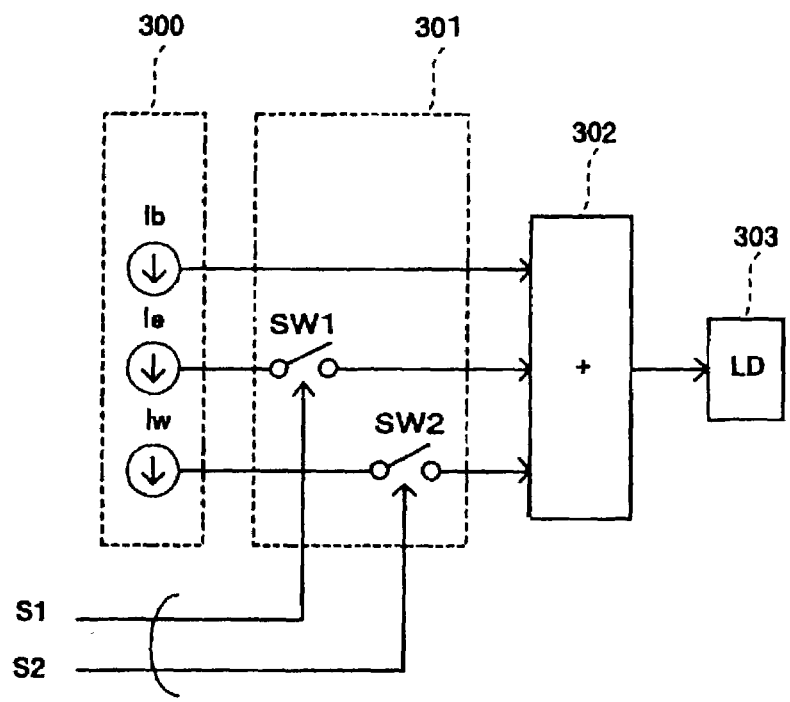
FIG. 1 is a system block diagram showing an example of a conventional LD driver.
Figure 2:
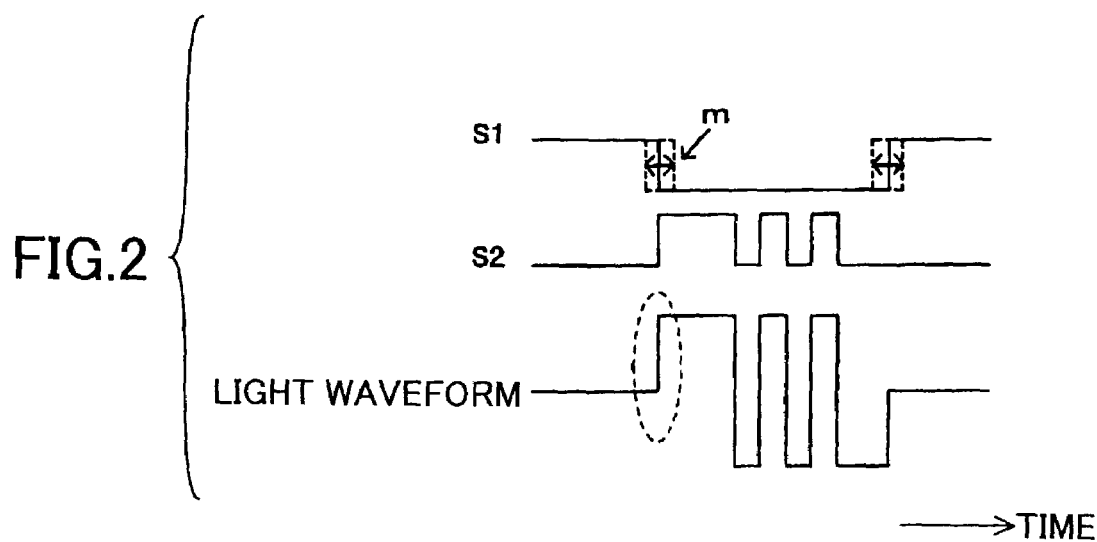
FIG. 2 is a timing chart for explaining the operation of the conventional LD driver.

The LD controller 9 shown in FIG. 2 has the functions of carrying out such controls.

Figure 6:
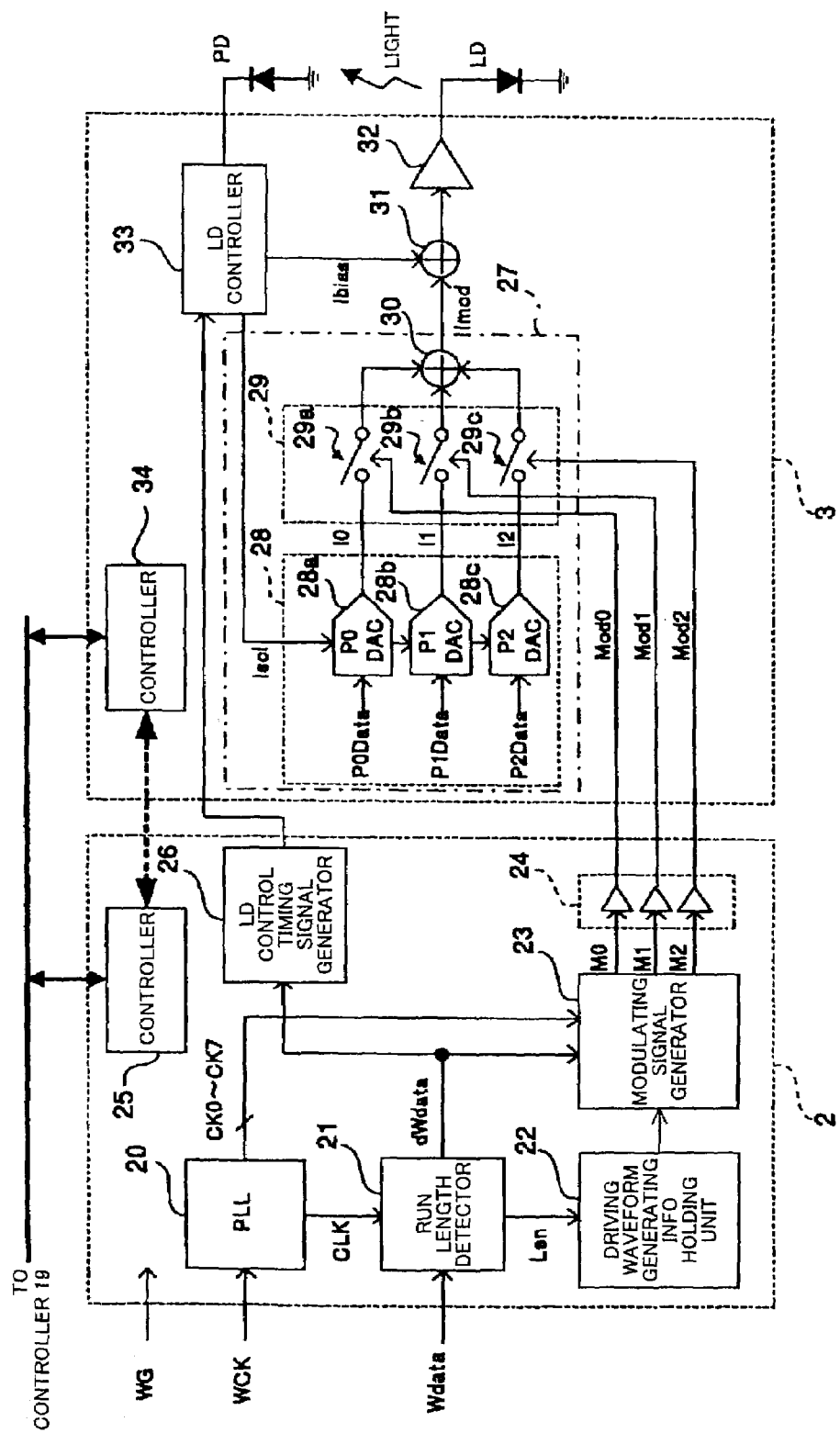
FIG. 6 is a system block diagram showing a first embodiment of a light source driving unit according to the present invention.

Next, a description will be given of the first embodiment of the light source driving unit, by referring to FIG. 6. FIG. 6 is a system block diagram showing the structure of the first embodiment of the light source driving unit.

The light source driving unit has the LD modulating signal generator integrated circuit 2 which includes the LD modulating signal generator 10, and the LD driving integrated circuit 3 which includes the LD controller 9 and the LD driving unit 12. The integrated circuits 2 and 3 are produced by different production processes. The LD driving integrated circuit 3 is arranged in a vicinity of the laser diode (LD) 102 which is to be driven, and is mounted on the optical pickup 101 shown in FIG. 3.

A phase locked loop (PLL) section 20, a run length detector 21, a driving waveform generating information holding unit 22 and a modulating signal generator 23 of the LD modulating signal generator integrated circuit 2 function as a modulating signal generating means for generating a plurality of modulating signals based on driving waveform generating information for the light source. In addition, a current source unit 28 and a switching unit 29 of a modulating section 27 within the LD driving integrated circuit 3 function as a current source selecting means (or section) for selecting one or a plurality of currents output from a plurality of current sources, based on the modulating signals generated by the modulating signal generating means (or section). Moreover, adders 30 and 31 and a current driver 32 of the LD driving integrated circuit 3 function as a light source driving means (or section) for driving the light source to generate multi-level light by generating and supplying to the light source a current having a multi-level amount based on the one or plurality of currents selected by the current source selecting means (or section). Furthermore, a delay adjuster 24 of the LD modulating signal generator integrated circuit 2 functions as a cancelling means (or section) for adding a signal error amount which cancels differences in the amounts of signal delays generated between the modulating signal generating means (or section) and the light source driving means (or section) at a stage prior to the current source selecting means (or section).

In the LD modulating signal generator integrated circuit 2, the LD modulating signal generator 10 includes the PLL section 20 and the run length detector 21. The PLL section 20 generates a clock signal PCK by multiplying n to the frequency of the recording clock signal WCK, and a plurality of clock signals CK0 through CK7 having predetermined phase differences from the clock signal PCK. The run length detector 21 detects the run length of the recording data signal Wdata which is received from the controller 19 shown in FIG. 4 corresponding to the controller 106 shown in FIG. 6, and supplies a run length signal Len to the driving waveform generating information holding unit 22. The run length detector 21 also outputs a delayed recording data signal dWdata by delaying the recording data signal Wdata by a predetermined amount.

The driving waveform generating information holding unit 22 functions as a driving waveform generating information holding means (or section) for storing driving waveform generating information based on the driving waveform of the light source LD, and outputting driving waveform generating information corresponding to the run length signal Len depending on the delayed recording data signal dWdata. The modulating signal generator 23 functions as a modulating signal generating means (or section) for generating modulating signals M0 through M2 from the driving waveform generating information output from the driving waveform generating information holding unit 22. The delay adjuster 24 functions as a delay adjusting means (or section) for delaying each of the modulating signals M0 through M2 by a predetermined amount to supply modulating signals Mod0 through Mod2. An LD control timing signal generator 26 of the LD modulating signal generator integrated circuit 2 generates an LD control timing signal from the delayed recording data signal dWdata or the recording data signal Wdata. A controller 25 of the LD modulating signal generator integrated circuit 2 supplies a control signal to various parts of the information recording and reproducing apparatus in response to a control command received from the controller 19 shown in FIG. 4.

On the other hand, in the LD driving integrated circuit 3, the modulating section 27 generates an LD modulating current Imod based on irradiating level data P0Data, P1Data and P2Data respectively corresponding to irradiating levels P0, P1 and P2 of the light source LD (corresponding to the light sources LD1 and LD2 shown in FIG. 4) and the modulating signals Mod0, Mod1 and Mod2. The LD controller 33 generates a bias current Ibias and a scale signal Iscl which instructs scaling of the modulating current, based on the detection signal of the monitoring light receiving unit PD (corresponding to the light receiving units PD2 and PD5 shown in FIG. 4), so that the amount of light emitted from the light source LD becomes a desired value. The adder 31 adds the LD modulating current Imod and the bias current Ibias. The current driver 32 amplifies the current from the adder 31 and outputs an LD driving current ILD for the light source LD. The controller 34 supplies control signals to various parts of the information recording and reproducing apparatus in response to a control command which is received from the controller 19 or, received from the controller 19 via the controller 25. Hence, the modulating section 27, the adder 31, the current driver 32, the LD controller 33 and the controller 34 function as the light source driving means (or section).

The modulating section 27 includes the current source unit 28, the switching (SW) unit 29, and the adder 30. The current source unit 28 includes three current sources (digital-to-analog converters; DACs) 28a, 28b and 28c for respectively supplying currents I0, I1 and I2 based on the irradiating level data P0Data, P1Data and P2Data. The switching unit 29 includes three switches 29a, 29b and 29c for respectively controlling ON/OFF states of the currents I0, I1 and I2 depending on the modulating signals Mod0, Mod1 and Mod2. The adder 30 adds the currents output from the switching unit 29, and outputs the LD modulating current Imod.

The LD controller 33 shown in FIG. 6 corresponds to the LD controller 9 shown in FIG. 4. In addition, the modulating section 27 (including the current source unit 28, the switching unit 29 and the adder 30), the adder 31, the current driver 32 and the controller 34 shown in FIG. 6 correspond to the internal structure of the LD driving unit 12 shown in FIG. 4.

In this first embodiment, the combinations of the current source unit 28, the switching unit 29 and the modulating signals Mod may be increased if necessary.

Figure 7:
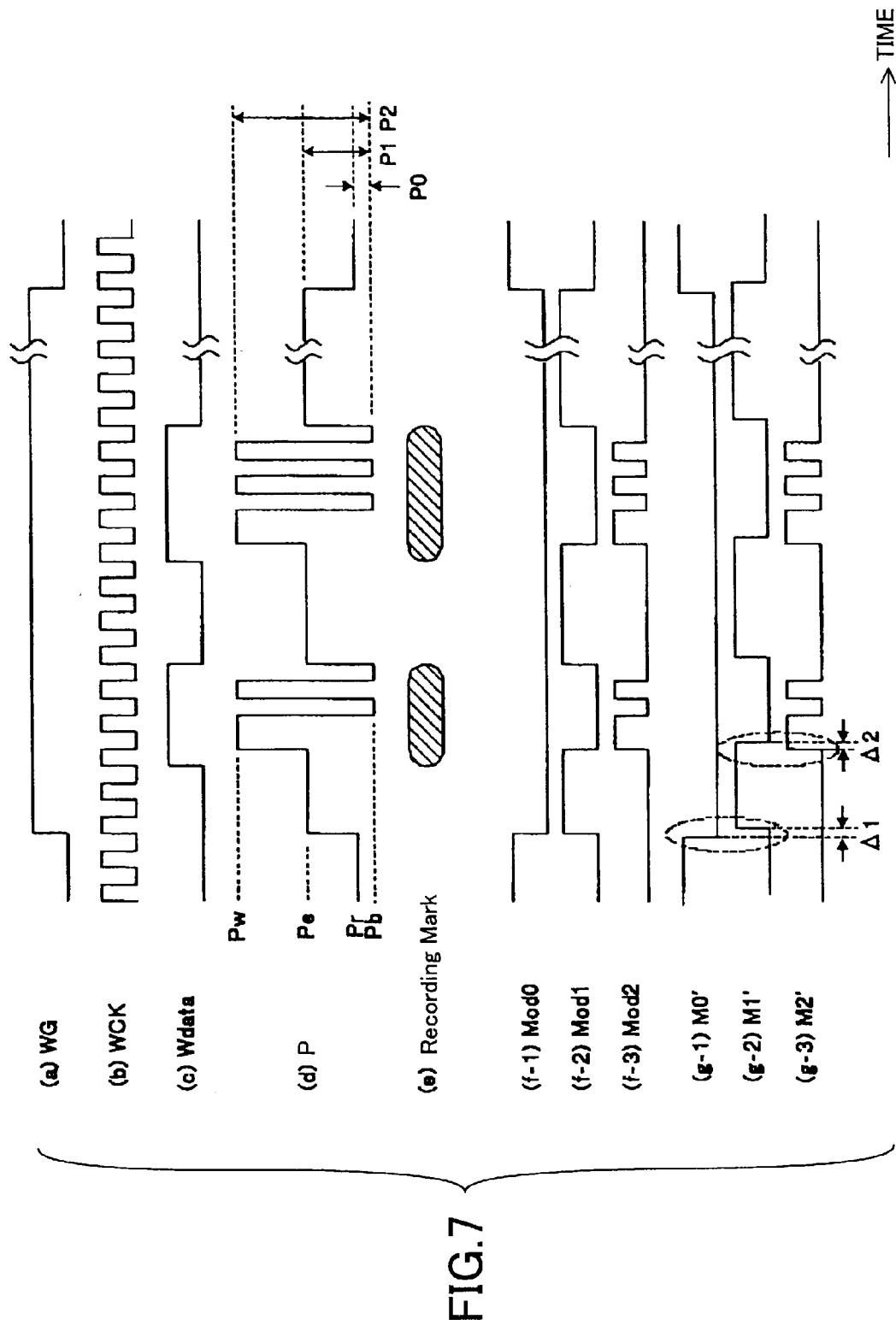
FIG. 7 is a timing chart showing signal waveforms at various parts of the light source driving unit shown in FIG. 6.

In order to simplify the description, it is assumed for the sake of convenience that the recording is carried out in three levels as shown in FIG. 7.

FIG. 7 is a timing chart showing signal waveforms at various parts of the light source driving unit shown in FIG. 6. In this case, it is assumed for the sake of convenience that the information recording medium 100 used is a phase change type information recording medium such as the CD-RW disk, the DVD-RW disk and the DVD+RW disk. In addition, it is assumed that the light source LD is controlled to emit light with the optical modulated waveform P shown in FIG. 7(d) and recording marks shown in FIG. 7(e) are formed on a recording surface of the information recording medium 100, based on the recording data signal Wdata shown in FIG. 7(c) and the recording clock signal WCK shown in FIG. 7(b).

In time chart of FIG. 7 and the other time charts which will be described later, the same designations are used for the corresponding signals. Further, in the time charts, a symbol "↑" indicates a rising edge, and a symbol "↓" indicates a falling edge.

A write gate signal WG shown in FIG. 7(a) instructs the switching between the recording and reproduction. The light source LD emits the light at a reproducing power Pr during a low-level period of the write gate signal WG. The light source LD emits the light based on the recording data signal Wdata and the recording clock signal WCK during a high-level period of the write gate signal WG.

FIGS. 7(f-1), 7(f-2) and 7(f-3) show the modulating signals Mod0, Mod1 and Mod2 which control the switching of the switching unit 29, in a state where no skew exists or, in a state where the skew is corrected by the delay adjuster 24.

FIGS. 7(g-1), 7(g-2) and 7(g-3) show modulating signals M0', M1' and M2' which are obtained when the switching is carried out without the use of the delay adjuster 24, similarly as in the case of the conventional information recording and reproducing apparatus. In this case, a skew Δ1 is generated between the modulating signals M0' and M1', and a skew Δ2 is generated between the modulating signals M1' and M2'.

This first embodiment corrects the skews Δ1 and Δ2 in the following manner, so that the modulating signals Mod0 through Mod2 shown in FIGS. 7(f-1) through 7(f-3) are obtained.

The skew may be generated when the modulating signal generator 23 generates the outputs, during transfer to the switching unit 29, and when carrying out the switching in the switching unit 29. The skew may be caused by a difference in the wiring lengths, a difference in line impedances, load characteristics, and inconsistencies of devices. The skew referred to in the present invention includes the skew generated by such causes.

Generally, the recording marks are formed on the phase change type information recording medium using 3-level multi-pulses having a write power Pw, an erase power Pe and a bottom power Pb of the optical modulated waveform P. An accurate recording can be made by accurately controlling the recording power level and the pulse width and pulse intervals of each of the pulses.

When the recording marks are formed on the information recording medium, thermal effects may cause the edges of the recording marks, to vary according to the adjacent space lengths, depending on the information recording medium or the recording linear velocity used.

In order to avoid the edges of the recording marks from varying, each pulse width of the optical modulated waveform is conventionally varied by taking into consideration the adjacent space length.

Next, a more detailed description will be given of the structure and operation of the optical light source driving unit shown in FIG. 6.

[PLL Section]

Figure 8:
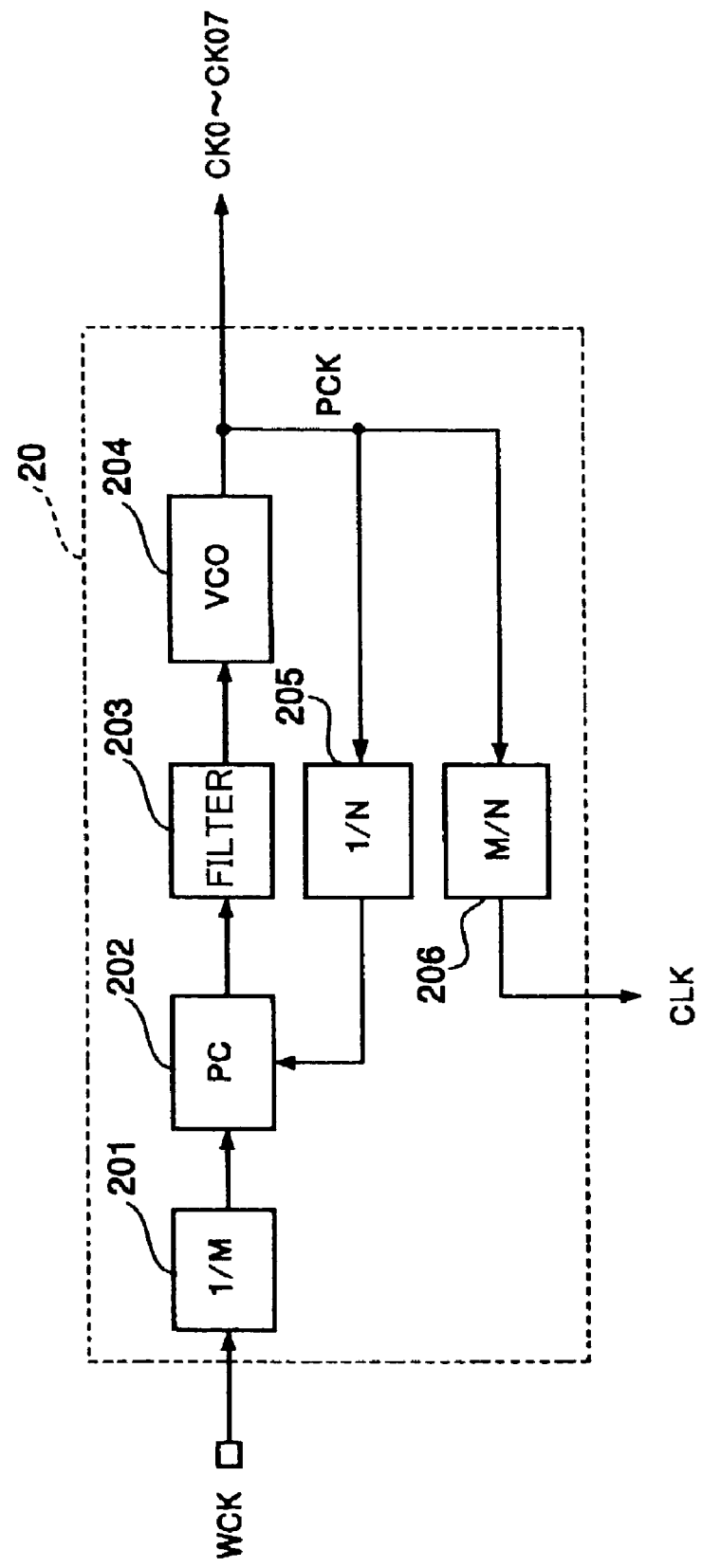
FIG. 8 is a system block diagram showing a more detailed internal structure of a PLL section shown in FIG. 6.

FIG. 8 is a system block diagram showing a more detailed internal structure of the PLL section 20 shown in FIG. 6.

The PLL section 20 includes a 1/M frequency divider 201, a phase comparator (PC) 202, a loop filter 203, a voltage controlled oscillator (VCO) 204, a 1/N frequency divider 205, and a M/N frequency divider 206. The 1/M, 1/N and M/N frequency dividers 201, 205 and 206 respectively divide the frequency of an input signal thereto by M, N and N/M. The operation of each part of the PLL section 20 is similar to that of a generally known PLL circuit, and a detailed description thereof will be omitted.

The PLL section 20 generates the clock signal PCK by multiplying n to the frequency of the recording clock signal WCK. Then, the PLL section 20 generates a plurality of clock signals having predetermined phase differences from the clock signal PCK. The PLL section 20 also generates a channel clock signal CLK. In this first embodiment, the PLL section 20 generates 8 clock signals CK0 through CK7 having the predetermined phase differences from the clock signal PCK.

The 1/M frequency divider 201 frequency-divides the recording clock signal WCK by M. The frequency-dividing ratio 1/M may be variably set to M=2 or 4, for example, and correspond to a case where the recording clock signal WCK is supplied by frequency-dividing the recording channel clock signal CLK. The noise generation is reduced by transferring the recording clock signal WCK at a reduced frequency.

The oscillator 204 generates m clock signals having predetermined phase differences from the clock signal PCK, and supplies the m clock signals to the modulating signal generator 23. In this first embodiment, m=8 and the 8 clock signals CK0 through CK7 are generated. The oscillator 201 may be formed by a ring oscillator, for example.

The 1/N frequency divider 205 frequency-divides one of the clock signals output from the oscillator 204, that is, the clock signal CK0, for example, by N. The frequency-dividing ratio 1/N of the 1/N frequency divider 205 may be variably set, and N/M becomes the multiplying coefficient n of the clock signal PCK with respect to the recording clock signal WCK.

The M/N frequency divider 206 frequency-divides the clock signal PCK by N/M to generate the recording channel clock signal CLK, and supplies this recording channel clock signal CLK to the run length detector 21 shown in FIG. 6.

As will be described later, the LD modulating signals Mod0 through Mod2 are generated using the clock signals CK0 through CK7 as references.

In other words, the pulse width setting resolving power of the LD modulating signal Mod can be set by setting the frequency-dividing ratios 1/N and 1/M. For example, if it is assumed that the supplied recording clock signal WCK is transferred at the same frequency as the recording channel clock signal CLK and M=4 and N=16, the frequency of the clock signal PCK becomes 4 times the frequency of the recording channel clock signal CLK, and the LD modulating signal Mod can be generated at a pulse width setting resolving power which is 1/32 (=m·M/N) with respect to the recording channel clock signal CLK. This will hereinafter be referred to as a pulse width setting step or simply step. In this particular case, 32 steps correspond to 1 channel clock period.

[Run Length Detector]

The run length detector 21 detects the run length of the recording data signal Wdata which is supplied from the controller 19, and supplies the run length signal Len to the driving waveform generating information holding unit 22. The recording data signal Wdata is a non-return-to-zero inverted (NRZI) binary signal indicating the recording mark by a high-level period and indicating a space by a low-level period. In other words, the run length detector 21 detects the mark length and the space length of the recording data. It is assumed in this case that a run length signal Len1 indicates a mark length, a run length signal Len0 indicates an immediately preceding space length, and a run length signal Len2 indicates an immediately subsequent space length.

The run length detector 21 is constructed depending on minimum and maximum run lengths of the recording data signal Wdata. In this first embodiment, it is assumed that the optical information recording and reproducing apparatus records the recording data signal Wdata on the DVD format information recording medium (DVD+RW disk, DVD-R disk, DVD-RAM disk or the like), and the recording data signal Wdata is subjected to EFM+modulation. In other words, the run length is assumed to be 3T to 11T and 14T, where T denotes the channel clock period.

The run length detector 21 takes into consideration a predetermined time necessary to detect the run length, the delay times of the various circuits and the like, and delays the recording data signal Wdata by a predetermined amount so as to supply the delayed recording data signal dWdata to the modulating signal generator 23 and the LD control signal generator 26 shown in FIG. 6.

Figure 9:
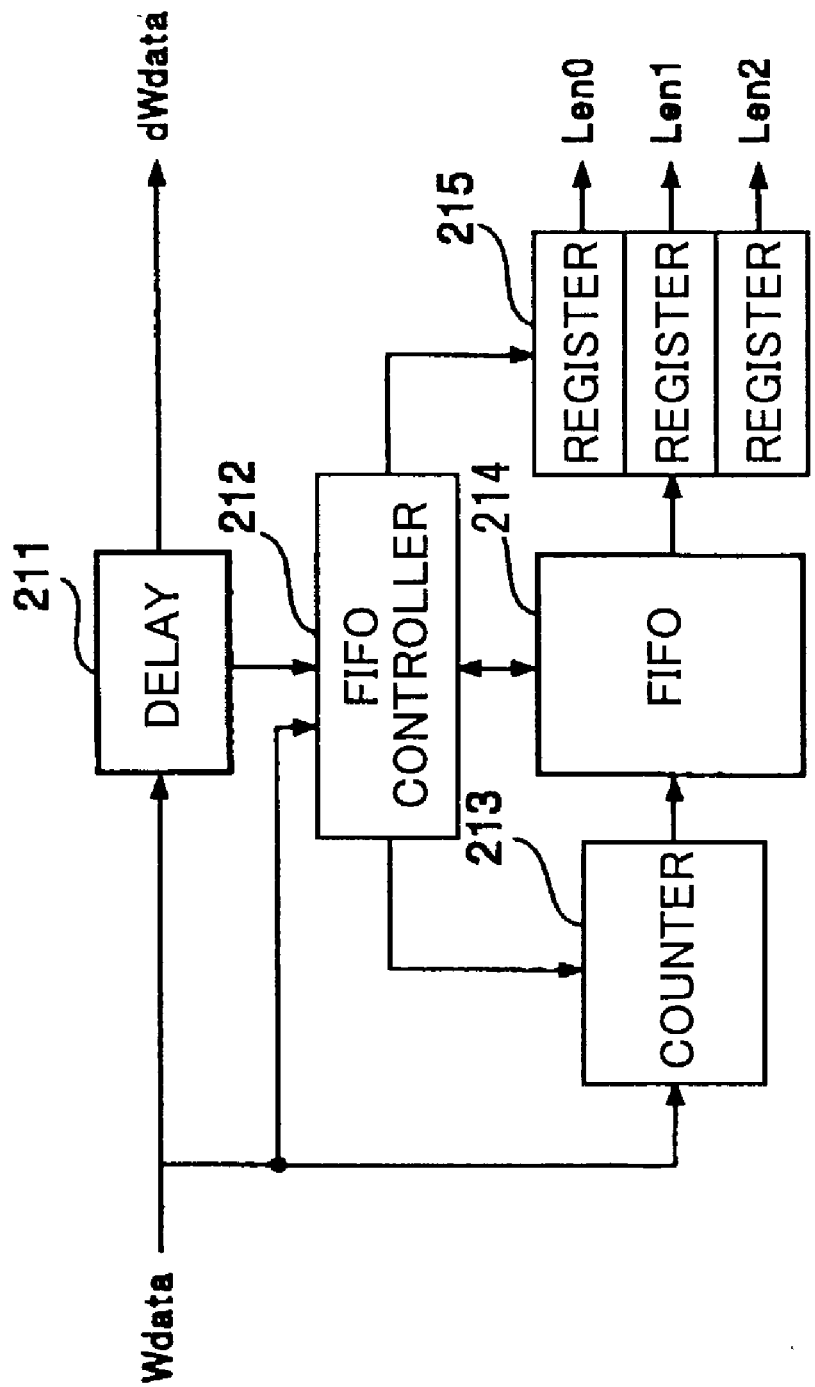
FIG. 9 is a system block diagram showing the internal structure of a run length detector shown in FIG. 6.

FIG. 9 is a system block diagram showing the internal structure of the run length detector 21 shown in FIG. 6. In addition, FIG. 10 is a timing chart showing signal waveforms at various parts of the run length detector shown in FIG. 9.

As shown in FIG. 9, the run length detector 21 includes a delay circuit 211, a first-in-first-out (FIFO) controller 212, a counter 213, a FIFO 214, and a register 215.

Figure 10:
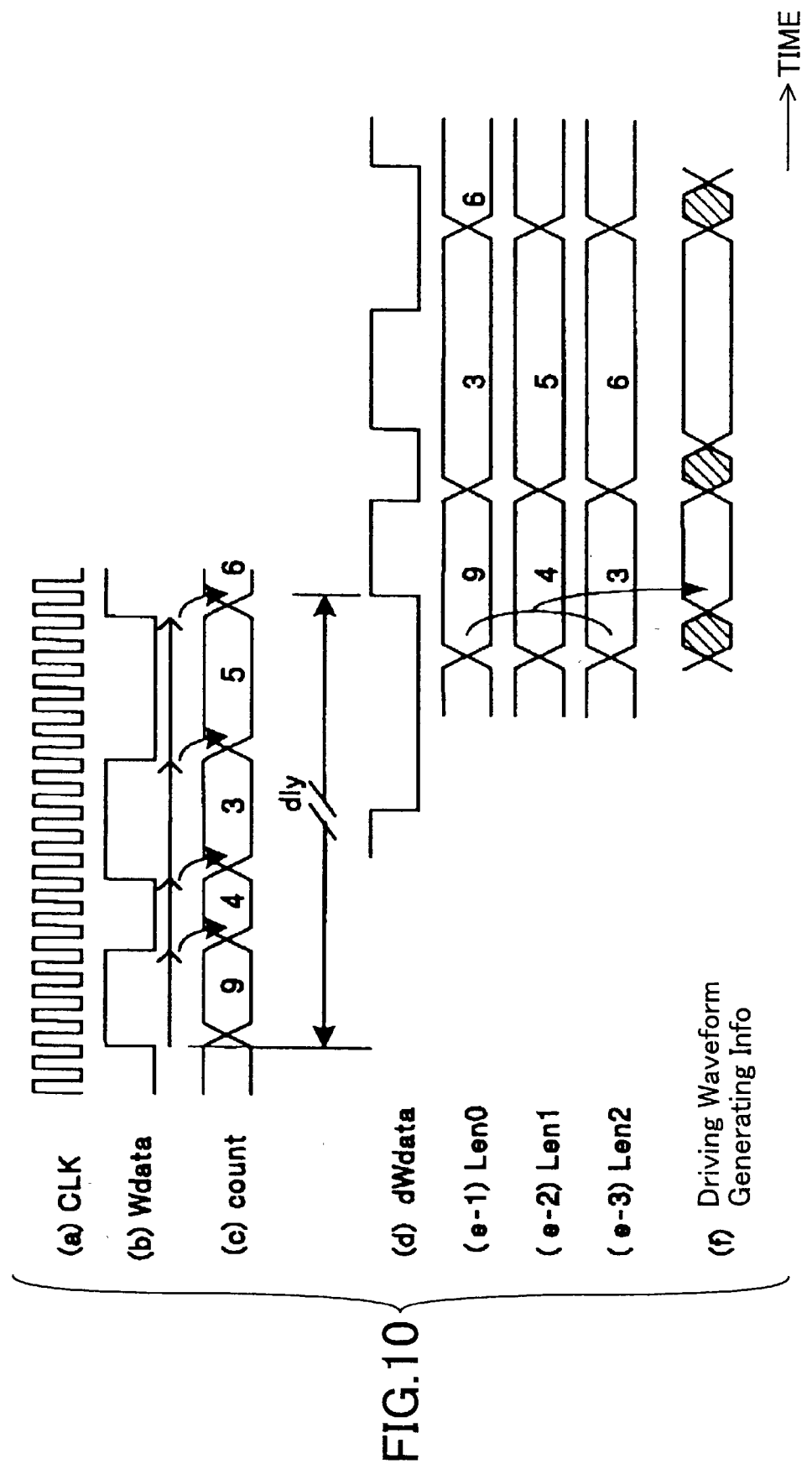
FIG. 10 is a timing chart showing signal waveforms at various parts of the run length detector shown in FIG. 9.

The counter 213 counts a run length, that is, the high-level period and the low-level period of the recording data signal Wdata shown in FIG. 10(*b*), in response to the recording channel clock signal CLK shown in FIG. 10(*a*), and outputs a count signal (count) shown in FIG. 10(*c*).

The run length data counted by the counter 213 is temporarily and successively held by the FIFO 214.

The delay circuit 211 is made up of a shift register and the like, and delays the recording data signal Wdata by a predetermined delay time dly, so as to output the delayed recording data signal dWdata shown in FIG. 10(*d*). In addition, the delay circuit 211 also generates signals having different delay times for generating the various control signals, and supplies these signals to the FIFO controller 212.

The FIFO controller 212 generates control signals for controlling write and read of the FIFO 214 and for controlling various parts of the run length detector 21. The register 215 holds and outputs the run length data (Len0, Len1 and Len2) read from the FIFO 214.

The FIFO controller 212 supplies the control signals so that the read timing of the FIFO 214 (hold timing of the register 215) matches that of the delayed recording data signal dWdata.

In other words, as shown in FIGS. 10(*e*-1), 10(*e*-2) and 10(*e*-3), the mark length Len1, the immediately preceding space length Len0 and the immediately subsequent space length Len2 are adjusted so as to match the delayed recording data signal dWdata. Alternatively, the driving waveform generating information which is converted by the run length data Len0 through Len2 is adjusted so as to match the delayed recording data signal dWdata, as shown in FIG. 10(*f*).

The delay time dly and the size of the FIFO 214 may be determined by taking into consideration the minimum and maximum run lengths of the recording data signal Wdata and the delay times of the various circuits, so that no empty or full state of the FIFO 214 occurs.

[Driving Waveform Generating Information Holding Unit]

The driving waveform generating information holding unit 22 is formed by a memory which stores the driving waveform generating information. The driving waveform generating information holding unit 22 outputs driving waveform generating information corresponding to the run length data Len0 through Len2 which are received from the run length detector 21, depending on the delayed recording data signal dWdata.

Figure 11:
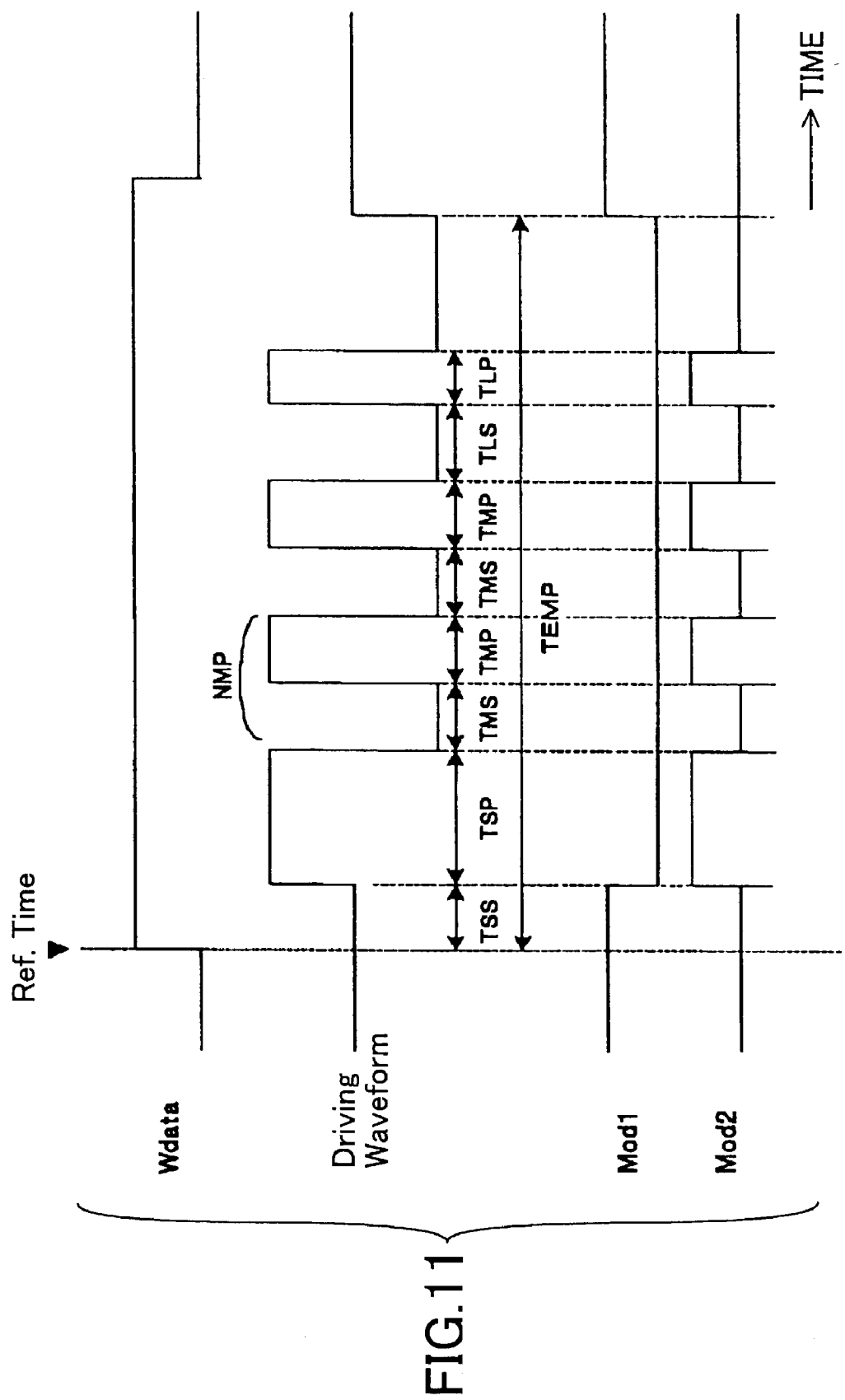
FIG. 11 is a timing chart for explaining a relationship of driving waveform generating information and an optical waveform.

FIG. 11 is a timing chart for explaining a relationship of the driving waveform generating information and the optical waveform.

The driving waveform generating information includes timing information which indicates irradiation level changing timings of the optical waveform. This timing information is described by the number of the pulse width setting steps, and as shown in FIG. 11, the changing timings are determined by accumulating each timing information (TSS, TSP, TMS, TMP, TLS, TLP) from a reference time. For example, the reference time may be a rising edge of the delayed recording data signal dWdata. In FIG. 11, NMP indicates a repetition number of the timing information TMS and TMP, and NMP=2 in this particular case shown.

In other words, the rise and fall timings, that is, transition timings of the modulating signal Mod1 is determined by the timing information TSS and TEMP which indicates the high-level period of the recording data signal Wdata. In addition, the transition timings of the modulating signal Mod2 are determined by each of the timing information TSS, TSP, TMS, TMP, TLS, TLP.

Accordingly, it is possible to arbitrarily set the multi-pulse period and duty cycle (or duty ratio) in the above described manner.

In this first embodiment, the driving waveform is varied depending on the mark length and the adjacent space lengths of the recording data signal Wdata, so as to control the edge positions of the recording marks which are to be formed with a high accuracy.

When the recording mark is formed on the information recording medium, thermal effects may cause the edges of the recording mark to vary according to the adjacent space length. Hence, this embodiment varies the driving waveform by taking into consideration the adjacent space lengths, so as to avoid the edges of the recording mark from varying.

In other words, the driving waveform generating information corresponding to combinations of the mark length and the immediately preceding and immediately subsequent space lengths is stored in the driving waveform generating information holding unit 22, and the driving waveform generating information corresponding to the run length data Len0 through Len2 detected by the run length detector 21 is output from the driving waveform generating information holding unit 22.

In a case where the mark lengths and the adjacent space lengths are greater than a predetermined value, the thermal effects and variations of the edges of the recording marks caused thereby are small. For this reason, it is unnecessary to prepare the driving waveform generating information for all combinations of the mark length and the immediately preceding and immediately subsequent space lengths, and the required memory capacity of the driving waveform generating information holding unit 22 can be reduced by preparing and storing only the driving waveform generating information with respect to the combinations which have large effects on the edges of the recording marks. In addition, this first embodiment also changes the combinations which are prepared depending on parameters, so as to simultaneously reduce the required memory capacity and accurately control the shape of the recording marks.

[Modulating Signal Generator]

The modulating signal generator 23 generates the modulating signal M0 through M2 based on the driving waveform generating information (timing information) from the driving waveform generating information holding unit 22, and supplies the modulating signals M0 through M2 to the delay adjuster 24. The modulating signals M0 through M2 are generated with references to the clock signals CK0 through CK7, and times corresponding to the phase differences of the clock signals CK0 through CK7 determine the pulse width setting resolving power of the modulating signals M0 through M2.

Figure 12:
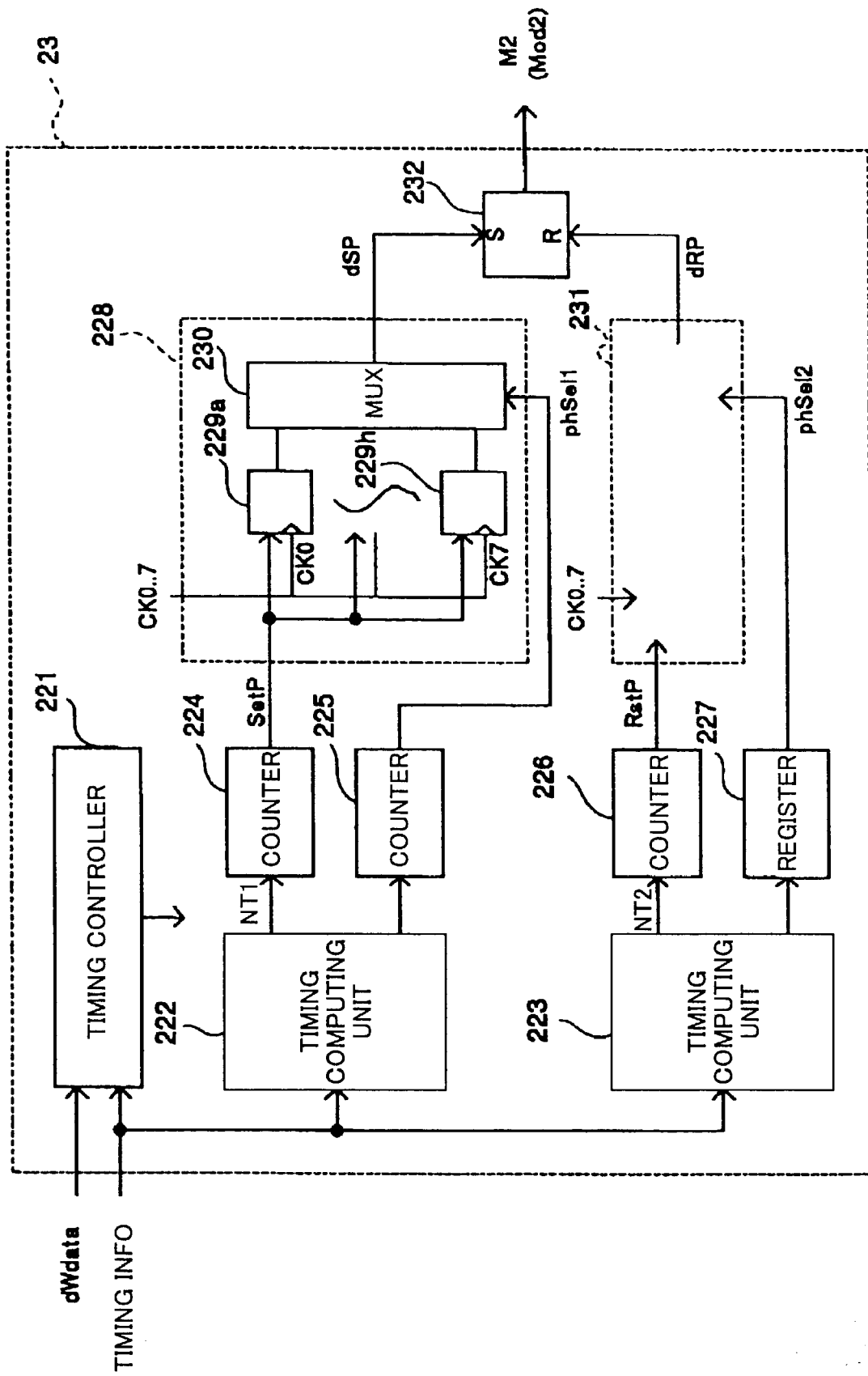
FIG. 12 is a system block diagram showing the internal structure of a modulating signal generator shown in FIG. 6.
Figure 13:
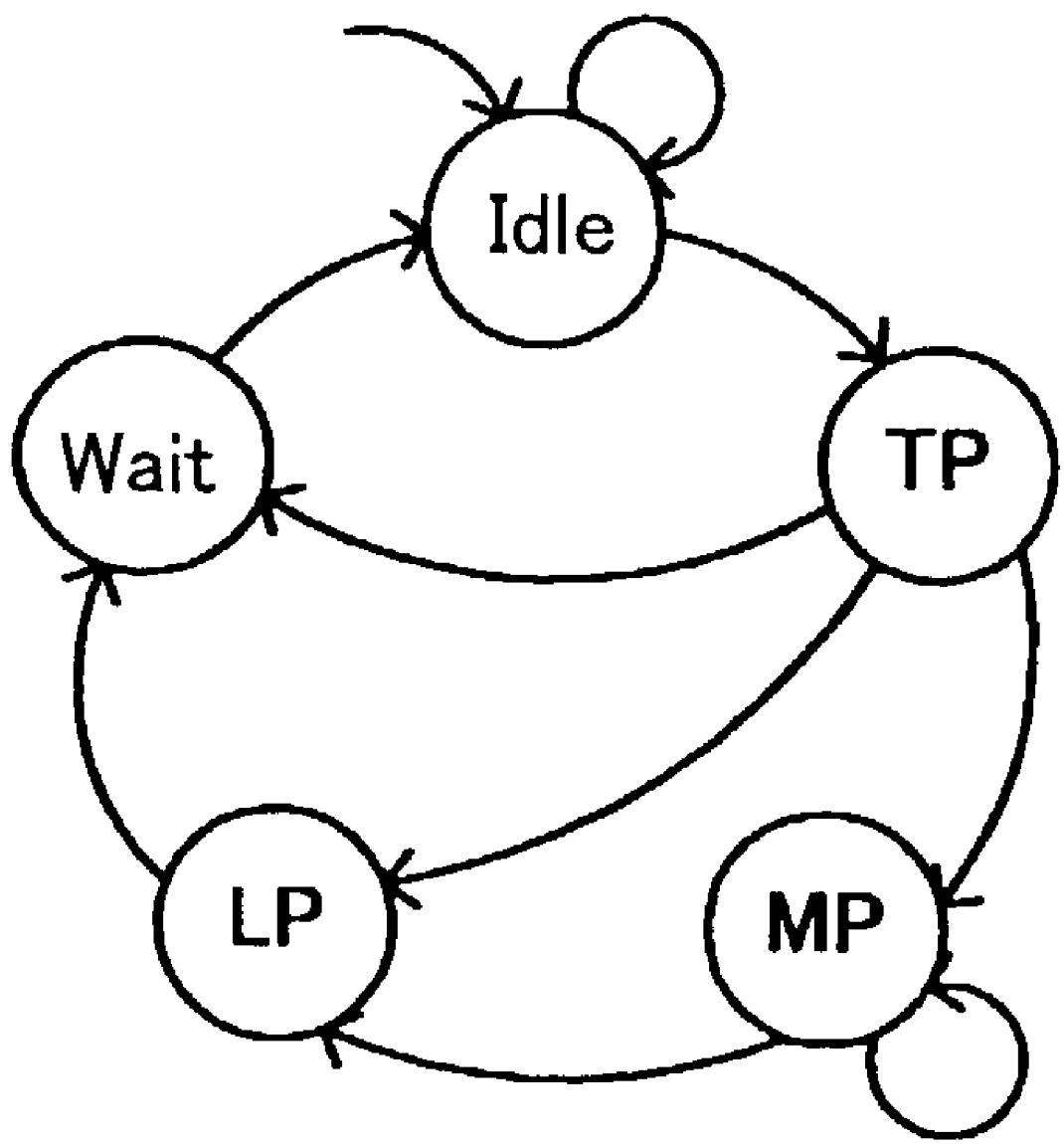
FIG. 13 is a state transition diagram of a sequencer for generating control signals of the modulating signal generator by a timing controller shown in FIG. 12.
Figure 14:
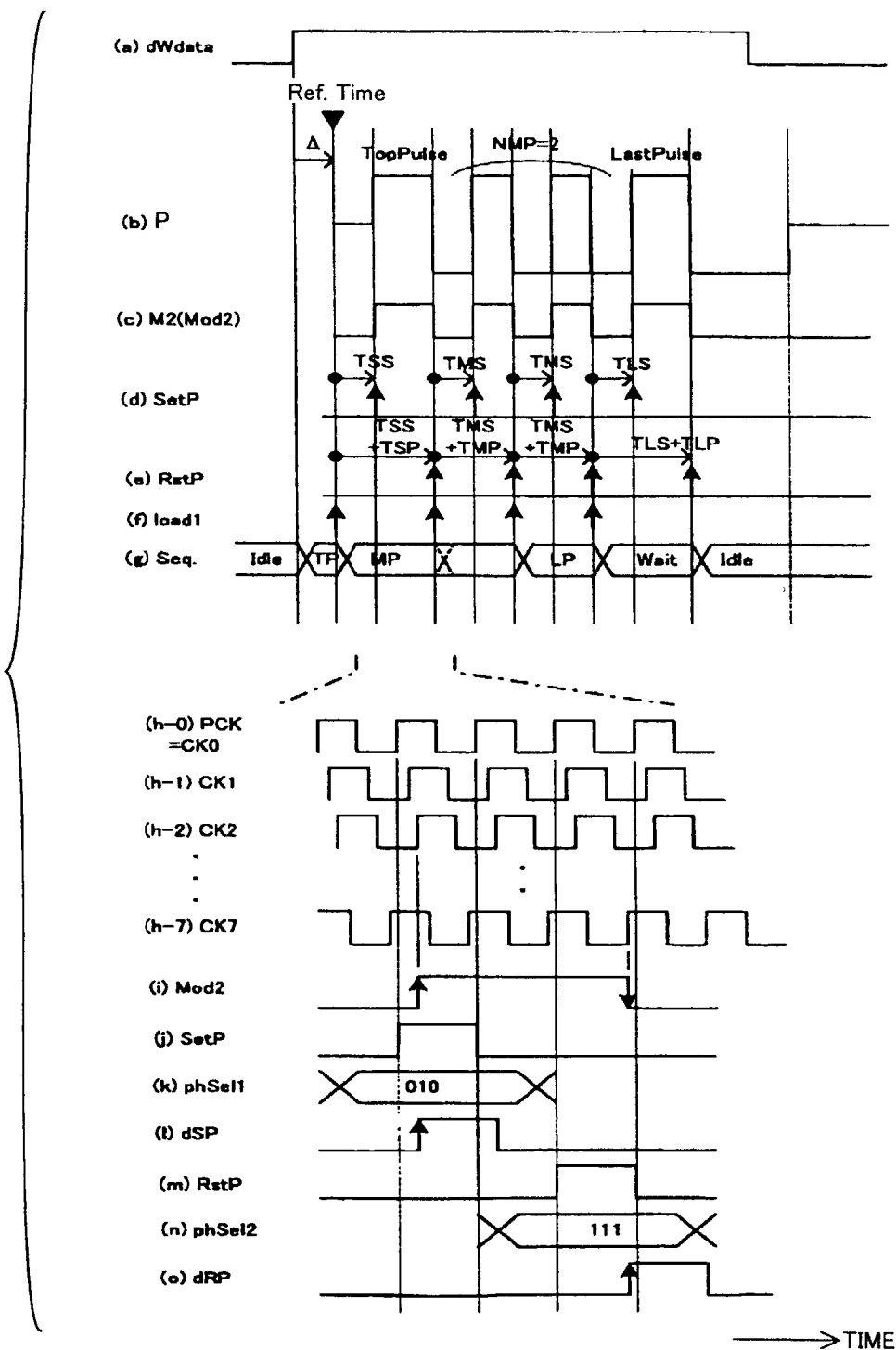
FIG. 14 is a timing chart showing signal waveforms for explaining the operation of generating the modulating signals from the driving waveform generating information.

FIG. 12 is a system block diagram showing the internal structure of the modulating signal generator 23 shown in FIG. 6. FIG. 13 is a state transition diagram of a sequencer for generating control signals of the modulating signal generator 23 by a timing controller 221 shown in FIG. 12. FIG. 14 is a timing chart showing signal waveforms for explaining the operation of generating the modulating signals from the driving waveform generating information. FIGS. 14(h-0) through 14(o) show the signal waveforms with a time base which is expanded compared to that of FIGS. 14(a) through 14(g). For the sake of convenience, a description will be given of the structure and the operation for generating the modulating signal M2. The other modulating signals M0 and M1 may be generated similarly to the modulating signal M2. The modulating signals M0 through M2 are supplied to the LD driving integrated circuit 3 shown in FIG. 6, so as to obtain the optical waveform shown in FIG. 14(b).

As shown in FIG. 12, the modulating signal generator 23 includes the timing controller 221, a timing computing unit 222, a timing computing unit 223, a counter 224, a phase selection signal holding unit (register) 225, a counter 226, a phase selection signal holding unit (register) 227, a timing pulse signal delay unit 228, flip-flops 229a through 229h, a multiplexer (MUX) 239, a timing pulse signal delay unit 231, and a modulating signal output unit 232.

The timing controller 221 generates the control signals which will be described later and are to be supplied to various parts of the modulating signal generator 23, based on the sequence which operates according to the state transition diagram shown in FIG. 13. The timing controller 221 also generates a reference time of the modulating signal pulse train which is delayed by a predetermined time Δ (units of PCK) from the delayed recording data signal dWdata as shown in FIG. 12(a).

The timing computing unit 222 and the timing computing unit 223 compute the number of pulse width setting steps to the next modulating timing from the timing information supplied from the driving waveform generating information holding unit 22, based on a computing instruction signal which is received from the timing controller 221. In this first embodiment, the rise timing and the fall timing are independently processed in order to realize a high-speed circuit operation. Hence, a next rise timing NextTiming1 (NT1) and a next fall timing NextTiming2 (NT2) are computed. Of the number of pulse width setting steps to the next rise modulating timing which is computed, upper 5 bits are supplied to the counter 224, and lower 3 bits are supplied to the phase selection signal holding unit 225 as a phase selection signal.

In this particular case, it is assumed that the number of pulse width setting steps is indicated by 8 bits.

Similarly, of the number of pulse width setting steps to the next fall modulating timing, upper 5 bits are supplied to the counter 226, and lower 3 bits are supplied to the phase selection signal holding unit 227 as a phase selection signal.

The counter 224 and the counter 226 count the time to the next modulating timing, in response to the clock signal PCK shown in FIG. 14(h-0). More particularly, the counters 224 and 226 inputs the number of pulse widths setting steps to the next modulating timing computed by the timing computing units 222 and 223 according to a load signal load1 shown in FIG. 14(f) which is supplied from the timing controller 221, and counts down in response to the clock signal PCK.

When the counted value becomes zero, the counters 224 and 226 respectively output a set pulse SetP at timings shown in FIGS. 14(d) and 14(j) and a reset pulse RstP at timings shown in FIGS. 14(e) and 14(m). The set pulse SetP and the reset pulse RstP will hereinafter be referred to as timing pulse signals.

The phase selection signal holding unit 225 and the phase selection signal holding unit 227 respectively hold and supply to the next stage a phase selection signal phSel1 shown in FIG. 14(k) and a phase selection signal phSel2 shown in FIG. 14(n). The hold timings of the phase selection signal holding units 225 and 227 are determined by the control signals supplied from the timing controller 221.

The timing pulse signal delay unit 228 and the timing pulse signal delay unit 231 respectively delay the set pulse SetP depending on the phase selection signal phSel1 and the reset pulse RstP depending on the phase selection signal phSel2, using the clock signals CK0 through CK7 as references. Hence, the timing pulse signal delay units 228 and 231 respectively output delayed timing pulse signals dSP and dRP shown in FIGS. 14(l) and 14(o).

Since the internal structure of the timing pulse signal delay unit 231 is the same as that of the timing pulse signal delay unit 228, only the internal structure of the timing pulse signal delay unit 228 is shown in FIG. 12.

Next, a more detailed description will be given of the timing pulse signal delay unit 228 shown in FIG. 12. A more detailed description of the timing pulse signal delay unit 231 will be omitted because the detailed description of the timing pulse signal delay unit 228 similarly applies to the timing pulse signal delay unit 231.

The flip-flops 229a through 229h of the timing pulse signal delay unit 228 synchronize the set pulse SetP to the clock signals CK0 through CK7. Outputs of the flip-flops 229a through 229h are selected by the multiplexer 230 depending on the phase selection signal phSel1, so as to output a delayed timing pulse signal dSP.

For example, as shown on the enlarged scale, the phase selection signal phSel1 is set to "010" as shown in FIG. 14(k), and the delayed set pulse dSP shown in FIG. 14(l) is selectively output in synchronism with the clock signal CK2 shown in FIG. 14(h-2). Similarly, the delayed reset pulse dRP shown in FIG. 14(o) is also selectively output.

The modulating signal output unit 232 shown in FIG. 12 generates the modulating signal M2 based on the delayed timing pulse signals dSP and dRP. For example, the modulating signal output unit 232 may be formed by a set-reset (SR) flip-flop.

In other words, the modulating signal M2 (Mod2) rises to a high level responsive to a rising edge of the delayed set pulse dSP, and falls to a low level responsive to a rising edge of the delayed reset pulse dRP.

The sequencer provided within the timing controller 221 shown in FIG. 12 operates according to the state transition diagram shown in FIG. 13. The timing controller 221 generates the control signals which control various parts of the modulating signal generator 23, based on the sequencer which operates according to the state transition diagram shown in FIG. 13.

A description will be given of the transition conditions of the sequencer. FIG. 14(g) shows one particular example of the state transition.

As shown in FIG. 13, the sequencer is initially in an idle state Idle, and makes a transition to a state TP in response to the rising edge of the delayed recording data signal dWdata.

A transition is made from the state TP to a next state in response to the load signal load1 which is issued at a reference time. The next state to which the transition is made differs depending on the driving waveform generating information (TMS, TLS). The next state is a state MP if TMS≠0, a state LP if TMS=0 and TLS≠0, and a wait state Wait otherwise (that is, if TMS=0 and TLS=0).

A transition is made from the state MP to the state LP in response to the load signal load1 which is issued simultaneously as the reset pulse RstP, but the repetition number NMP of the state MP is held in the state MP. FIG. 13 shows a case where NMP=2.

A transition is made from the state LP to the wait state Wait in response to the reset pulse RstP. The wait state Wait continues until the end of the multi-pulses, and a transition to the idle state Idle occurs in response to the reset pulse RstP.

The following formulas (2) and (3) are used to compute the timings for each state of the sequencer in the timing computing units 222 and 223.

$$NextTiming1 = \begin{cases} TSS & @\text{Idle or } TP \\ TMS + phShe12 & @MP \\ TLS + phSe12 & @LP \end{cases} \quad (2)$$

$$NextTiming2 = \begin{cases} TSS + TSP & @\text{Idle or } TP \\ TMS + TMP + phSe12 & @MP \\ TLS + TLP + phSe12 & @LP \end{cases} \quad (3)$$

In other words, the computing formulas change depending on the state Seq of the sequencer shown in FIG. 14(g). In the formulas (2) and (3), the terms following a symbol "@" indicates the state Seq of the sequencer. For example, when Seq=TP, NextTiming1=TSS and NextTiming2=TSS+TSP, and these values are loaded into the counters 224 and 226 in response to the load signal load1 shown in FIG. 14(f).

[Delay Adjuster]

The delay adjuster 24 delays the modulating signals M0 through M2 so that the delay differences of the delayed modulating signals Mod0 through Mod2 fall within a predetermined value.

Figure 15:
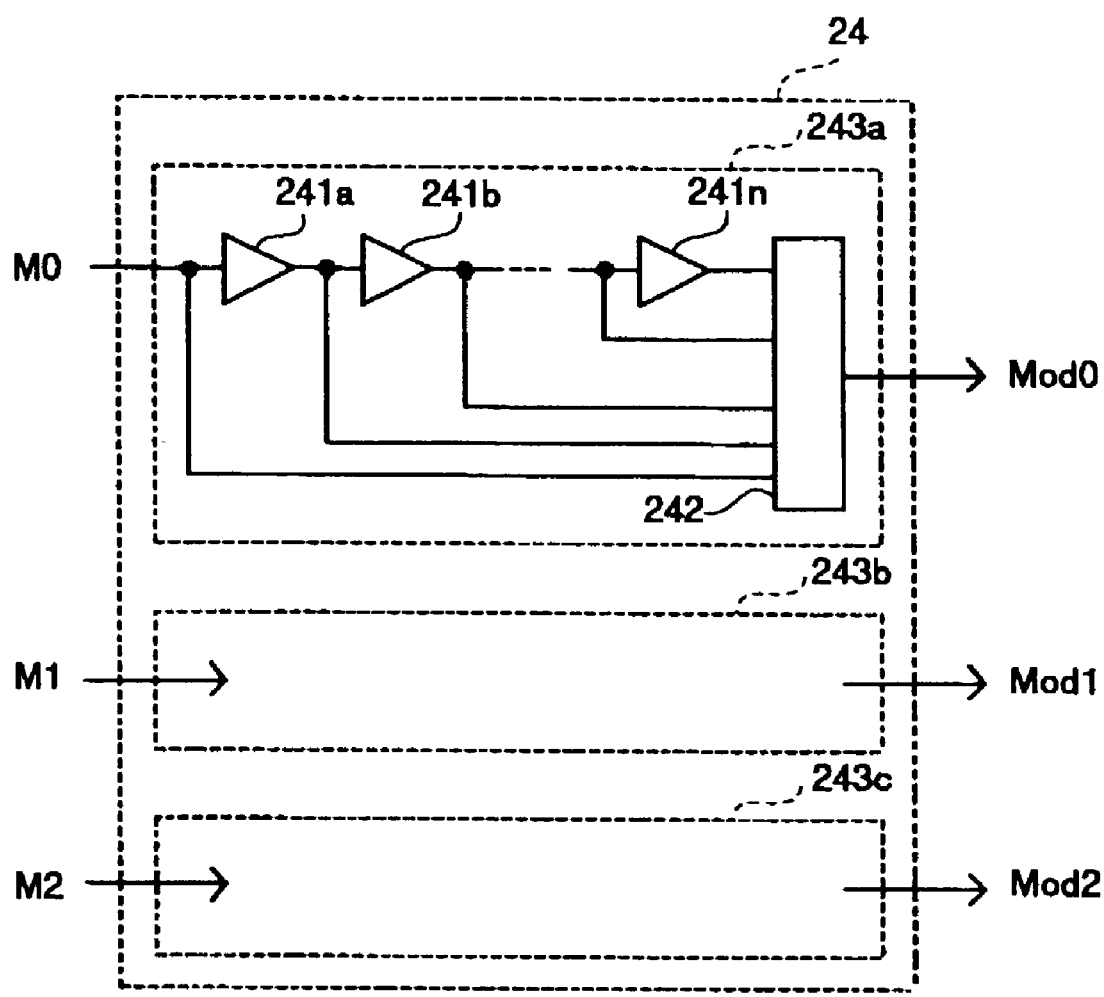
FIG. 15 is a system block diagram showing the internal structure of a delay adjuster shown in FIG. 6.

FIG. 15 is a system block diagram showing the internal structure of the delay adjuster 24 shown in FIG. 6.

FIGS. 7(g-1), 7(g-2) and 7(g-3) show the modulating signals M0', M1' and M2' which are obtained when the switching is carried out without the use of the delay adjuster 24, similarly as in the case of the conventional information recording and reproducing apparatus. In this case, the plurality of modulating signals do not change simultaneously, and the modulating current, that is, the optical waveform, does not have the desired waveform.

As shown in FIG. 15, the delay adjuster 24 includes delay parts 243a through 243c. The delay part 243a includes delay elements 241a through 241n which respectively delay a signal by a predetermined delay time and are connected in series, and a selector 242 which selectively outputs one of the outputs of the delay elements 241a through 241n. The delay parts 243b and 243c have the same structure as the delay part 243a, and an illustration thereof will be omitted in FIG. 15.

The delay adjuster 24 adjusts the delay times by selecting the output of one of the delay elements in each of the delay parts 243a through 243c. The delay times are adjusted so that the error (skew) of the switching timings of the modulating signals Mod0 through Mod2 becomes essentially zero, by taking into consideration the differences in the delay times of the modulating signals M0 through M2 and the differences in the transmission delays of the modulating signals Mod0 through Mod2. In other words, the output of each modulating signal is delayed by a predetermined time so that no delay is introduced in the timings at which the plurality of currents are selected. The skew virtually does not change if the transmission line is determined, that is, if this first embodiment of the light source driving unit is determined. Hence, the selection of the delay time may be determined when producing the light source driving unit, and the delay time may be selected by laser trimming, for example.

For example, in the case shown in FIG. 7, when the delay time of the modulating signal M1 is set to Δ, the delay time of the modulating signal M0 is set to Δ+Δ1, and the delay time of the modulating signal M2 is set to Δ+Δ2.

Each of the delay parts 243a through 243c may be formed by a delay buffer having a delay time which varies depending on a current (or voltage) supplied thereto, and in this case, the delay times of the delay adjuster 24 may be adjusted by varying the currents (or voltages) supplied to each of the delay parts 243a through 243c.

[LD Control Signal Generator]

The LD control signal generator 26 generates the LD control timing signal, such as a sample signal for APC according to the sample-and-hold system, from the recording data signal Wdata. The sample signal is generated depending on the optical waveform (light emission waveform) of the light source, because the optical waveform is delayed with respect to the recording data signal Wdata by an amount corresponding to the delay in the run length detector 21.

[Modulating Section]

The modulating section 27 includes the current source unit 28 having the current sources 28a, 28b and 28c for respectively supplying currents I0, I1 and I2 based on the irradiating level data P0Data, P1Data and P2Data, the switching unit 29 having the switches 29a, 29b and 29c for respectively controlling ON/OFF states of the currents I0, I1 and I2 depending on the modulating signals Mod0, Mod1 and Mod2, and the adder 30 which adds the currents output from the switching unit 29 and outputs the LD modulating current Imod.

Figure 16:
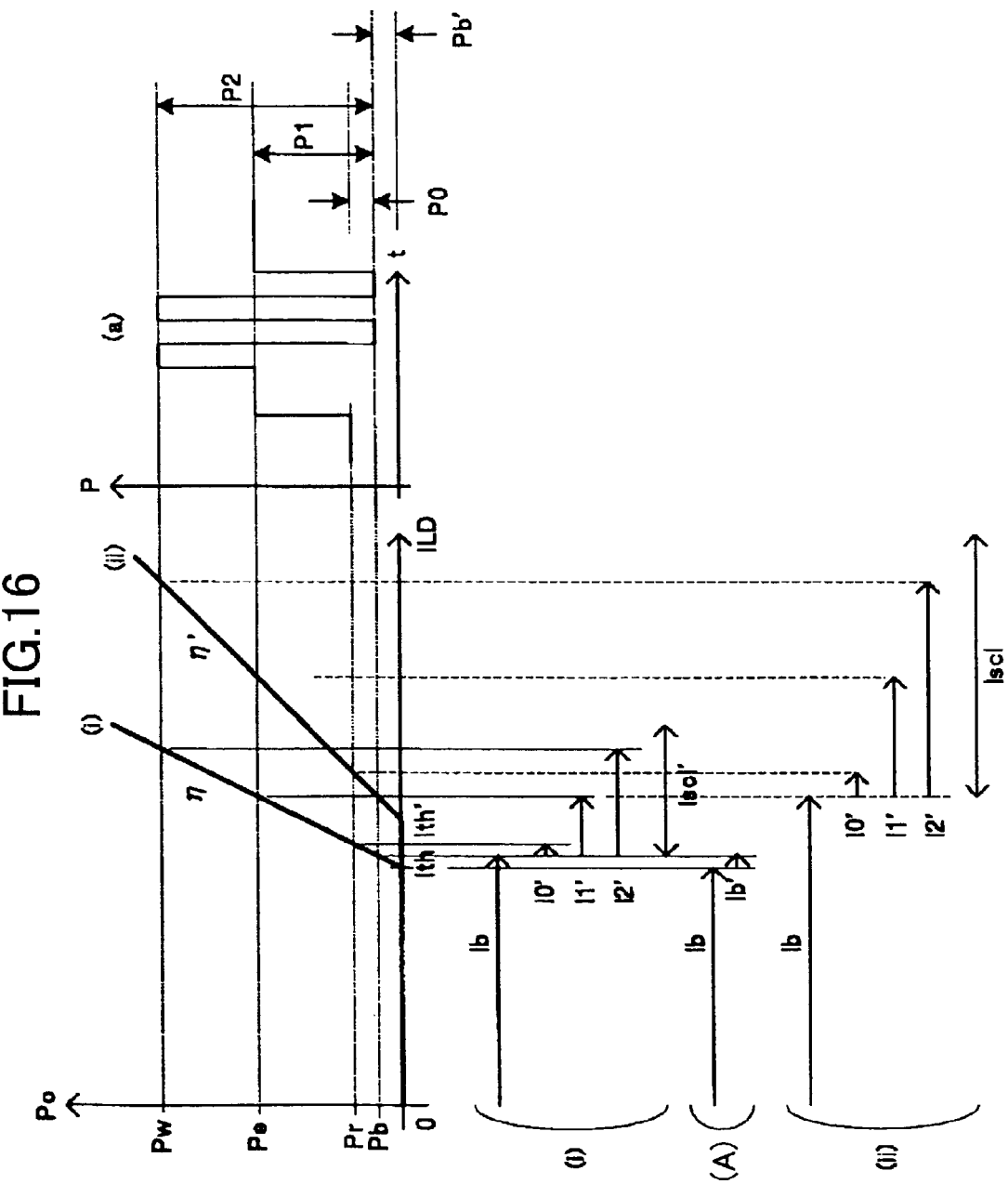
FIG. 16 is a diagram showing a driving current versus optical output characteristic of the light source and the relationship of currents at various parts of a modulating section.

FIG. 16 is a diagram showing a driving current versus optical output characteristic of the light source LD and the relationship of currents at various parts of the modulating section 27.

The current source 28a is formed by the DAC which outputs the current I0 based on the irradiating level data P0Data. Similarly, the current source 28b is formed by the DAC which outputs the current I1 based on the irradiating level data P1Data, and the current source 28c is formed by the DAC which outputs the current I2 based on the irradiating level data P2Data. A full scale (scale signal) Iscl of the DACs forming the current sources 28a through 28c is supplied from the LD controller 33, and is controlled depending on a variation in the differential quantum efficiency η. Hence, the output currents I0, I1 and I2 of the current sources 28a through 28c can be obtained by carrying out computation processes based on the following formulas (4) through (6). It is assumed for the sake of convenience that 8-bit DACs are used for the current sources 28a through 28c.

$$I0=(P0\text{Data}/255)*Iscl \quad (4)$$

$$I1=(P1\text{Data}/255)*Iscl \quad (5)$$

$$I2=(P2\text{Data}/255)*Iscl \quad (6)$$

FIG. 16 shows current values I0', I1' and I2' which are obtained by multiplying an amplification factor Ai to the currents I0, I1 and I2 in the current driver 32.

The switches 29a through 29c respectively control the ON/OFF states of the currents I0 through I2, depending on the modulating signals Mod0 through Mod2. In FIG. 7, it is assumed that the switches 29a through 29c are turned ON when the corresponding modulating signals Mod0 through Mod2 have a high level. Each of the currents I0 through I2 which is controlled to the ON state is added in the adder 30, so as to obtain the modulating current Imod. In other words, the modulating current Imod can be obtained by carrying out a computation process based on the following formula (7), where "×Mod(n)" indicates "×1" when Mod(n) has a high level, and indicates "×0" when Mod(n) has a low level, where (n) is 0, 1 and 2.

$$Imod=I0\times Mod0+I1\times Mod1+I2\times Mod2 \quad (7)$$

In FIG. 16, the current Ib has a current value obtained by multiplying the amplification factor Ai to the bias current Ibias which is controlled by the LD controller 33. The light emission of the light source LD is controlled so as to occur at a bottom level Pb with respect to the current Ib.

When emitting the light from the light source PD at the reproducing level Pr, the modulating signals Mod0 through Mod2 are set to Mod0=1, Mod1=0 and Mod2=0, and the modulating signal Imod is generated so that Imod=I0, so as to supply a driving current Ib+I0' to the light source LD. In this state, a value corresponding to P0 (=Pr−Pb) is set for the irradiating level data P0Data.

The light emission from the light source LD at the erase level Pe and the write level Pw may be made similarly. In a case where the threshold current Ith of the light source LD and the differential quantum efficiency η vary from a state shown in FIG. 16(*i*) to a state shown in FIG. 16(*ii*) due to a temperature change and the like, the LD controller 33 controls the bias current Ib and the scale signal Iscl so as to obtain the desired amount of light emission. In other words, the currents Ib and I0' through I2' shown in FIG. 16(*ii*) are generated, so as to obtain the desired optical waveform shown in FIG. 16(*a*).

It is also possible to constantly add the current Ib' corresponding to the bottom level Pb to the LD driving current, so that the bias current Ib corresponds to the threshold current Ith. In other words, it is possible to make the light emission at the bottom level Pb by the current Ib+Ib' as shown in FIG. 16(A). The current Ib' may be controlled by the scale signal Iscl, similarly to the other current sources.

[LD Controller]

The LD controller 33 generates the bias current Ibias and the scale signal Iscl which instructs scaling of the modulating current, based on the detection signal of the monitoring light receiving unit PD (corresponding to the light receiving units PD2 and PD5 shown in FIG. 4), so that the amount of light emitted from the light source LD becomes the desired value.

In other words, when the threshold current Ith of the light source LD and the differential quantum efficiency η vary due to the temperature change and the like, the bias current Ibias is controlled with respect to the variation of the threshold current Ith, and the scale signal Iscl is controlled with respect to the variation of the differential quantum efficiency η.

In addition, when controlling the detection signal of the monitoring light receiving unit PD by sampling and holding when the amount of light emission is the desired value, this control may be carried out according to the LD control signal which is supplied from the LD control signal generator 26.

The LD control itself is not directly related to the subject matter of the present invention, and known techniques may be employed. Hence, illustration and description related to the detailed structure for realizing the LD control itself will be omitted.

Of course, the LD controller 33 may be provided within the LD driving integrated circuit 3 as shown in FIG. 6 or, outside the LD driving integrated circuit 3. When providing the LD controller 33 separately from the LD driving integrated circuit 3, the bias current Ibias and the scale signal Iscl may be supplied directly from the LD controller 33 or via the controller 34.

[Current Driver]

The current driver 32 amplifies the current supplied from the adder 31 by the amplification factor Ai, and supplies the LD driving current ILD to the light source LD. The LD driving current ILD may be obtained by carrying out a computation process based on the following formula (8).

$$ILD=Ai*(Ibias+Imod) \quad (8)$$

Therefore, according to the first embodiment of the light source driving unit, a skew is corrected even if the skew is generated among the modulating signals. Hence, it is possible to accurately form the recording marks on the information recording medium without affecting the optical waveform. Hence, the LD modulating signal generator integrated circuit 2 and the LD driving integrated circuit 3 may be made up of separate integrated circuits, and each of the integrated circuits 2 and 3 may be produced by a semiconductor process suited for obtaining the desired circuit characteristics. Accordingly, it is possible to realize a light source driving unit having a high performance at a low cost.

In other words, high-speed operation and high-integration density are required of the LD modulating signal generator 10, and the fine CMOS process is suited for producing the modulating signal generator. On the other hand, the LD driving unit 12 is connected to the light source LD which operates at a voltage of 1 V to several V, and a high withstand voltage process (for example, 5 V or 3.3 V) is required. It is normally difficult to realize a high withstand voltage in the case of the extremely fine CMOS process, because the withstand voltage is only approximately 1.8 V in the case of a CMOS process of 0.18 μm. But according to this first embodiment, the modulating signal generator and the LD driving unit 12 can be produced by different processes which are suited for obtaining the desired characteristics.

Furthermore, when the LD modulating signal generator integrated circuit 2 and the LD driving integrated circuit 3 are mounted within a single package, the transmission lines of the modulating signals become constant regardless of the structure and layout of the information recording and reproducing apparatus (particularly the optical pickup), thereby facilitating the delay adjustment. Even when the LD modulating signal generator integrated circuit 2 and the LD driving integrated circuit 3 are mounted within the single package, the two integrated circuits 2 and 3 are connected by transmission lines such as wires, and it is inevitable that some skew is generated Hence, the effects of the present invention is particularly notable when a high-speed operation is realized.

The LD modulating signal generator integrated circuit 2 and the LD driving integrated circuit 3 may be mounted on the optical pickup, and the skew caused by the transmission lines between the two integrated circuits 2 and 3 may be adjusted. In this case, the distance of the transmission lines between the two integrated circuits 2 and 3 becomes relatively short, and the amount of skew generated thereby is small. Moreover, no transmission is made via a bent portion of the FPC, which would otherwise cause a change in the transmission line characteristic due to bending and expanding of the transmission lines. Therefore, the amount of skew does not vary, and the skew can be corrected by a predetermined delay adjustment.

Figure 17:
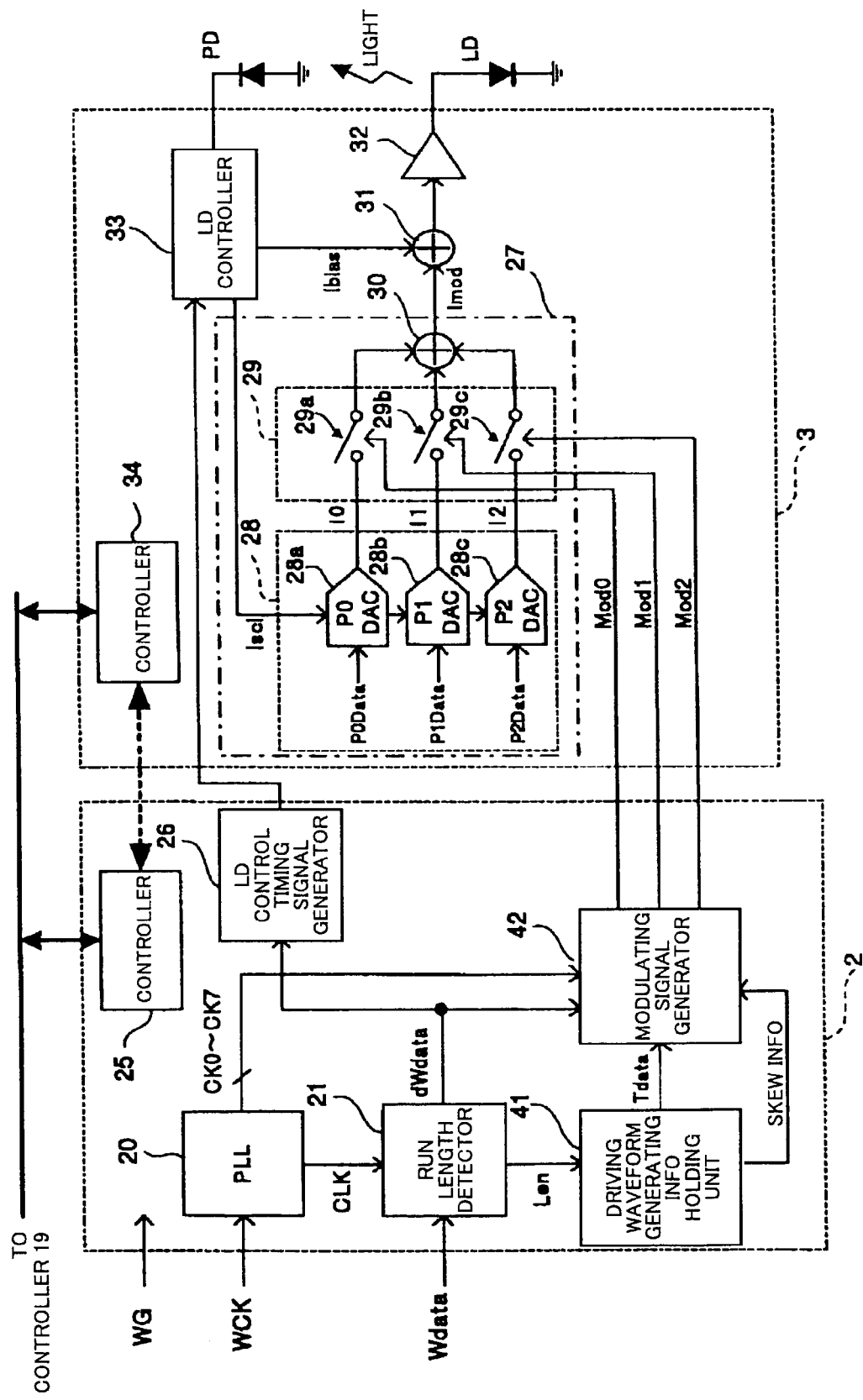
FIG. 17 is a system block diagram showing the structure of a second embodiment of the light source driving unit according to the present invention.

Next, a description will be given of a second embodiment of the light source driving unit according to the present invention. FIG. 17 is a system block diagram showing the structure of this second embodiment of the light source driving unit. In FIG. 15, those parts which are the same as those corresponding parts in FIG. 6 are designated by the same reference numerals, and a description thereof will be omitted.

In FIG. 17, the PLL section 20, the run length detector 21, a driving waveform generating information holding unit 41 and a modulating signal generator 42 of the LD modulating signal generator integrated circuit 2 function as a modulating signal generating means (or section) for generating a plurality of modulating signals based on driving waveform generating information for the light source. In addition, the current source unit 28 and the switching unit 29 of the modulating section 27 within the LD driving integrated circuit 3 function as a current source selecting means (or section) for selecting one or a plurality of currents output from a plurality of current sources, based on the modulating signals generated by the modulating signal generating means (or section). Moreover, the adders 30 and 31 and the current driver 32 of the LD driving integrated circuit 3 function as a light source driving means (or section) for driving the light source to generate multi-level light by generating and supplying to the light source a current having a multi-level amount based on the one or plurality of currents selected by the current source selecting means (or section). Furthermore, the driving waveform generating information holding unit 41 and a modulating signal generator 42 of the LD modulating signal generator integrated circuit 2 functions as a cancelling means (or section) for adding a signal error amount which cancels differences in the amounts of signal delays generated between the modulating signal generating means (or section) and the light source driving means (or section) at a stage prior to the current source selecting means (or section).

The driving waveform generating information holding unit 41 functions as a driving waveform generating information holding means (or section) and a delay adjusting means (or section), and stores the driving waveform generating information corresponding to each modulating signal which is generated by the modulating signal generator 42, and outputs the driving waveform generating information (timing information Tdata) and skew information corresponding to the run length data Len0 through Len2 depending on the delayed recording data signal dWdata. The modulating signal generator 42 functions as a modulating signal generating means (or section), and generates the modulating signals Mod0, Mod1 and Mod2 based on the skew information and the timing information Tdata.

The controller 19 functions as a driving waveform generating information modifying means (or section) for modifying the driving waveform generating information which is held in the driving waveform generating information holding means (or section).

Furthermore, in FIG. 17, the driving waveform generating information holding unit 41 stores the driving waveform generating information corresponding to each of the modulating signal Mod0 through Mod2, and may be constructed to output the driving waveform generating information (timing information Tdata0, Tdata1 and Tdata2) corresponding to the run length data Len0, Len1 and Len2 based on the delayed recording data signal dWdata.

The modulating signal generator 42 generates the modulating signal Mod0 based on the timing information Tdata0, the modulating signal Mod1 based on the timing information Tdata1 , and the modulating signal Mod2 based on the timing information Tdata2. The modulating signal generator 42 generates the modulating signals Mod0 through Mod2 using the clock signals CK0 through CK7 as reference timings, and the time corresponding to the phase differences of the clock signals CK0 through CK7 becomes the pulse width setting resolving power of the modulating signals Mod0 through Mod2. The modulating signal generator 42 may be constructed similarly to the modulating signal generator 23 shown in FIG. 12, and an illustration and description of the internal structure thereof will be omitted.

Figure 18:
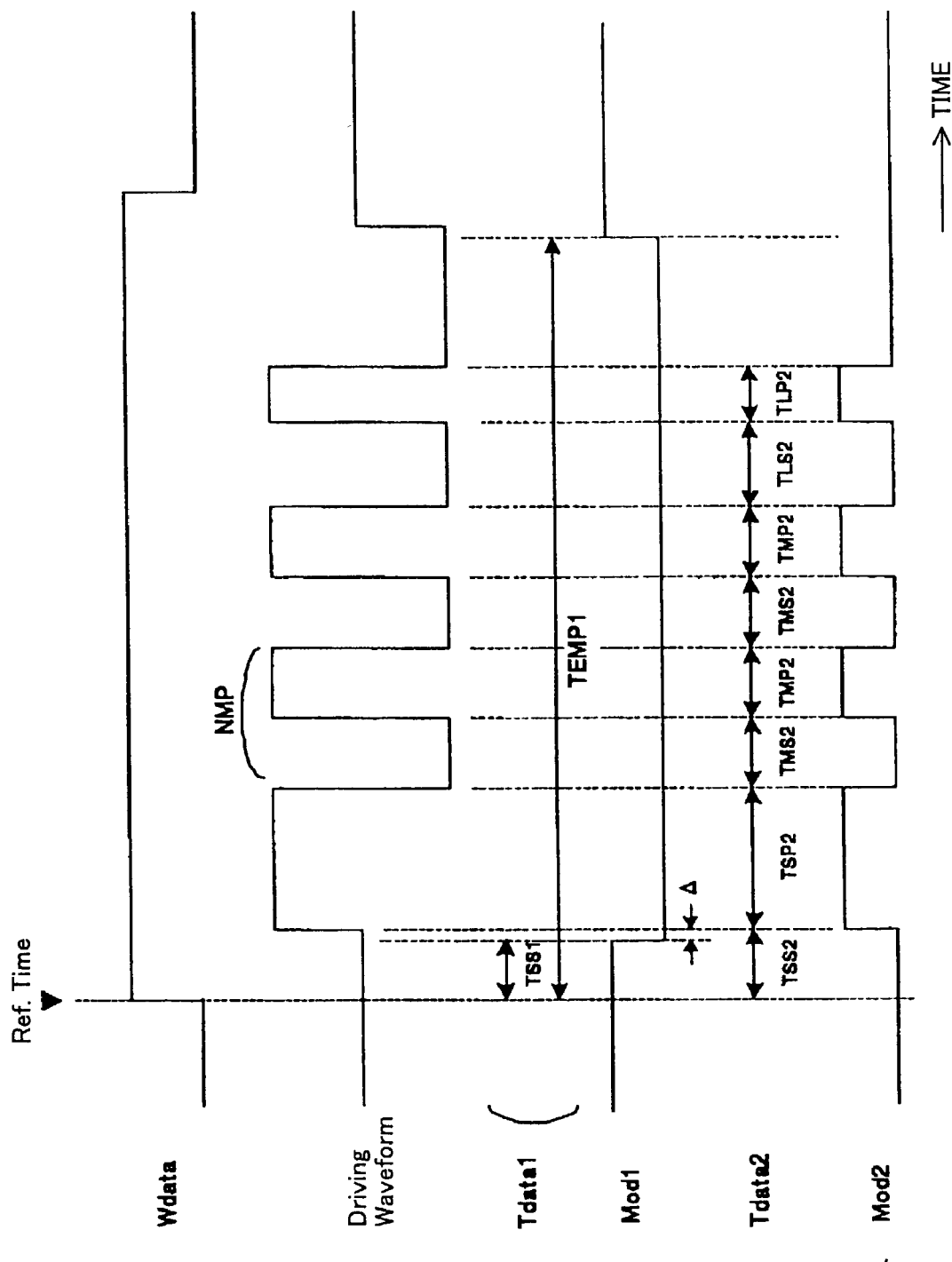
FIG. 18 is a timing chart for explaining the relationship of the driving waveform generating information and the optical waveform in the second embodiment of the light source driving unit.

FIG. 18 is a timing chart for explaining the relationship of the driving waveform generating information and the optical waveform in this second embodiment.

The driving waveform generating information includes the timing information which indicates timings when the irradiating level of the optical waveform changes. In FIG. 18, the timing information Tdata1 and Tdata2 for generating the modulating signals Mod1 and Mod2 are shown.

As shown in FIG. 18, the timing information Tdata1 includes TSS1 and TEMP1. The timing information Tdata2 includes TSS2, TSP2TMS2, TMP2, TLS2, TLP2 and NMP. In other words, the modulating signals Mod1 and Mod2 are generated from independent timing information Tdata1 and Tdata2.

When each timing information is set by taking the skew of the modulating signals Mod0 through Mod2 into consideration, it is possible to control the switching timings of the switches 29a through 29c by the modulating signals Mod0 through Mod2 without error.

For example, if a skew Δ exists in the modulating signals Mod1 and Mod2, the timing information Tdata1 and Tdata2 may be set by taking this skew Δ into consideration (TSS1 and TSS2 in FIG. 18). In addition, normally, when obtaining the timing information depending on the information recording medium, a recording is actually carried out to obtain values which result in best characteristics, and the optimum timing information may be obtained at the same time Moreover, one kind of timing information (for example, the timing information Tdata2 or the timing information Tdata of the first embodiment) and skew information which indicates the skew among the modulating signals may be supplied, so that the modulating signal generator 42 generates the modulating signals Mod0 through Mod2 from information which is obtained by adding the skew information to this timing information. In this case, the modulating signals Mod0 through Mod2 can be generated in a state where the skew among the modulating signals Mod0 through Mod2 are corrected.

Therefore, according to this second embodiment of the light source driving unit, the skew of the modulating signals can be adjusted in pulse width setting steps, and accurate recording marks can be formed on the information recording medium.

In addition, because the pulse width setting step can be made small in the case of the high-speed recording, the skew can be finely adjusted, and the skew can be suppressed to a negligible level regardless of the recording speed. In addition, the light source driving unit can be realized with ease because fine CMOS processes can be employed to produce the light source driving unit with respect to the demands to realize high-speed operation.

According to the first and second embodiments of the light source driving unit, it is possible to correct a skew even if the skew exists among the modulating signals, without affecting the optical waveform, so that a desired optical waveform is obtained. In addition, the circuit parts, such as the LD modulating signal generator integrated circuit 2 and the LD driving integrated circuit 3, can be formed by separate integrated circuits and produced by semiconductor processes suited for obtaining the desired circuit characteristics for the circuit parts. As a result, it is possible to realize a light source driving unit having a high performance at a low cost.

Figure 19:
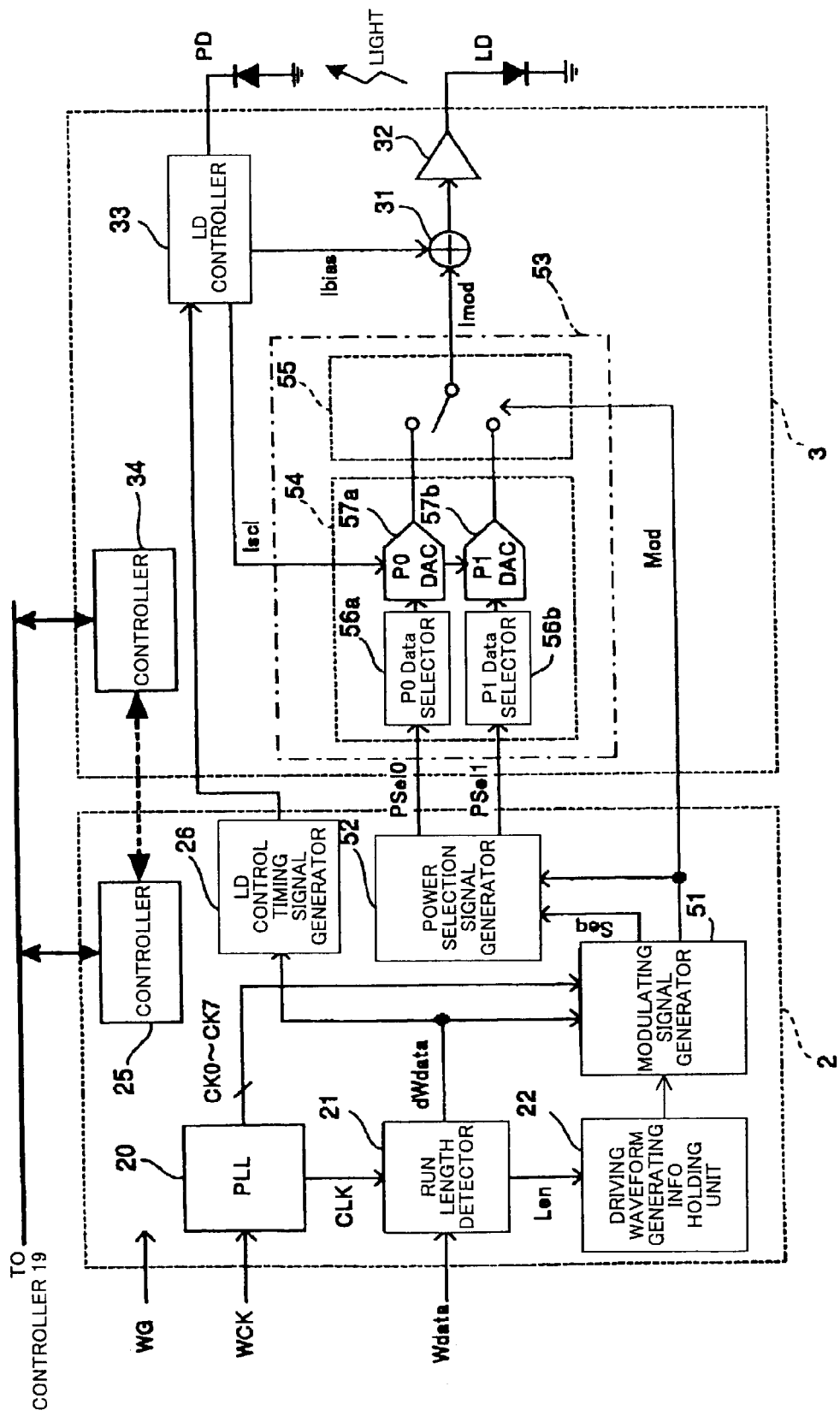
FIG. 19 is a system block diagram showing the structure of a third embodiment of the light source driving unit according to the present invention.
Figure 20:
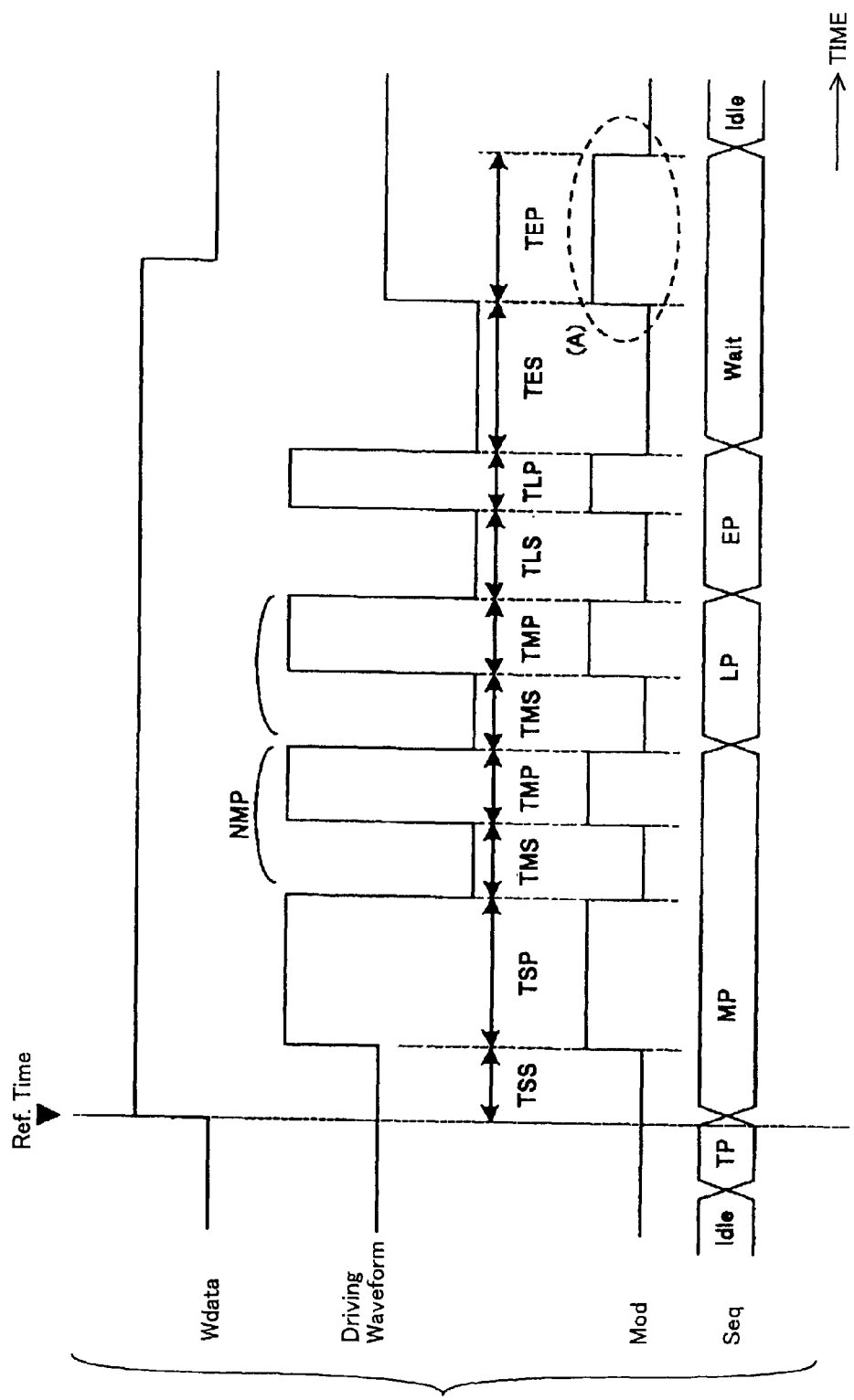
FIG. 20 is a timing chart for explaining the relationship of the driving waveform generating information and the optical waveform in the third embodiment of the light source driving unit.

Next, a description will be given of a third embodiment of the light source driving unit according to the present invention. FIG. 19 is a system block diagram showing the structure of this third embodiment of the light source driving unit. In FIG. 19, those parts which are the same as those corresponding parts in FIGS. 6 and 17 are designated by the same reference numerals, and a description thereof will be omitted. FIG. 20 is a timing chart for explaining the relationship of the driving waveform generating information and the optical waveform in this third embodiment. Further, FIG. 21 is a state transition diagram of a sequencer for generating control signals of a modulating signal generator 51 shown in FIG. 19.

In FIG. 19, the driving waveform generating information holding unit 22 stores the timing information (TSS, TSP, TMS, TMP, TLS, TLP, TES, TEP) shown in FIG. 20.

The modulating signal generator 51 shown in FIG. 19 functions as a modulating signal generating means (or section) and a control means (or section), and generates a modulating signal Mod based on the timing information which is supplied from the driving waveform generating information holding unit 22 which functions as a driving waveform generating information holding means (or section). As will be described later, a transition timing of the modulating signal Mod determines a transition timing of the irradiating level of the light source LD. In other words, the timing information TSS, TSP, TMS, . . . is successively counted from a reference time to vary the modulating signal Mod. In addition, the timing information to be counted is selected based on a state Seq of the sequencer shown in FIG. 21. The modulating signal generator 51 may be constructed similarly to the modulating signal generator 23 shown in FIG. 12, and an illustration and description of the internal structure thereof will be omitted.

Figure 21:
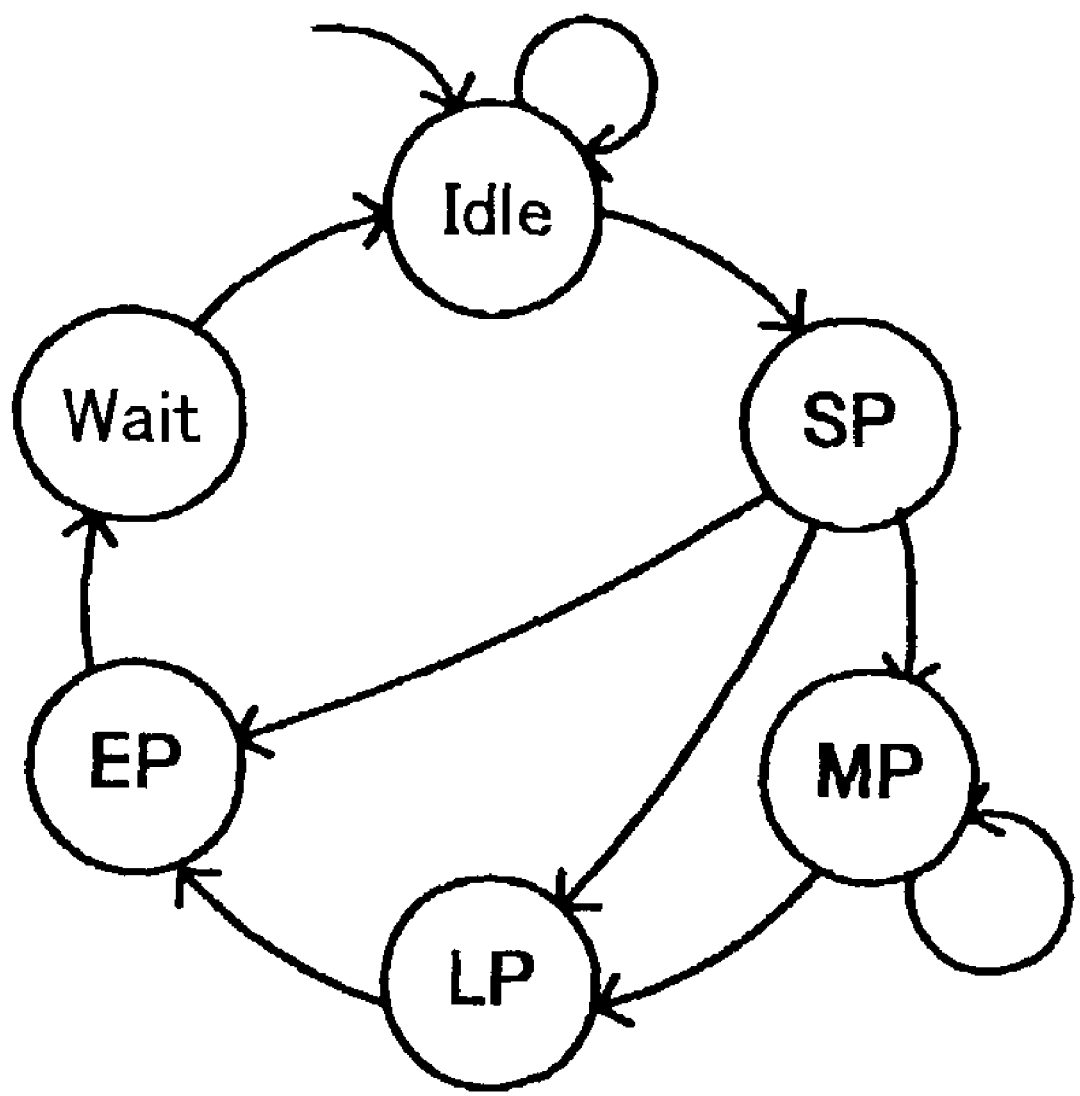
FIG. 21 is a state transition diagram of a sequencer for generating control signals of a modulating signal generator shown in FIG. 19.

However, each part of the modulating signal generator 51 is controlled according to the sequencer shown in FIG. 21. The sequencer shown in FIG. 21 additionally includes a state EP prior to the wait state Wait shown in FIG. 13. A transition timing to the erase power Pe, indicated by dotted lines (A) in FIG. 20, is controlled by this state EP. In addition, the modulating signal generator 51 generates a sequencer state signal Seq which indicates the state of the sequencer. Alternatively, the modulating signal generator 51 may generate signals (For example, Sep, Swait, etc.) indicating each state when active.

A power selection signal generator 52 generates power selection signals PSel0 and PSel1 which instruct the irradiating level of the light source LD depending on the modulating signal Mod and the sequencer state signal Seq. The power selection signal generator 52 and P0Data selector 56a and a P1Data selector 56b which will be described later function as a current selection signal generating means (or section).

The power selection signal PSel0 instructs the irradiating level for when the modulating signal Mod has a low level. The power selection signal PSel1 instructs the irradiating level for when the modulating signal Mod has a high level. In other words, the light source LD irradiates the light at the reproducing (read) power Pr when the power selection signal PSel0 is PSel0=Pr (instructing the read power) and the modulating signal Mod is Mod=0 (low level).

Figure 22:
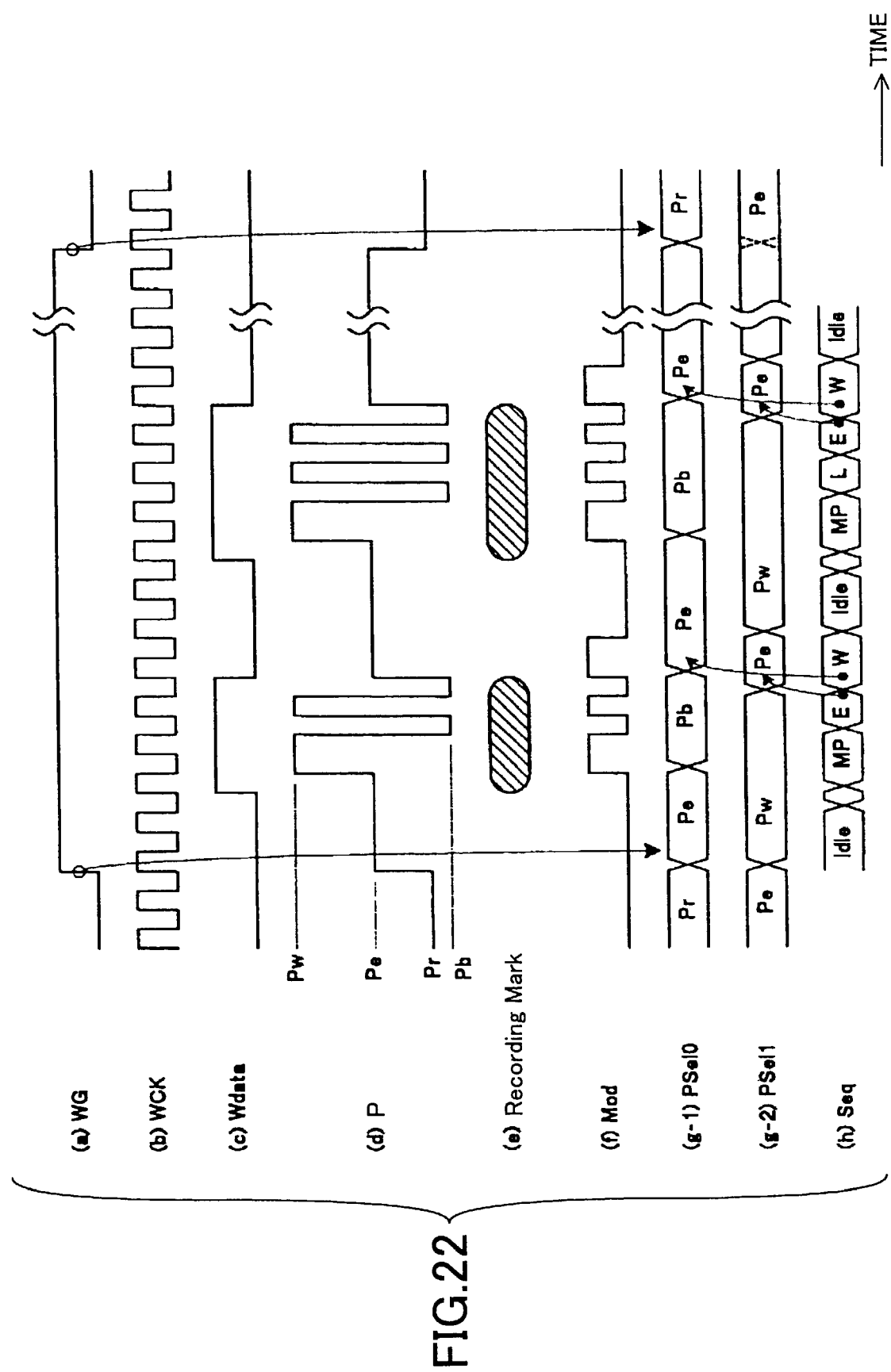
FIG. 22 is a timing chart showing signal waveforms for explaining the relationship of a modulating signal Mod, a sequencer state signal Seq, and power selection signals PSel0 and PSel1.

FIG. 22 is a timing chart showing signal waveforms for explaining the relationship of the modulating signal Mod, the sequencer state signal Seq, and the power selection signals PSel0 and PSel1.

A description will now be given of the generation of the power selection signals PSel0 and PSel1, by referring to FIG. 22.

The power selection signals PSel0 and PSel1 vary depending on a write gate signal WG shown in FIG. 22(*a*), the sequencer state signal Seq shown in FIG. 22(*h*) and the modulating signal Mod shown in FIG. 22(*f*). In addition, the modulating signal Mod is generated according to the sequencer state signal Seq as described above.

As shown in FIG. 22(*g*-1), the power selection signal PSel0 has the read power level Pr in the initial state, and makes a transition to the erase power level Pe in response to a rising edge of the write gate signal WG. Normally, high accuracy is not required of the transition timing from the read power Pr to the erase power Pe, and thus, this transition timing of the power selection signal PSel0, which does not depend on the modulating signal Mod, is sufficient for the purpose.

When PSel0=Pe, the power selection signal PSel0 makes a transition to the bottom power level Pb in response to a rising edge of the modulating signal Mod.

When PSel0=Pb, the power selection signal PSel0 makes a transition to the erase power level Pe in response to a rising edge of the modulating signal Mod if Seq=Wait. In other words, the modulating signal Mod acts as a clock signal.

Thereafter, the power selection signal Psel0 makes a transition to the read power level Pr in response to a falling edge of the write gate signal WG.

As shown in FIG. 22(*g*-2), the power selection signal PSel1 has the erase power level Pe in the initial state, makes a transition to the write power level Pw in response to a rising edge of the write gate signal WG, and makes a transition to the ease power level Pe in response to a falling edge of the write gate signal WG.

When PSel1=Pw, the power selection signal PSel1 makes a transition to the erase power level Pe in response to a falling edge of the modulating signal Mod if Seq=EP.

When PSel1=Pe, the power selection signal PSel1 makes a transition to the write power level Pw in response to a falling edge of the modulating signal Mod.

Accordingly, the transition timings of the power selection signal PSel0 are based on the rising edge of the modulating signal Mod, and no transition occurs during the low-level period of the modulating signal Mod. Similarly, no transition of the power selection signal PSel1 occurs during the high-level period of the modulating signal Mod.

A modulating section 53 includes a current source unit 54 and a switching unit 55, and generates the LD modulating current Imod based on the power selection signals PSel0 and PSel1 and the modulating signal Mod. The current source unit 54 includes the P0Data selector 56a, the P1Data selector 56b, a current source (DAC) 57a and a current source (DAC) 57b. The P0Data selector 56a selectively outputs an irradiating level data P0Data corresponding to the irradiating level instructed by the power selection signal PSel0, and the P1Data selector 56b selectively outputs an irradiating level data P1Data corresponding to the irradiating level instructed by the power selection signal PSel1.

The current source 57a supplies the current I0 based on the irradiating level data P0Data, and the current source 57b supplies the current I1 based on the irradiating level data P1Data. The current sources 57a and 57b, the adder 31, the current driver 32, the LD controller 33, the controller 34 and the switching unit 55 function as a light source driving means (or section).

Similarly as in the case of the current source unit 28 shown in FIGS. 6 and 17, the scale signal Iscl is supplied to the current sources 57a and 57b of the current source unit 54, and the current source unit 54 is controlled depending on the variation in the differential quantum efficiency η.

The switching unit 55 outputs the LD modulating current Imod by selectively outputting the output current of the current source 56a or the current source 56b. The switching unit 55 selectively outputs the current I1 from the current source 56b if the modulating signal Mod has the high level, and selectively outputs the current I0 from the current source 56a if the modulating signal Mod has the low level.

As described above, the power selection signal PSel0 does not change during the low-level period of the modulating signal Mod, and the power selection signal PSel1 does not change during the high-level period of the modulating signal Mod. Hence, if the response speeds of the current sources 56a and 56b are sufficiently high, the changes in the output currents I0 and I1 will occur while the output currents I0 and I1 are not selected by the switching unit 55, and the change in the LD modulating current Imod will be determined solely by the transition timing of the modulating signal Mod.

In the case shown in FIG. 22, the output current I0 changes to current values corresponding to the irradiating power levels Pr, Pe, Pb, Pe, . . . , and the output current I1 changes to current values corresponding to the irradiating power levels Pe, Pw, Pe, . . . . Hence, the LD modulating current Imod which is produced by selecting the output current I0 or I1 by the modulating signal Mod changes to current values corresponding to the irradiating power levels Pr(I0), Pe(I0), Pw(I1), Pb(I0), Pw(I1), Pb(I0), Pe(I1), Pe(I0), . . . , where I0 and I1 within the brackets indicate the current selected by the switching unit 55.

Accordingly, even if a skew exists in the signals (power selection signals PSel0 and PSel1 and the modulating signal Mod) which are transferred between the LD modulating signal generator integrated circuit 2 and the LD driving integrated circuit 3, the optical waveform is not affected thereby, and it is possible to accurately form the recording marks on the information recording medium.

In other words, the LD modulating signal generator integrated circuit 2 and the LD driving integrated circuit 3 may be formed by separate integrated circuits, so that the semiconductor processes suited for obtaining the desired circuit characteristics may be employed to produce the integrated circuits. As a result, it is possible to realize a light source driving unit having a high performance at a low cost.

Figure 23:
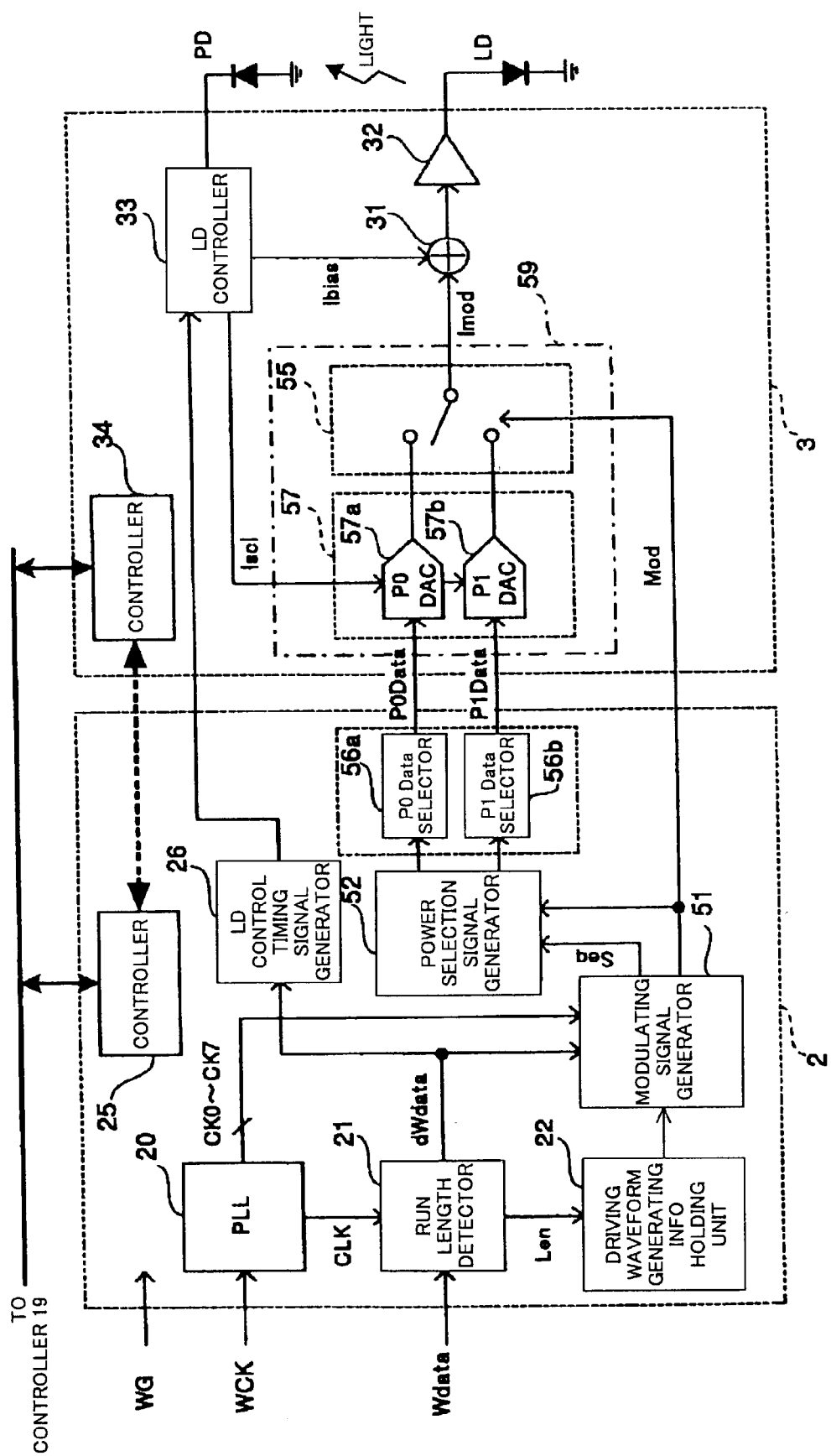
FIG. 23 is a system block diagram showing the structure of a fourth embodiment of the light source driving unit according to the present invention.

Next, a description will be given of a fourth embodiment of the light source driving unit according to the present invention. FIG. 23 is a system block diagram showing the structure of this fourth embodiment of the light source driving unit. In FIG. 23, those parts which are the same as those corresponding parts in FIGS. 6 and 19 are designated by the same reference numerals, and a description thereof will be omitted.

In the light source driving unit shown in FIG. 23, the P0Data selector 56a and the P1Data selector 56b shown in FIG. 19 are provided within the LD modulating signal generator integrated circuit 2, so as to transfer the irradiating level data P0Data and P1Data from the LD modulating signal generator integrated circuit 2 to the LD driving integrated circuit 3. This fourth embodiment can obtain the same effect as the third embodiment described above.

Figure 24:
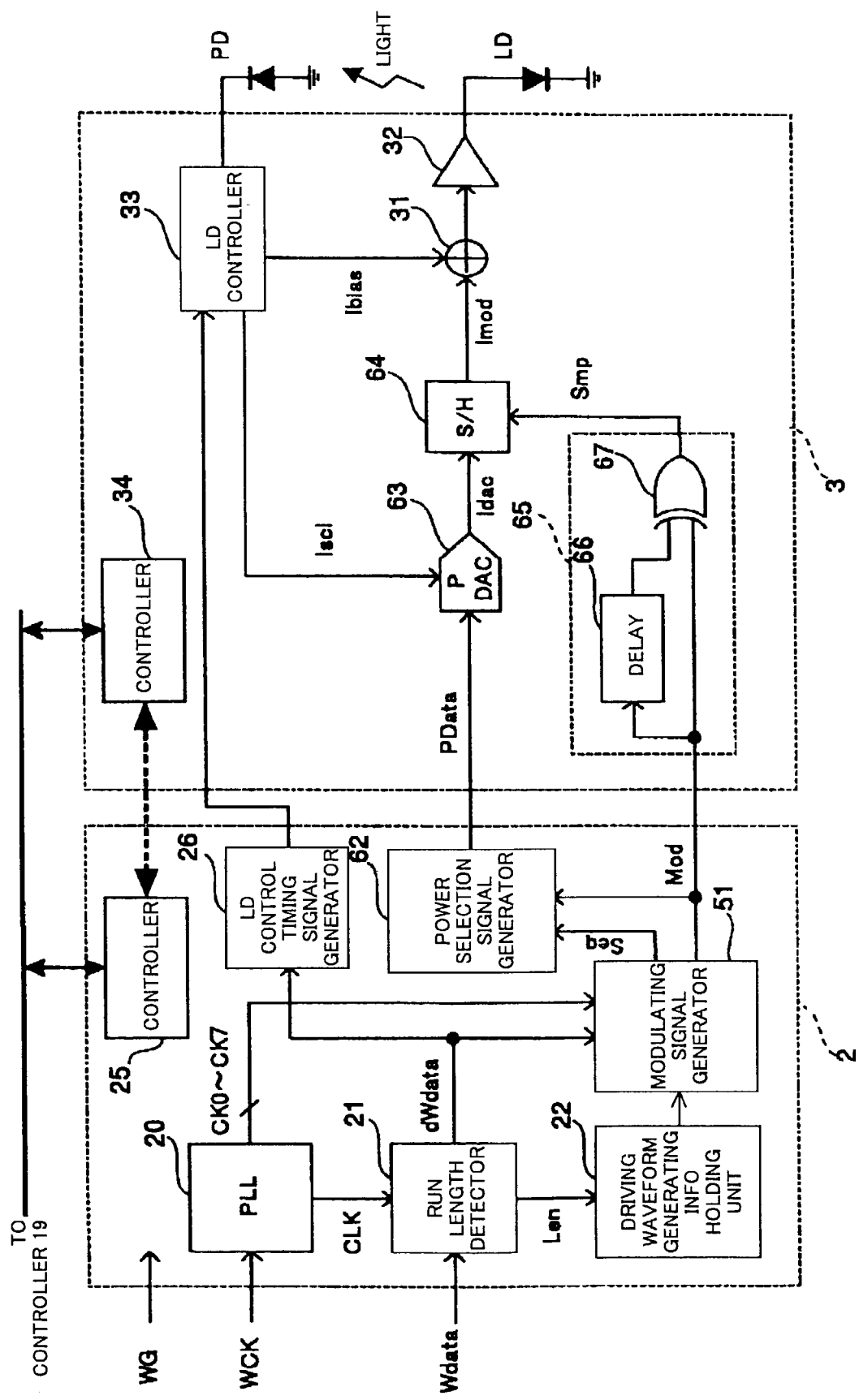
FIG. 24 is a system block diagram showing the structure of a fifth embodiment of the light source driving unit according to the present invention.
Figure 25:
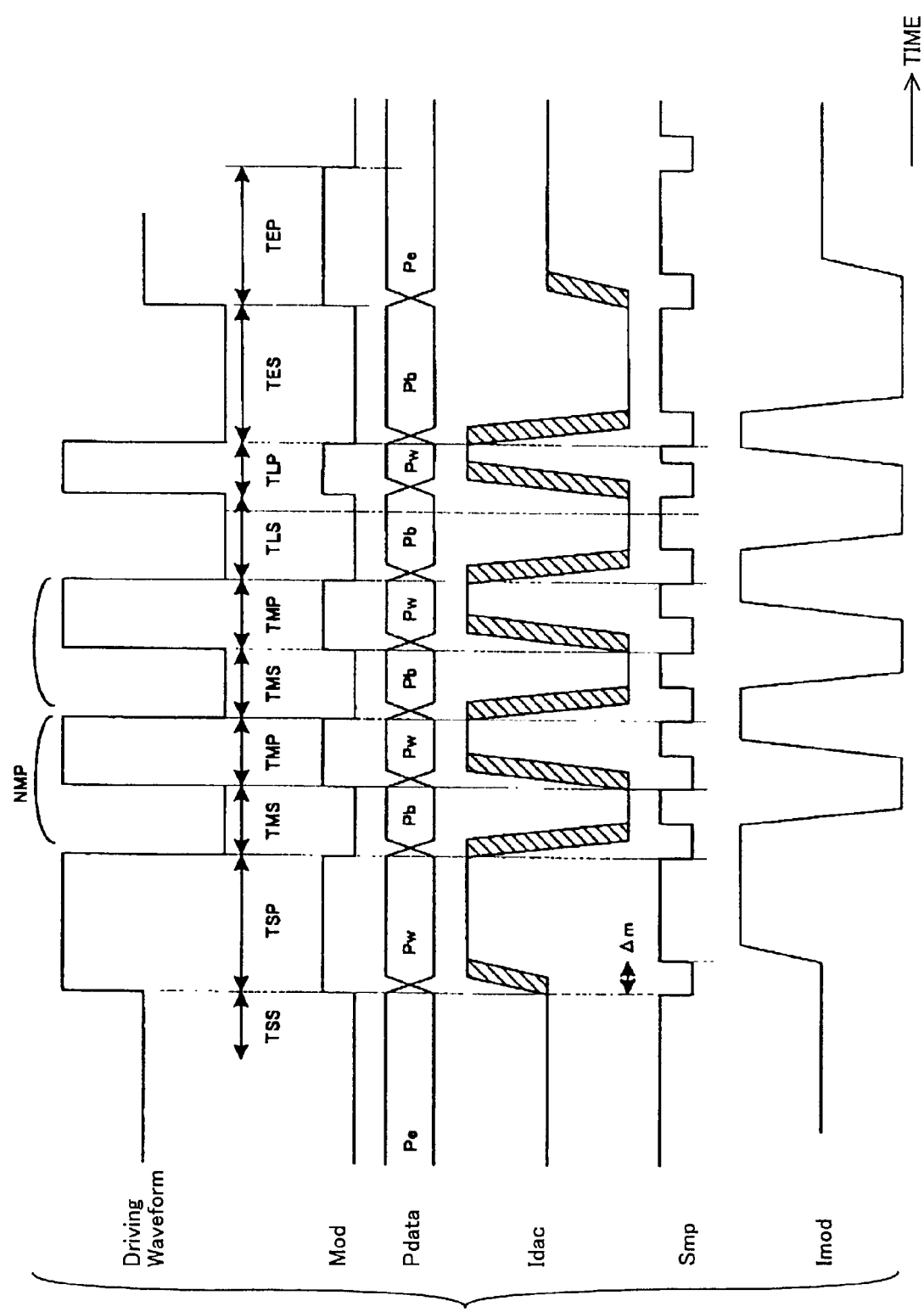
FIG. 25 is a timing chart showing signal waveforms at various parts of the light source driving unit shown in FIG. 24.

Next, a description will be given of a fifth embodiment of the light source driving unit according to the present invention. FIG. 24 is a system block diagram showing the structure of this fifth embodiment of the light source driving unit. In FIG. 24, those parts which are the same as those corresponding parts in FIG. 6 are designated by the same reference numerals, and a description thereof will be omitted. FIG. 25 is a timing chart showing signal waveforms at various parts of the light source driving unit shown in FIG. 24.

The modulating signal Mod is generated based on the driving waveform generating information (TSS, TSP, . . . ), similarly as described above.

A power setting signal generator 62 functions as a current selection signal generating means (or section) for generating irradiating level data PData which indicates the irradiating level of the light source LD depending on the modulating signal Mod and the sequencer state signal Seq.

For example, the power setting signal generator 62 may be formed by the power selection signal generator 52 shown in FIG. 19 or 22, the P0Data selector 56a, the P1Data selector 56b, and a selector (or switching unit) which selectively outputs the irradiating level data P0Data or P1Data depending on the modulating signal Mod.

A current source (DAC) 63 supplies a current Idac based on the irradiating level data PData. The output of the current source 63 becomes indefinite (does not become a desired value) for a predetermined time from an edge of the modulating signal, due to an indefinite period of the irradiating level data PData, a skew among bits of the irradiating level data PData, a response speed of the DAC forming the current source 63, and the like. In FIG. 25, the indefinite period of the current Idac is indicated by a hatching.

A sample and hold unit 64 generates the modulating current Imod by sampling and holding the current Idac by a sample signal Smp. In this particular case shown in FIG. 25, the current Idac is sampled during a high-level period of the sample signal Smp, and is held during a, low-level period of the sample signal Smp In other words, the current Idac is held during the indefinite period, and is sampled during other periods.

A sample signal generator 65 generates the sample signal Smp which has a low level (hold period) only for a predetermined time Δm from both rising and falling edges of the modulating signal Mod. The sample signal generator 65 may be formed by a delay circuit 66 which delays the modulating signal Mod by a predetermined time Δm, and an exclusive-OR circuit (EXOR) 67 which obtains an exclusive-OR of the modulating signal Mod and an output of the delay circuit 66. In other words, the sample and hold unit 64 and the sample signal generator 65 function as a control means (or section).

Accordingly, even if the skew exists among the bits of the irradiating level data PData, this is not reflected to the modulating current Imod until the output of the current source 63 becomes definite. For this reason, the optical waveform is unaffected by the skew, and it is possible to accurately form the recording marks on the information recording medium.

Therefore, according to the third through fifth embodiments of the light source driving unit, the skew among the signals will not affect the optical waveform by taking measures so that the modulating current does not vary due to the signal (data) which determines the modulating current at the timings in the vicinity where the transition of the signal (data) occurs.

Hence, the LD modulating signal generator integrated circuit 2 and the LD driving integrated circuit 3 may be made up of separate integrated circuits, and each of the integrated circuits 2 and 3 may be produced by a semiconductor process suited for obtaining the desired circuit characteristics. Accordingly, it is possible to realize a light source driving unit having a high performance at a low cost.

Figure 26:
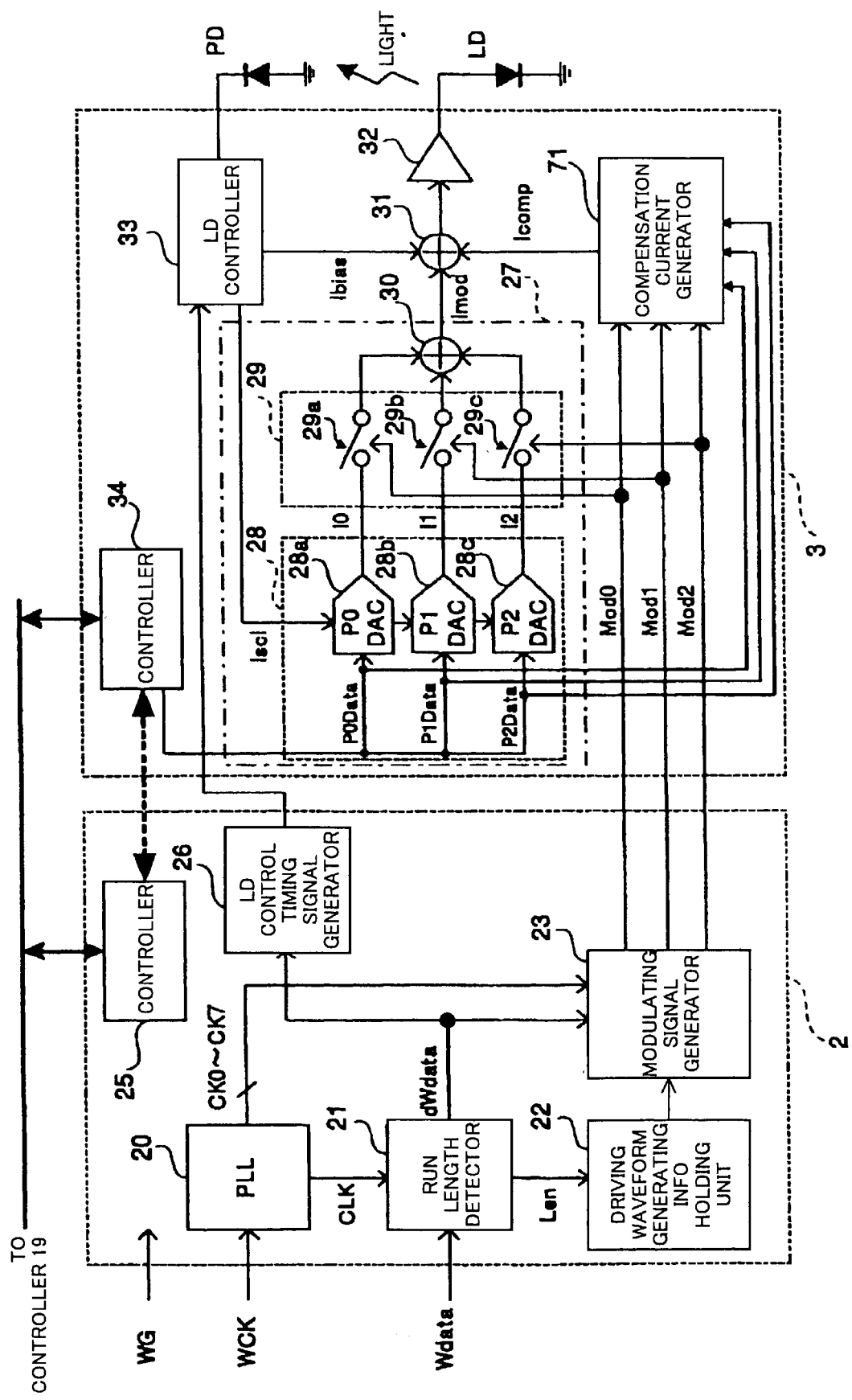
FIG. 26 is a system block diagram showing the structure of a sixth embodiment of the light source driving unit according to the present invention.

Next, a description will be given of a sixth embodiment of the light source driving unit according to the present invention. FIG. 26 is a system block diagram showing the structure of this sixth embodiment of the light source driving unit. In FIG. 26, those parts which are the same as those corresponding parts in FIG. 6 are designated by the same reference numerals, and a description thereof will be omitted.

Figure 27:
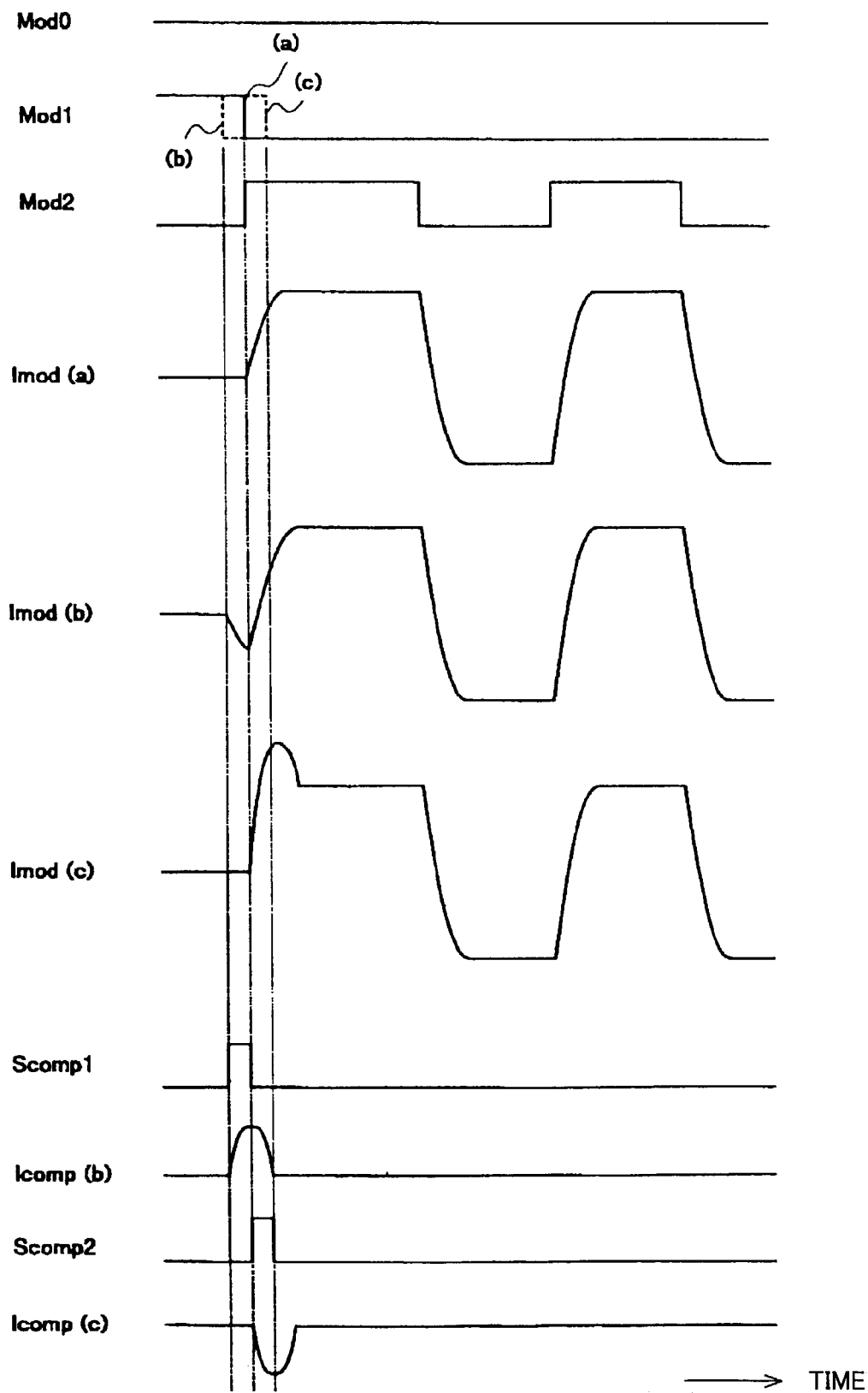
FIG. 27 is a timing chart showing signal waveforms at various parts of the light source driving unit shown in FIG. 26.

FIG. 27 is a timing chart showing signal waveforms at various parts of the light source driving unit shown in FIG. 26.

FIGS. 27(*a*) through 27(*c*) show waveforms of the modulating current Imod for explaining a case where a skew exists between the modulating signals Mod1 and Mod2. More particularly, FIG. 27(*a*) shows the modulating current Imod when no skew exists between the modulating signals Mod1 and Mod2. FIG. 27(*b*) shows the modulating current Imod when the modulating signal Mod1 is advanced compared to the modulating signal Mod2, and FIG. 27(*c*) shows the modulating current Imod when the modulating signal Mod1 lags the modulating signal Mod2.

In FIG. 26, a compensation current generator 71 functions as a compensating means (or section) for generating a compensation current Icomp which compensates for a distortion in the modulating current Imod caused by the skew, based on the modulating signals Mod0 through Mod2.

Figure 28:
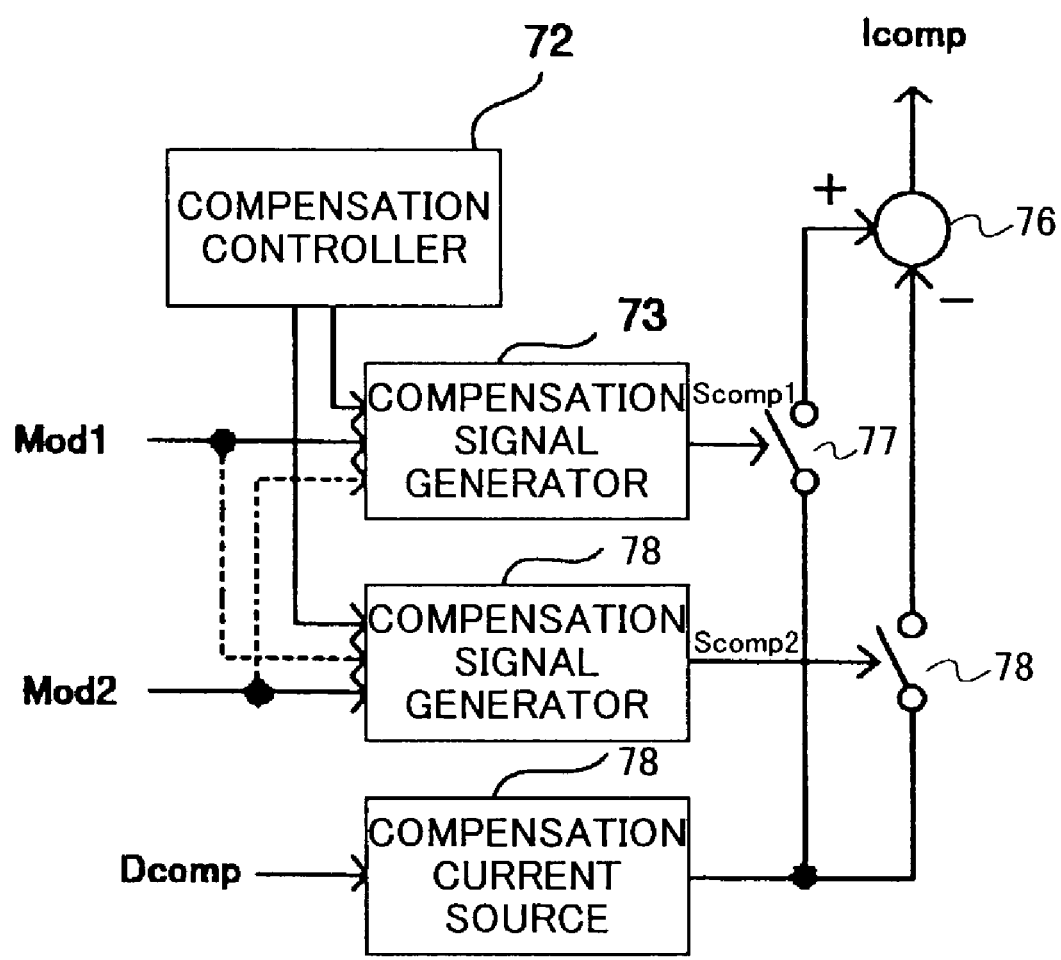
FIG. 28 is a system block diagram showing the internal structure of a compensation current generator shown in FIG. 26.

FIG. 28 is a system block diagram showing the internal structure of the compensation current generator 71 shown in FIG. 26. FIG. 28 shows the internal structure of the compensation current generator 71 for a case where the skew between the modulating signals Mod1 and Mod2 is to be compensated.

A compensation controller 72 shown in FIG. 28 controls generation of compensation signals Scomp1 and Scomp2, based on a phase relationship of the modulating signals Mod1 and Mod2. The compensation controller 72 also controls value of the compensation current Icomp. In other words, when the modulating signal Mod1 is advanced compared to the modulating signal Mod2 as shown in FIG. 27(*b*), the compensation signal Scomp1 is generated depending on the amount of skew, using the modulating signal Mod1 as a reference (the rising edge of the modulating signal Mod1 in this particular case), and the compensation current Icomp (b) shown in FIG. 27 is generated depending on the compensation signal Scomp1. On the other hand, when the modulating signal Mod1 lags the modulating signal Mod2 as shown in FIG. 27(*c*), the compensation signal Scomp2 is generated depending on the amount of skew, using the modulating signal Mod2 as a reference (the rising edge of the modulating signal Mod2 in this particular case), and the compensation current Icomp (c) shown in FIG. 27 is generated depending on the compensation signal Scomp2. In this case, the compensation is made so as to subtract the compensation current Icomp from the modulating current Imod.

The value of the compensation current Icomp is set by a compensation current source 75 based on a compensation current setting data Dcomp. An output of the compensation current source 75 is supplied to a subtracting terminal or an adding terminal of a subtracting unit 76 via switches 76 and 77 which are respectively controlled by the compensation signals Scomp1 and Scomp2 from compensation signal generators 73 and 74. When the value of the compensation current Icomp is varied depending on the difference between the currents I1 and I2, an appropriate skew compensation can be made even when the irradiating power level is varied. In addition, it is also possible to set the amount of the compensation current Icomp depending on the amount of skew, instead of setting the applying time of the compensation current Icomp.

Therefore, according to the sixth embodiment of the light source driving unit, the current can be applied to the light source so as to compensate for the distortion in the modulating current caused by the skew of the modulating signal. Hence, the recording marks can be accurately formed on the information recording medium without affecting the optical waveform.

Further, the LD modulating signal generator integrated circuit 2 and the LD driving integrated circuit 3 may be formed by separate integrated circuits, so that the semiconductor processes suited for obtaining the desired circuit characteristics may be employed to produce the integrated circuits. As a result, it is possible to realize a light source driving unit having a high performance at a low cost.

In each of the embodiments described above, the first integrated circuit which functions as the light source driving means (or section) and the second integrated circuit which functions as the means (or section) for generating the modulating signals and the irradiating level instruction signal are mounted within a single package. Hence, the transmission lines of the modulating signals and the irradiating level instruction signal become constant regardless of the structure and layout of the information recording and reproducing apparatus (particularly the optical pickup), thereby facilitating the adjustment and compensation of the skew. Moreover, the size of the optical pickup can easily be reduced because it is possible to reduce the number of signal lines to be transmitted via the FPC.

Furthermore, when the first integrated circuit which functions as the light source driving means (or section) and the second integrated circuit which functions as the means (or section) for generating the irradiating level instruction signal and the modulating signal according to the binary signal to be recorded on the information recording medium are mounted on the optical pickup, and the skew caused by the transmission lines between the first and second integrated circuits can be suppressed because the transmission lines between the first and second integrated circuits becomes relatively short. Moreover, no transmission is made via a bent portion of the FPC, which would otherwise cause a change in the transmission line characteristic due to bending and expanding of the transmission lines. Therefore, the amount of skew does not vary, and the skew can easily be adjusted and compensated.

In addition, even if the skew exists among the modulating signals, the optical waveform is unaffected thereby, and it is possible to obtain a desired optical waveform. Thus, the recording marks can be formed accurately on the information recording medium. Further, since the first and second integrated circuits can be produced by semiconductor processes suited for obtaining the desired circuit characteristics, it is possible to realize a light source driving unit and an optical information recording and reproducing apparatus having a high performance at a low cost.

Therefore, according to the first through sixth embodiments described above, it is possible to realize a light source driving unit which can suppress an error of a light modulating waveform from a desired value, which is caused by skew or waveform distortion of a light modulating control signal, when carrying out a high-speed recording and a high-density recording with respect to an information recording medium, and to realize an optical storage apparatus which uses such a light source driving unit.

Figure 29:
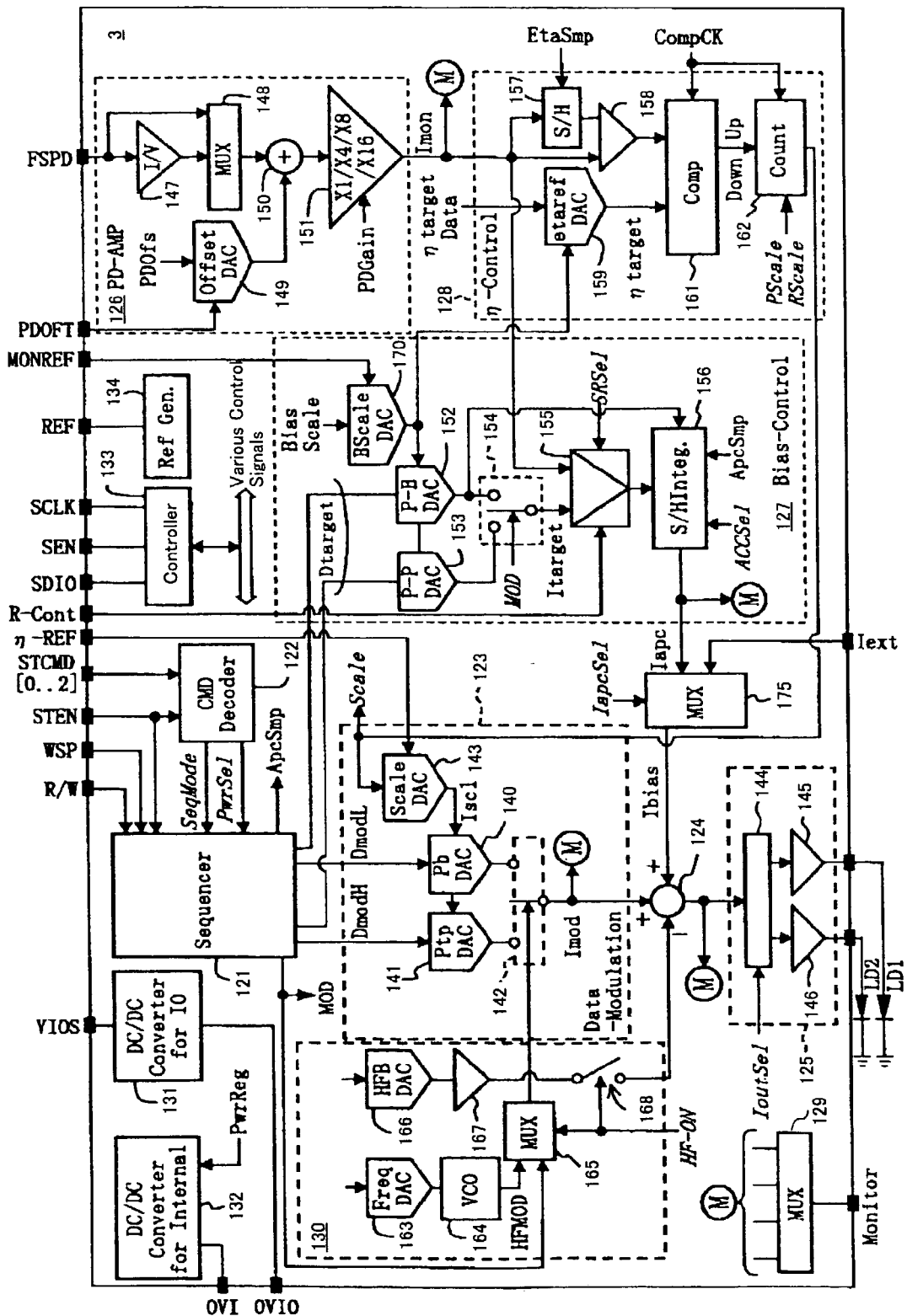
FIG. 29 is a system block diagram showing the structure of an LD driving integrated circuit shown in FIG. 4.
Figure 30:
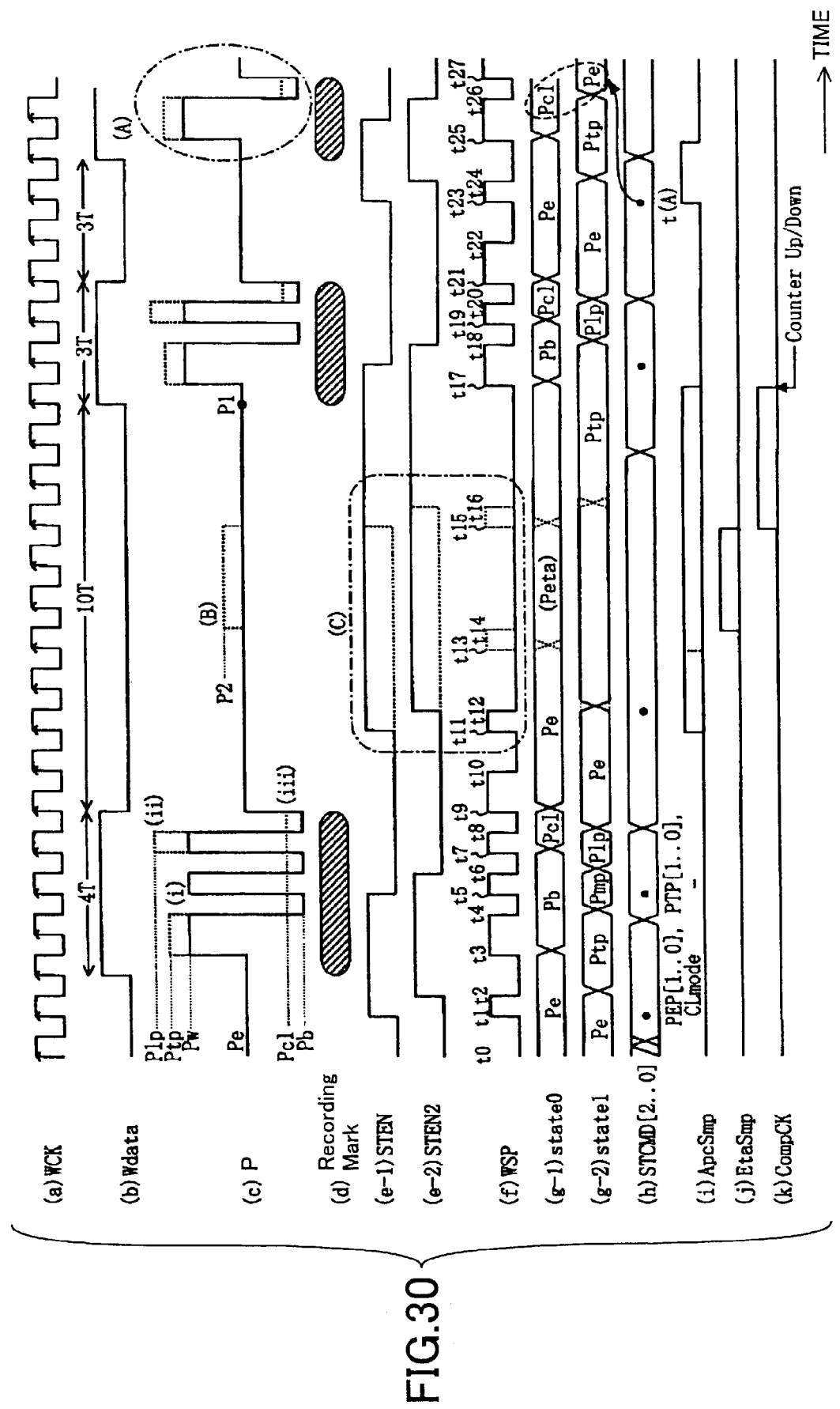
FIG. 30 is a timing chart showing signal waveforms at various parts of the LD driving integrated circuit shown in FIG. 29.

Next, a description will be given of the detailed structure of the LD controller 9 and the LD driving unit 12 shown in FIG. 4, by referring to FIGS. 29 and 30. FIG. 29 is a system block diagram showing the structure of the LD driving integrated circuit 3 which integrally comprises the LD controller 9 and the LD driving unit 12. FIG. 30 is a timing chart showing signal waveforms at various parts of the LD driving integrated circuit 3 shown in FIG. 29.

The LD driving integrated circuit 3 shown in FIG. 29 is arranged in a vicinity of the light sources LD1 and LD2 which are to be driven, and is mounted on the optical pickup 101 shown in FIG. 3.

On the other hand, the LD modulating signal generator 10 (LD modulating signal generator integrated circuit 2), which supplies the LD modulating signal WSP to the LD driving integrated circuit 3, is mounted on a circuit board together with other signal processing sections. Signal lines connecting the two integrated circuits 2 and 3 are provided on the FPC, as described above.

The LD modulating signal generator 10 generates the LD modulating signal WSP shown in FIG. 30(*f*) and a state signal STEN shown in FIG. 30(*e*-1) based on the recording data signal Wdata shown in FIG. 30(*b*), using the recording clock signal WCK shown in FIG. 30(*a*) as a reference. For the sake of convenience, FIG. 30 neglects and does not show the delays of the LD modulating signal WSP and the state signal STEN with respect to the recording data signal Wdata, but normally, the signals WSP and STEN are delayed by a predetermined number of clock pulses with respect to the recording data signal Wdata due to the generating circuitry. It is also assumed for the sake of convenience that, the LD modulating signal WSP has been subjected to an optimum pulse width control with respect to the information recording medium used. The LD modulating signal generator 10 also generates a command signal STCMD.

The LD driving integrated circuit 3 includes a command decoder 122 which converts the state signal STEN and the command signal STCMD supplied from the LD modulating signal generator 10 into mode control signals SeqMode which indicate the irradiating level and the irradiating mode, a sequencer 121 which controls the irradiating level based on the mode control signals SeqMode and the LD modulating signal WSP and the state signal STEN supplied from the LD modulating signal generator 10, and a data modulator (Data-Modulation) 123 which generates the LD modulating current Imod based on the modulating signal MOD and modulating data DmodL and DmodH supplied from the sequencer 121.

The sequencer 121 functions as a state control means (or section). Further, the mode control signals SeqMode functions as transition rule modifying signals. Although not shown in FIG. 29, the mode control signals SeqMode may be generated by the controller 133. The command decoder 122 functions as a command demodulating means (or section).

The LD driving integrated circuit 3 also includes a PD amplifier (PD-AMP) 126 which carries out an offset adjustment and a gain adjustment with respect to the detection signal which is received from the monitoring light receiving unit which monitors a portion of the light emitted from the light source 102, a bias current controller (Bias-Control) 127 which controls a bias current Iapc so that a monitor signal Imon supplied from the PD amplifier 126 matches a reference signal Itarget which is generated from a target level signal Dtarget supplied from the sequencer 121, a bias current selector (MUX) 129 which outputs the bias current Ibias by selecting the bias current Ibias output from the bias current controller 127 or an external bias current Iext, and a differential quantum efficiency controller (-ηControl) 128 which detects the differential quantum efficiency η of the light source LD (light source LD1 or LD2) which is driven by the monitor signal Imon and controls a scale signal Scale for scaling the LD driving current depending on the detected result.

Furthermore, the LD driving integrated circuit 3 includes a high-frequency modulator (HF-Modulation) 130 which generates an offset current Ihfmofs which is applied to the bias current Ibias when high-frequency multiplexing with a high-frequency multiplexing signal, a current adder 124 which adds the bias current Ibias and the modulating current Imod and subtracts the high-frequency multiplexing offset current Ihfmofs, a current driver 125 which amplifies a current supplied from the current adder 124 and supplies the LD driving current ILD for driving the light source LD1 or LD2, and a controller 133 which supplies control signals to various parts within the LD driving integrated circuit 3 in response to control commands supplied directly from the controller 19 shown in FIG. 4 or via the LD modulating signal generator 10.

The current adder 124 and the current driver 125 function as a current driving means (or section). The bias current controller 127 and the differential quantum efficiency controller 128 may function as a light emission control means (or section) for controlling the amount of light emitted from the light source LD.

In FIG. 30, it is assumed for the sake of convenience that the information recording medium 100 used is a phase change type information recording medium such as the CD-RW disk and the DVD-RW disk. In addition, it is assumed that the light source LD is controlled to emit light with the optical modulated waveform P shown in FIG. 30(c) and recording marks shown in FIG. 30(d) are formed on a recording surface of the information recording medium 100, based on the recording data signal Wdata shown in FIG. 30(b) and the recording clock signal WCK shown in FIG. 30(a).

Generally, the recording marks are formed on the phase change type information recording medium using the 3-level multi-pulses having the write power Pw, the erase power Pe and the bottom power Pb of the optical modulated waveform P. An accurate recording can be made by accurately controlling the recording power level and the pulse width and pulse intervals of each of the pulses.

In this embodiment, it is possible to set the power of the first pulse, the final (last) pulse or the final bottom pulse (also referred to as a cooling pulse), as indicated by dotted lines (i), (ii) and (iii) in FIG. 30(c).

When the recording marks are formed on the information recording medium, thermal effects may cause the edges of the recording marks to vary according to the adjacent space lengths, depending on the information recording medium or the recording linear velocity used. In order to avoid the edges of the recording marks from varying, each pulse width of the optical modulated waveform is conventionally varied by taking into consideration the adjacent space length.

In this embodiment, the power of the pulses is additionally made variable by taking into consideration the adjacent space length. As a result, the amount of heat applied on the information recording medium becomes equivalent to the case where the pulse width is corrected depending on the adjacent space length, which is essentially the same as improving the pulse width setting (controlling) resolving power. Hence, this embodiment is particularly suited for application to the high-speed recording.

Next, a description will be given of the light source LD which is driven and controlled.

Figure 31:
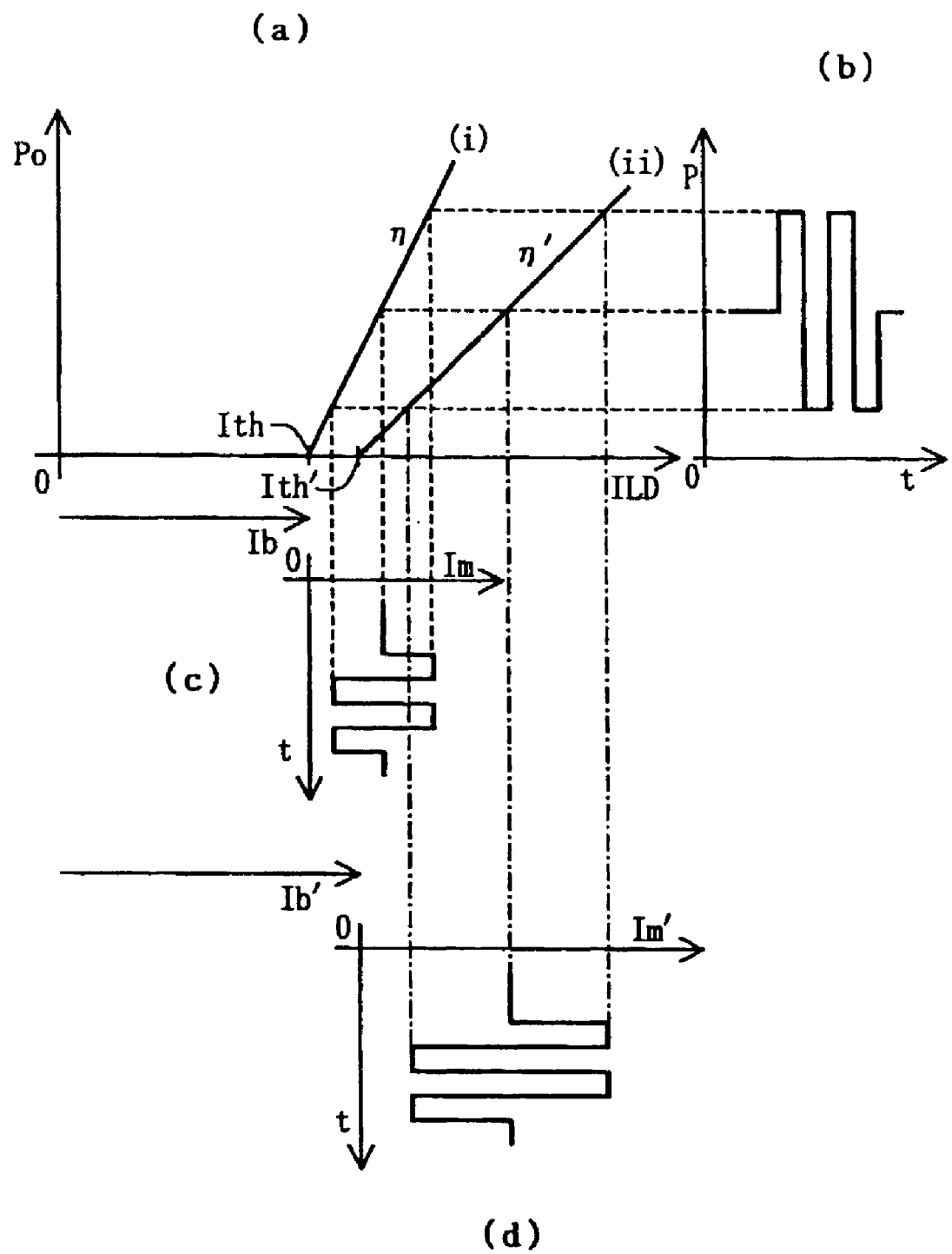
FIG. 31 is a diagram showing a driving current versus optical output characteristic of the light source.

FIG. 31 is a diagram showing a driving current versus optical output characteristic of the light source LD.

Normally, the optical output Po of a laser diode LD with respect to the LD driving current ILD can be approximated by the computation process based on the formula (1) described above (Po=$\eta \cdot$(ILD−Ith)).

When the LD driving current ILD is set to the sum (Ib+Tm) of the bias current Ib and the modulating current Im in order to obtain the desired optical modulated waveform P shown in FIG. 31(b), it is desirable that the bias current Ib is approximately equal to the threshold current Ith, and the modulating current Im satisfies P=$\eta \cdot$Im as shown in FIG. 31(c).

But in general, the threshold current Ith and the differential quantum efficiency $\eta$ not only vary depending on the individual light source LD but also vary depending on a temperature change. For this reason, it is desirable to control the bias current Ib and the modulating current Im depending on the variation of the threshold current Ith and the differential quantum efficiency $\eta$, in order to constantly obtain the desired optical modulated waveform P.

For example, if the threshold current Ith and the differential quantum efficiency $\eta$ shown in (i) of FIG. 31(a) change to threshold current Ith' and the differential quantum efficiency $\eta'$ as shown in (ii), the bias current Ib' should be controlled to be approximately equal to the threshold current Ith', and the modulating current Im' should be controlled so that the optical modulated waveform P becomes P=$\eta' \cdot$Im' as shown in FIG. 31(d).

In the LD driving integrated circuit 3 shown in FIG. 29, the bias current controller 127 mainly carries out the bias current control function, and the differential quantum efficiency controller 128 mainly carries out the modulating current control function.

Next, a more detailed description will be given of the operation and structure of the LD driving integrated circuit 3 shown in FIG. 29.

[Sequencer]

The sequencer 121 controls the irradiating level of the light source LD based on the LD modulating signal WSP and the state signal STEN.

Figure 32:
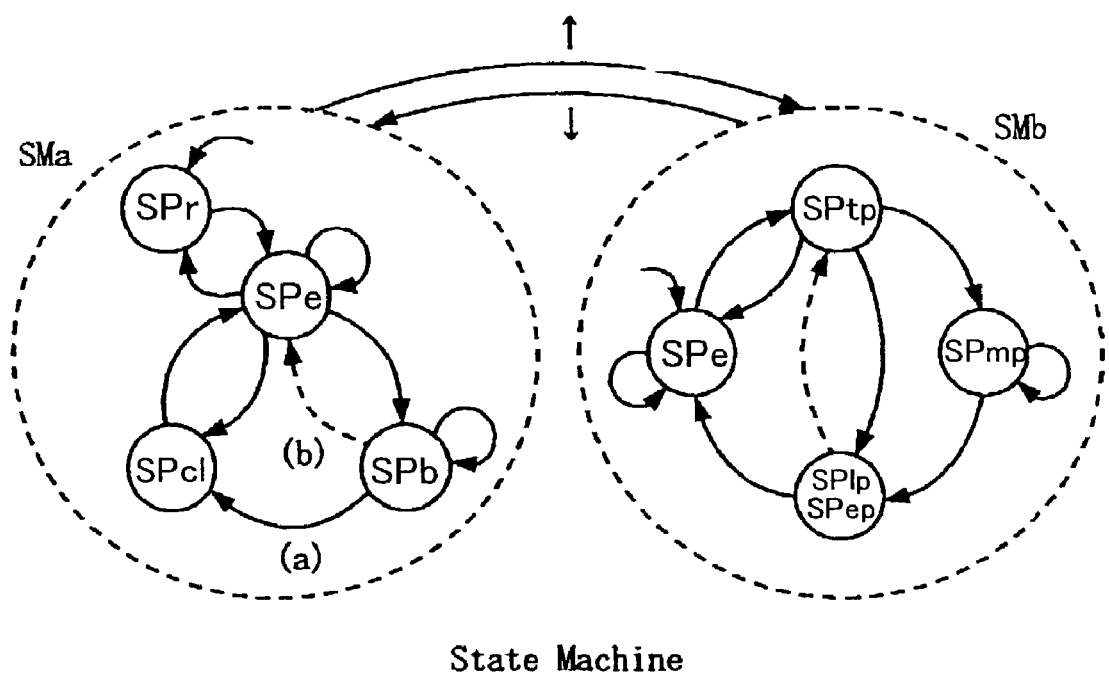
FIG. 32 is a state transition diagram of a sequencer shown in FIG. 29.

FIG. 32 is a state transition diagram of the sequencer 121 shown in FIG. 29. In FIG. 32, each state corresponding to an irradiating level of the light source LD, and each of state machines SMa and SMb operate independently. The modulating data DmodL and DmodH are output depending on present states state0 and state1 of the state machines SMa and SMb. The state machines SMa and SMb respectively function as a first state control means (or section) and a second state control means (or section). In addition, the present state of the state machines SMa and SMb may be read by a state reading means (or section) provided within the controller 133, and the present state may be read via the controller 133, for example.

In other words, modulating data corresponding to each state is set in advance, and the modulating data corresponding to the present state of the state machine is selectively output from the state machine.

In addition, the LD modulating signal WSP is output as the modulating signal MOD at the time of the recording, and a low-level signal is output as the modulating signal MOD at the time of the reproduction.

In FIG. 29, the modulating signal MOD is supplied to the data modulator 123 via a multiplexer (MUX) 165, but it is assumed in this case that the multiplexer 165 selectively outputs the modulating signal MOD.

In the data modulator 123 at the next stage, the modulating data DmodL is selected during the low-level period of the modulating signal MOD, and the modulating data DmodH is selected during the high-level period of the modulating signal MOD. Hence, each state within the state machine SMa corresponds to the irradiating level when the LD modulating signal WSP has the low level, and each state within the state machine SMb corresponds to the irradiating level when the LD modulating signal WSP has the high level.

For example, when state0=SPb and the modulating signal MOD has the low level, the irradiating level of the light source LD becomes the bottom power Pb. When state1=SPmp and the modulating signal MOD has the high level, the irradiating level of the light source LD becomes the write power Pw.

The state machine SMa makes a state transition in response to the rising edge of the LD modulating signal WSP, and the state machine SMb makes a state transition in response to the falling edge of the LD modulating signal WSP.

In other words, the state machines SMa and SMb make the state transition (vary the modulating data) when the modulating data output therefrom is not selected. As a result, the irradiating level of the light source LD will not vary even when the modulating data varies.

In addition, each of the modulating data corresponding to the powers of a first pulse Ptp, a final pulse Plp and a final bottom pulse Pcl are dynamically variable depending on the recording data pattern or the like.

In other words, a plurality of modulating data (Ptp in 4-levels Ptp0 through Ptp3) which are set in advance are selected depending on a power selection signal PwrSel supplied from the command decoder 122. The power level to be selected is instructed by the command signal STCMD, and is converted into the power selection signal PwrSel by the command decoder 122. The power selection signal PwrSel functions as irradiating level selecting information. An irradiating level selecting means (or section) for selecting one irradiating level based on the irradiating level selecting information may be provided within the sequencer 121.

Next, a description will be given of the transition conditions of each of the state machines SMa and SMb.

FIGS. 30(g-1) and 30(g-2) show examples of the state transitions, where transition times of the LD modulating signal WSP shown in FIG. 30(f) are denoted by t0 through t27. Further, a state signal STEN2 shown in FIG. 30(e-2) is obtained by retiming the state signal STEN shown in FIG. 30(e-1) in response to the falling edge of the LD modulating signal WSP. The state machine SMa makes the state transitions based on the state signal STEN2.

Accordingly, it is possible to secure a sufficiently long data defining (settling) time of the state signal STEN2, with respect to the rising edge of the LD modulating signal WSP which is used as a reference for the state transitions of the state machine SMa, thereby enabling a stable operation.

State Machine SMa:

Unless otherwise indicated, it is assumed for the sake of convenience that the state machine SMa makes the state transitions in synchronism with the rising edge of the LD modulating signal WSP.

[State SPr]

The state machine SMa is in the state SPr in an initial state and at the time of the reproduction when a write signal R/W is R/W=0 to indicate a read. When the write signal R/W rises to a high level and the recording starts, a transition is made to the state SPe. This transition to the state SPe does not necessarily have to be synchronized to the LD modulating signal WSP.

[State SPe]

A transition is made from the state SPe to the next state when the state signal STEN2 has the high level. Normally, the transition is made to the state SPb at the time t3, for example. However, the transition may be made to the state SPc1 at the time t25, for example, under special transition conditions (A) which will be described later. In addition, a transition is made to the state SPr when the write signal R/W falls to the low level and the recording ends.

[State SPb]

A transition is made from the state SPb to the next state when the state signal STEN2 has the low level, in the case shown in FIG. 30, the transition is made to the state SPc1 at the time t7, for example. In addition, the transition is made to the state SPe depending on the mode control signals SeqMode.

[State SPc1]

A transition is made from the state SPc1 to the state Pe at the time t9, for example.

Furthermore, the return to the state SPr (reproducing mode) may be made after the write signal R/W becomes R/W=0 to indicate the read, when the state first returns to the state SPe or, forcibly when the write signal R/W becomes R/W=0 to indicate the read.

State Machine SMb:

Unless otherwise indicated, it is assumed for the sake of convenience that the state machine SMb makes the state transitions in synchronism with the falling edge of the LD modulating signal WSP.

[State SPe]

The state machine SMb is in the state SPe in an initial state. A transition is made from the state SPe to the state SPtp at the time t2, for example, when the state signal STEN has the high level.

[State SPtp]

A state transition is made to the state SPmp at the time t4, example, when the state signal STEN has the high level. In addition, a transition is made to the state SPlp at the time t18, for example, when the state signal STEN has the low level. A transition may be made to the state SPe under special transition conditions (A) which will be described later.

[State SPmp]

A transition is made to the state SPlp at the time t6, for example, when the state signal STEN has the low level. The state machine SMb remains in the state SPmp when the state signal STEN has the high level.

[State SPlp]

A transition is made to the state SPe at the time t8, for example.

In this embodiment, the transition mode of the state machines SMa and SMb can be dynamically varied via the command decoder 122.

For example, in order to generate a waveform (Ptp→Pc1) surrounded by a one-dot chain line (A) in FIG. 30(c), the mode is specified at the time t(A), and the state machines SMa and SMb are made to make a state transition under the special transition conditions (A).

Each of the state machines SMa and SMb may be initialized via the controller 133 by issuing a command. This is effective when it is desirable to forcibly return the state machine SMa and/or SMb to the initial state.

[Command Decoder]

The command decoder 122 converts the state signal and the command signal STCMD into the mode control signals SeqMode which specify the irradiating level and the irradiating mode of the light source LD. The mode control signals SeqMode include the power selection signal PwrSel and a transition mode signal of the state machine.

The command decoder 122 inputs the command signal STCMD as the data in response to both rising and falling edges of the state signal STEN, using the state signal STEN as a clock signal.

In this embodiment, it is assumed that the command signal STCMD is a 3-bit signal. Hence, the command decoder 122 inputs a 2-bit final pulse power selection signal PEP and a 1-bit CL pulse transition mode signal CLMode in response to the rising edge of the state signal STEN, and inputs a 2-bit first pulse power selection signal PTP in response to the falling edge of the state signal STEN. The signals input to the command decoder 122 are supplied to the sequencer 121.

The final pulse power selection signal PEP selects the final pulse power Plp and the cooling pulse power Pcl, and the CL pulse transition mode signal CLMode specifies the mode of the special transition conditions (A). In addition, the first pulse power selection signal PTP selects the first pulse power Ptp.

The mode control signals SeqMode are not limited to the above, and may be determined appropriately to suit the desired optical waveform.

[Data Modulator]

The data modulator 123 generates the LD modulating current Imod based on the modulating signal MOD and the modulating data DmodL and DmodH supplied from the sequencer 121.

A Pb DAC 140 supplies a current based on the modulating data DmodL, and a Ptp DAC 141 supplies a current based on the modulating data DmodH. The Pb DAC 140 functions as a first current source, and the Ptp DAC 141 functions as a second current source.

A switch 142 selectively outputs the current from the Pb DAC 140 or the Ptp DAC 141 as the LD modulating current Imod, based on the selection signal which is supplied from the multiplexer 165. At the time of the recording, the modulating signal MOD, that is, the LD modulating signal WSP, is supplied as the selection signal from the multiplexer 165. The current from the Ptp DAC 141 is selected during the high-level period of the selection signal, that is, the modulating signal MOD, and the current from the Pb DAC 140 is selected during the low-level period of the modulating signal MOD.

The full scale Iscl of the Pb DAC 140 and the Ptp DAC 141 is supplied from a scale DAC 143. The full scale Iscl is set according to the scale signal Scale supplied from the differential quantum efficiency controller 128. The scale DAC 143 functions as a scale setting means (or section).

Furthermore, a full scale Ifull of the scale DAC 143 is supplied from a terminal ηREF, and this full scale Ifull may be set depending on the differential quantum efficiency η of the light source LD used. The method of computing and setting the full scale Iscl will be described later.

Accordingly, the output currents I0 and I1 of the Pb DAC 140 and the Ptp DAC 141 can be computed based on the following formulas (9) and (10). In this embodiment, 8-bit DACs are used for the Pb DAC 140, the Ptp DAC 141 and the scale DAC 143.

$$I0=(DmodL/255)*(Scale/255)*Ifull \quad (9)$$

$$I1=(DmodH/255)*(Scale/255)*Ifull \quad (10)$$

As described above, the modulating data DmodL and DmodH change at timings when not selected by the switch 142. For this reason, if the response speeds of the Pb DAC 140 and the Ptp DAC 141 are sufficiently high, the changes in the output currents I0 and I1 of the Pb DAC 140 and the Ptp DAC 141 also occur while not selected by the switch 142. As a result, the change in the modulating current Imod is determined solely by the changing timing of the modulating signal MOD.

Figure 33:
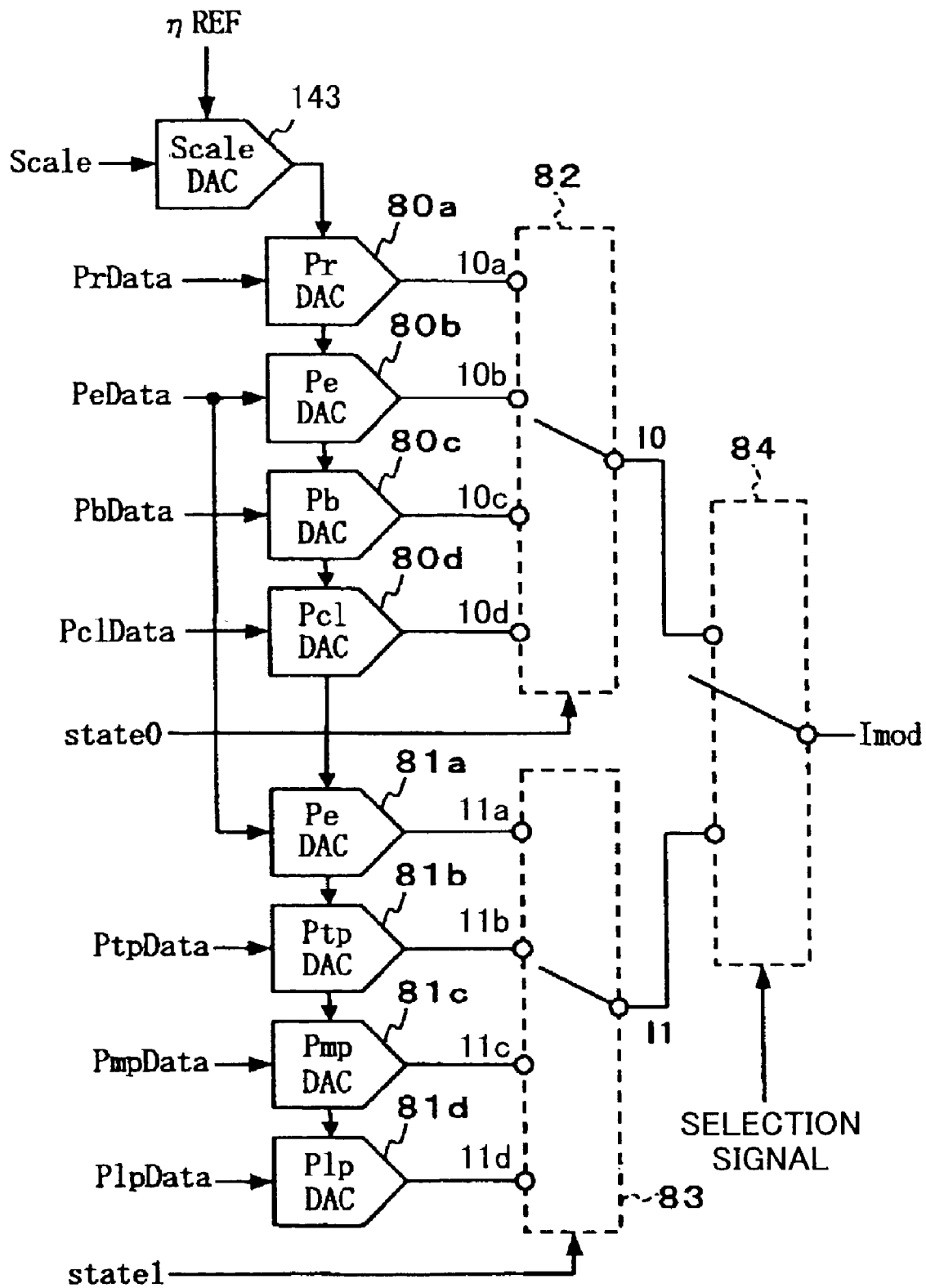
FIG. 33 is a system block diagram showing another embodiment of the structure of a data modulator shown in FIG. 29.

FIG. 33 is a system block diagram showing another embodiment of the structure of the data modulator 123 shown in FIG. 29.

Modulating data PrData through PlpData corresponding to each of the states of the state machines SMa and SMb are supplied to the data modulator 123 shown in FIG. 33 from the sequencer 121 shown in FIG. 29. Based on these modulating data PrData through PlpData, a Pr DAC 80a, a Pe DAC 80b, a Pb DAC 80c, a Pcl DAC 80d, a Pe DAC 81a, a Ptp DAC 81b, a Pmp DAC 81c and a Plp DAC 81d output currents I0a through I0d and I1a through I1d. The DACs 80a through 80d and the DACs 81a through 81d function as a plurality of current sources. In addition, the DACs 80a through 80d and the switch 82 function as a first current source means (or section), and the DACs 81a through 81d and the switch 83 function as a second current source means (or section).

A switch 82 selectively outputs one of the currents I0a through I0d depending on the signal state0 which indicates the present state of the state machine SMa. Similarly, a switch 83 selectively outputs one of the currents I1a through I1d depending on the signal state1 which indicates the present state of the state machine SMb.

A switch 84 selectively outputs one of the currents I0 and I1 supplied from the switches 82 and 83, as the LD modulating current Imod, based on the selection signal which is supplied from the multiplexer 165, similarly to the switch 142 shown in FIG. 29.

Similarly as in FIG. 29, the scale DAC 143 determines the full scale of each of the Pr DAC 80a, the Pe DAC 80b, the Pb DAC 80c, the Pcl DAC 80d, the Pe DAC 81a, the Ptp DAC 81b, the Pmp DAC 81c and the Plp DAC 81d.

According to this embodiment, the switching is carried out by the switch 82 or 83 while the current I0 or I1 output therefrom is not selected by the switch 84. Hence, the currents I0 and I1 change while not selected by the switch 84. Therefore, similarly to the embodiment shown in FIG. 29, the change in the modulating current Imod is determined solely by the changing timing of the modulating signal MOD.

Moreover, the changing speeds of the currents I0 and I1 are determined by the switching speeds of the switches 82 and 83, and the response speeds of the Pr DAC 80a, the Pe DAC 80b, the Pb DAC 80c, the Pcl DAC 80d, the Pe DAC 81a, the Ptp DAC 81b, the Pmp DAC 81c and the Plp DAC 81d do not need to be high. Thus, this embodiment is effective when it is difficult to realize high-speed DACs.

Since the currents I0b and I1a are the same, a single DAC may be used in common as the Pe DAC 81a and the Pe DAC 80b.

The Pr DAC 80a is used at the time of the reproduction, and the Pe DAC 80b, the Pb DAC 80c and the Pcl DAC 80d are used at the time of the recording. Hence, a single DAC may be used in common as the Pr DAC 80a and one of the Pe DAC 80b, the Pb DAC 80c and the Pdl DAC 80d.

Figure 34:
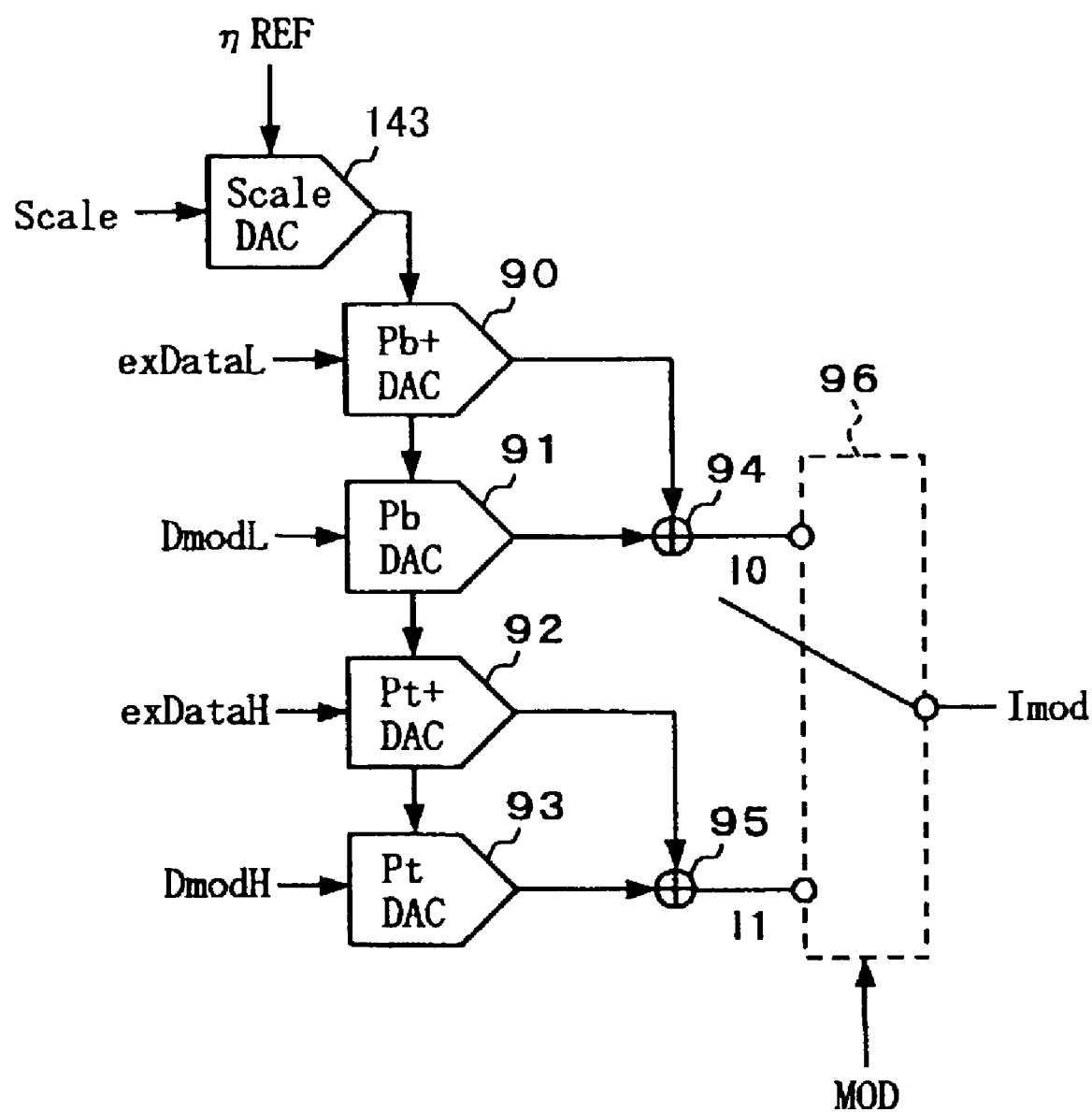
FIG. 34 is a system block diagram showing still another embodiment of the structure of the data modulator shown in FIG. 29.
Figure 35:
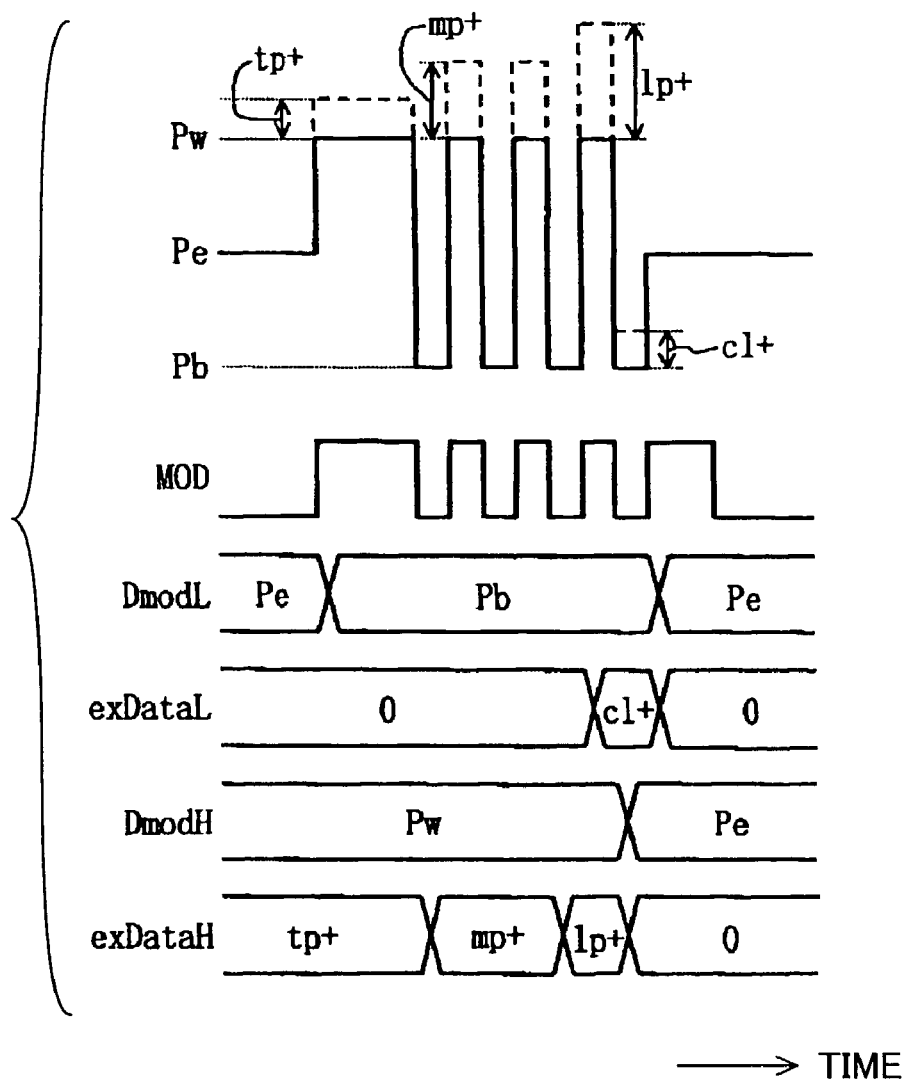
FIG. 35 is a timing chart showing signal waveforms at various parts of the data modulator shown in FIG. 34.

FIG. 34 is a system block diagram showing still another embodiment of the structure of the data modulator 23, shown in FIG. 29. FIG. 35 is a timing chart showing signal waveforms at various parts of the data modulator 23 shown in FIG. 34.

In addition to the modulating data DmodL and DmodH shown in FIG. 35, the data modulator 23 shown in FIG. 34 receives adding data exDataL and exDataH shown in FIG. 35 from the sequencer 121 shown in FIG. 29. The adding data exDataL and exDataH are also output depending on the state machines SMa and SMb.

A Pb+ DAC 90, a Pb DAC 91, a Pt+ DAC 92 and a Pt DAC 93 output currents based on the data supplied thereto. The DACs 91, 93, 90 and 92 respectively function as first, second, third and fourth current sources.

An adder 94 adds the output currents of the Pb+ DAC 90 and the Pb DAC 91, and outputs the current I0. An adder 95 adds the output currents of the Pt+ DAC 92 and the Pt DAC 93, and outputs the current I1.

A switch 96 selects the current I0 or I1 based on the modulating signal MOD shown in FIG. 35, and outputs the LD modulating current Imod. Similarly as in FIG. 29, the scale DAC 43 determines the full scale of the Pb+ DAC 90, the Pb DAC 91, the Pt+ DAC 92 and the Pt DAC 93.

The Pb+ DAC 90 and the Pt+ DAC 92 simply output the adding amounts, and do not need to have a large dynamic range. Hence, the full scale of the Pb+DAC 90 and the Pt+ DAC 92 may be set smaller than the full scales of the Pb DAC 91 and the Pt DAC 93, so as to reduce the number of bits of the adding data. In this case, it is possible to reduce the number of bits of the register which holds the data.

[Current Driver]

The current driver 125 shown in FIG. 29 amplifies the current supplied from the current adder 124, and outputs the LD driving current ILD of the light source LD1 or LD2.

A switch 144 supplies the output current of the current adder 124 to a current amplifier 145 or 146, depending on a selection signal IoutSel. The current amplifiers 145 and 146 amplify the current supplied from the switch 144 by a predetermined amplification factor Ai, and supplies the LD driving current ILD to the light source LD1 or LD2.

The LD driving current ILD can be computed based on the following formula (11), where an offset current Ihfmofs is zero when no high-frequency multiplexing is carried out. Of course, it is possible to turn the offset current Ihfmofs OFF during the high-frequency multiplexing, and to add the offset current Ifhmofs when not carrying out the high-frequency multiplexing.

$$ILD = Ai^* (Ibias + Imod - Ihfmofs) \quad (11)$$

When Ib=Ai*(Ibias−Ihmofs) and Im=Ai*Imod and the current Ib is controlled so as to become equal to the threshold current Ith as shown in FIG. 31, the waveform of the current Im, that is, the modulating current Imod, becomes proportional to the optical waveform.

In this embodiment, a case where the light sources LD1 and LD2 are simultaneously driven is not considered.

Therefore, as may be readily understood from the description given heretofore, the pulse width of the optical modulated waveform of the light source LD is determined solely by the modulating signal WSP. Hence, the optical waveform is unaffected even when a skew exists between the two signals (WSP and STEN) output from the LD modulating signal generator 10, and the recording marks can accurately be formed on the information recording medium.

Accordingly, the LD modulating signal generator 10 may be formed by an integrated circuit different from that of the LD driving unit 12. In other words, the LD modulating signal generator integrated circuit 2 and the LD driving integrated circuit 3 may be made up of separate integrated circuits, and each of the integrated circuits 2 and 3 may be produced by a semiconductor process suited for obtaining the desired circuit characteristics. Accordingly, it is possible to realize a light-source driving unit having a high performance at a low cost.

In other words, high-speed operation and high-integration density are required of the LD modulating signal generator 10, and the fine CMOS process is suited for producing the modulating signal generator. On the other hand, the LD driving unit 12 is connected to the light source LD which operates at a voltage of 1 V to several V, and a high withstand voltage process (for example, 5 V or 3.3 V) is required. It is normally difficult to realize a high withstand voltage in the case of the extremely fine CMOS process, because the withstand voltage is only approximately 1.8 V in the case of a CMOS process of 0.18 μm. But according to this embodiment, the LD modulating signal generator 10 and the LD driving unit 12 can be produced by different processes which are suited for-obtaining the desired characteristics.

[PD Amplifier]

The PD amplifier 126 shown in FIG. 29 carries out an offset adjustment and a gain adjustment with respect to the detection signal which is received from the monitoring light receiving unit which monitors a portion of the light emitted from the light source 102.

The monitoring light receiving unit may be made up of a first type which outputs a current as the detection signal by monitoring the light portion by a photodetector or the like, and a second type which outputs a voltage as the detection signal by monitoring the light portion by a photodetector or the like and converts the output current of the photodetector by a built-in current-to-voltage (I/V) converter.

This embodiment can cope with both types of monitoring light receiving unit, by selecting the input by a multiplexer (MUX) 148. In other words, the multiplexer 148 outputs the output of the monitoring light receiving unit of the first type received via a current-to-voltage (I/V) converter 147, and outputs the output of the monitoring light receiving unit of the second type received directly.

An adder 150 adds or subtracts an offset voltage which is supplied from an offset DAC 149 with respect to the output of the multiplexer 148. A gain switching amplifier 151 adjusts the gain of the output of the adder 150 which is adjusted of the offset, by switching the gain to 1, 4, 8 or 16 times depending on a gain switching signal PDGain. Generally, the amount of light used for the reproduction and the amount of light used for the recording greatly differ, so the gain switching amplifier 151 can switch the gain between the recording and reproduction.

A current Ipd output from a photodetector PD in response to the detected light can be computed based on the following formula (12), where α denotes a light utilization efficiency with respect to a light (amount of light) Po emitted from the light source LD, and S denotes a light receiving sensitivity of the photodetector PD.

$$Ipd = \alpha \cdot S \cdot Po \quad (12)$$

In addition, a monitor signal Imon output from the gain switching amplifier 151 can be computed based on the following formula (13), where Giv denotes a conversion gain of the current-to-voltage converter 147 or the built-in current-to-voltage converter of the monitoring light receiving unit, Gpd denotes the gain of the gain switching amplifier 151, and Kpd=Giv·α·S. In this case, the offset voltage supplied from the offset DAC 149 is omitted for the sake of convenience.

$$Imon = Gpd \cdot Giv \cdot Ipd = Gpd \cdot Kpd \cdot Po \quad (13)$$

When the monitoring light receiving unit for monitoring the light emitted from the light source LD1 and the monitoring light receiving unit for monitoring the light emitted from the light source LD2 are provided separately, two inputs are provided in the PD amplifier 126. The detection signals from the two monitoring light receiving units are supplied to the two inputs of the PD amplifier 126, and the PD amplifier 126 selects the detection signal from the monitoring light receiving unit which monitors the light emitted from the light source LD which is emitting light.

[Bias Current Controller]

The bias current controller 127 shown in FIG. 29 controls a bias current Iapc which is output, so that the monitor signal Imon supplied from the PD amplifier 127 matches the reference signal Itarget which is generated from the target level signal Dtarget supplied from the sequencer 121. In this embodiment, the bias current Iapc can be controlled by one of the following three control methods (1) through (3).

(1) Average Value Control Method

According to this control method, the modulating data DmodL and DmodH are supplied as the two target level signals Dtarget, and the reference signal Itarget proportional to the amount of light emitted from the light source LD is generated by a P-B DAC 152, a P-P DAC 153 and a switch 154.

The P-B DAC 152, the P-P DAC 153 and the switch 154 operate similarly to the Pb DAC 140, Ptp DAC 141 and the switch 142 described above.

The following formula (14) stands between the light Po emitted from the light source LD and the reference signal Itarget, where K denotes a proportionality constant.

$$Itarget = K \cdot Po \tag{14}$$

The proportionality constant K is determined by setting the scale of the P-B DAC 152 and the P-P DAC 153 by a bias scale DAC 170, and the scale is preset so that a relationship K=Kpd stands. Because a coefficient Kpd varies depending on the light utilization efficiency α of the light receiving unit PD used with respect to the light Po emitted from the light source LD, and inconsistency of the light receiving sensitivity S, it is desirable to set the scale at the time of the initial adjustment. In addition, a bias scale setting value BiasScale is varied depending on the gain Gpd of the gain switching amplifier 151.

Since the reference signal Itarget indicates the target amount of light to be emitted from the light source LD, the light source LD can be controlled to emit at this target amount by controlling the monitor signal Imon to match the reference signal Itarget.

An error amplifier 155 amplifies an error (or difference) between the reference signal Itarget and the monitor signal Imon, and supplies an error signal to a sample and hold (S/H) integrator 156 provided at the next stage.

The S/H integrator 156 integrates the error signal from the error amplifier 155, and outputs the bias current Iapc. According to this control method, the S/H integrator 156 always carries out an integrating operation.

A control speed can be varied by a signal SRSel supplied to the error amplifier 155. More particularly, the control speed is varied by varying the charging and discharging current (for example, the output current of the error amplifier 155) supplied to the S/H integrator 156. In this case, it is possible to set the control speed to an optimum value at the time of the recording and at the time of the reproduction. A range in which the charging and discharging current may be set can be set by a signal R-Cont supplied to the error amplifier 155.

Figure 36:
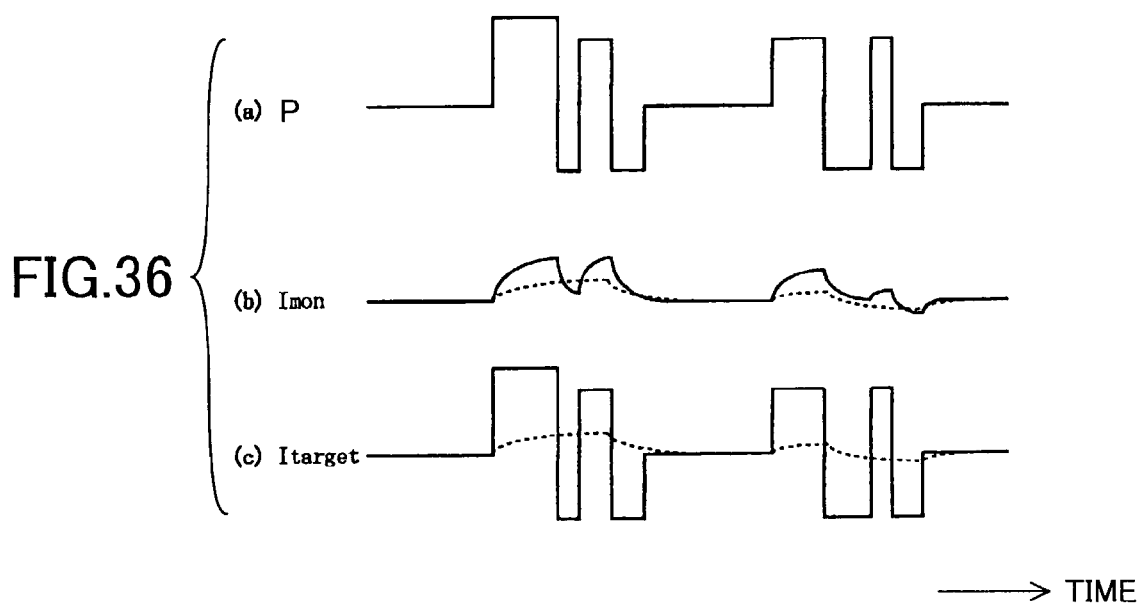
FIG. 36 is a timing chart showing signal waveforms for explaining the operation of a bias current controller shown in FIG. 29.

FIG. 36 is a timing chart showing signal waveforms for explaining the operation of the bias current controller 127 shown in FIG. 29. In FIG. 36, (a) shows the optical waveform P, that is, the waveform of the light emitted from the light source LD, and (b) shows the monitor signal Imon. It is assumed for the sake of convenience that the band is limited by the light receiving unit PD used. In FIG. 36(b), a dotted line indicates an average level.

As shown in FIG. 36, when the irradiating power or the duty cycle is changed, the average level changes. In this case, the conventional method of controlling an error relative to a predetermined average value which is computed in advance will not be able to carry out an accurate bias control.

In FIG. 36, (c) shows the reference signal Itarget which has a waveform proportional to the irradiating waveform as described above. In FIG. 36(c), a dotted line indicates a signal in a bias control band.

When the reference signal proportional to the irradiating waveform is generated and this reference signal is used for the error control, it is possible to carry out an accurate bias control even when the average level changes due to the change in the irradiating power or duty cycle.

(2) Sample and Hold Control Method

According to this control method, the S/H integrator 156 carries out the integrating operation to perform the bias current control during the sampling in response to a signal ApcSmp during a high-level period of the signal ApcSmp, for example. The S/H integrator 156 holds the bias current Iapc, that is, a-control value, during the holding.

Accordingly, the S/H integrator 156 does not integrate the output of the error amplifier 155 during the holding, and a drift or the like of the control value caused by a circuit offset of the error amplifier 155 can be reduced.

In addition, the reference signal Itarget may be generated similarly to the above control method (1), but it is also possible to use a constant reference signal Itarget corresponding to the target irradiating power during the sampling.

In this embodiment, the signal ApcSmp is generated by the sequencer 121, based on the LD modulating signal and the state signal, under the control of the state machines.

The signal ApcSmp is shown in FIG. 30(i). The high-level period of the signal ApcSmp indicates the sampling period (time), and the low-level period of the signal ApcSmp indicates the holding period (time). The signal ApcSmp rises to the high level when the state signal state0 is state0=SPe and the state signal STEN2 has the low level, in synchronism with the rising edge of the LD modulating signal WSK. Further, the signal SpcSmp falls to the low level when the state signal state0 is state0=SPe and the state signal STEN2 has the high level, in synchronism with the next rising edge of the LD modulating signal WSK. In this case, it is unnecessary to newly add signal lines. Otherwise, the operation when carrying out this control method (2) is the same as that of the control method (1) described above.

(3) Automatic Current Control (ACC) Control Method

In this embodiment, the ACC may be carried out in place of carrying out the APC.

According to this control method, the error amplifier 155 is bypassed, and the output of the P-B DAC 152 depending on an ACC data is output as the bias current Iapc. In this state, when the output of the P-B DAC 152 is held in the S/H integrator 156, the initial value of the S/H integrator 156 becomes the held ACC data when the control mode switches to another control mode (APC control mode according to the control method (1) or (2) described above), and the bias current Iapc will not become discontinuous. As a result, it is possible to prevent the light source LD from emitting an excessive amount of light or turning OFF when the control mode is switched.

On the other hand, when switching from the APC control mode to the ACC control mode, the bias current Iapc is monitored and set as the ACC data. The switching of the control mode may be instructed by a signal ACCSel.

In this embodiment, it is possible to apply the external bias current Iext to a multiplexer (MUX) 175 shown in FIG. 29, instead of supplying the bias current Iapc from the S/H integrator 156. Although the illustration thereof is omitted in FIG. 29, it is possible in this case to hold the external bias current Iext in the S/H integrator 156, similarly as described above, so that it is possible to quickly and positively switch to the bias current controller 127.

Figure 37:
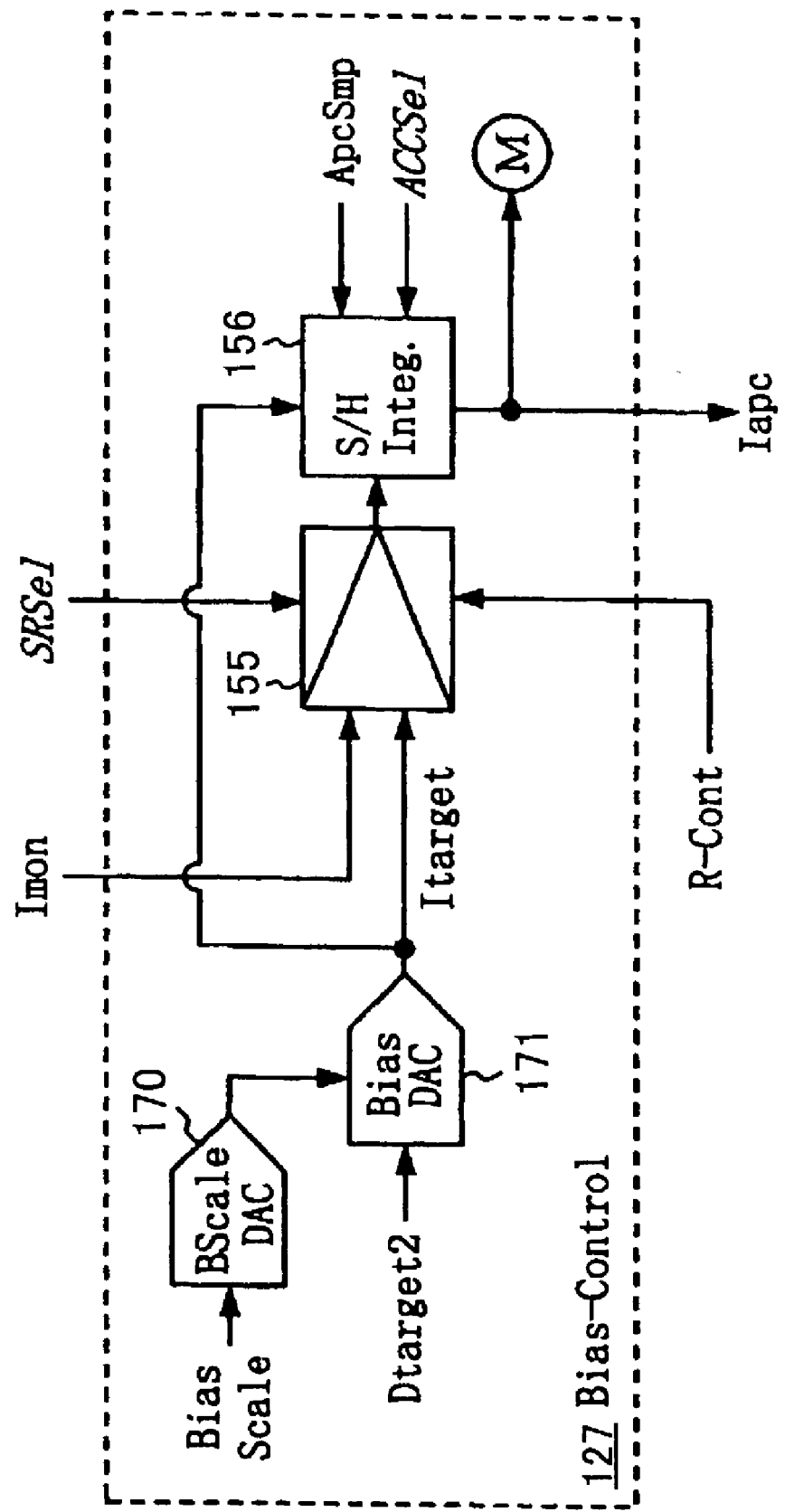
FIG. 37 is a system block diagram showing another structure of the bias current controller shown in FIG. 29.

FIG. 37 is a system block diagram showing another structure of the bias current controller 127 shown in FIG. 29.

A target level signal Dtarget2 is generated by switching the modulating data DmodL and DmodH by the modulating signal MOD, and supplied to a bias DAC 171 shown in FIG. 37. The bias DAC 171 generates a reference signal Itarget which is an average value of the amount of light to be emitted from the light source LD.

The bias DAC 171 is provided to generate the average value of the amount of light to be emitted from the light source LD, and does not need to operate at a high speed as in the case of the Pb DAC 140 and the Ptp DAC 141 of the data modulator 123.

According to this embodiment, the structure for generating the reference signal Itarget is simplified, and the response speed of the DAC can be reduced. As a result, it is possible to reduce the chip size and the current consumption of the light source driving unit.

The other elements of the bias current controller 127 shown in FIG. 37 operates similarly to the corresponding elements shown in FIG. 29, and any of the control methods (1) through (3) may be applied in a manner similar to the above.

[Differential Quantum Efficiency Controller]

The differential quantum efficiency controller 128 shown in FIG. 29 detects the differential quantum efficiency $\eta$ of the light source LD (light source LD1 or LD2) which is driven, and controls the scale Scale of the LD modulating current depending on the detected result. This control is carried out by detecting a difference between the amounts of light irradiated at predetermined two points, comparing the difference and a reference value $\eta$target, and increasing or decreasing the value of the scale Scale based on the compared result.

A sample and hold (S/H) circuit 157 samples and holds the monitor signal Imon depending on a sample signal EtaSmp when irradiating the light at a reference level P1. A difference unit 158 generates a difference signal indicating a difference between an output of the S/H circuit 157 and the monitor signal Imon. An etaref DAC 159 outputs the reference value $\eta$target.

A comparator 161 compares the output difference signal of the difference unit 158 and the reference value $\eta$target, and supplies to a counter 162 a signal Up when the difference signal is smaller than the reference value $\eta$target and a signal Down when the difference signal is larger than the reference value $\eta$target.

A comparing timing of the comparator 161 is controlled according to a signal CompCK, and the comparison is started at a rising edge of the signal CompCK.

The counter 162 counts up in response to the signal Up, and counts down in response to the signal Down. A counted value of the counter 162 is updated in response to a falling edge of the signal CompCK. The counted value of the counter 162 is supplied to the data modulator 123 as the signal Scale, and the amount of light emitted from the light source LD is increased or decreased depending on the signal Scale. A recording initial value PScale or a reproducing initial value RScale is set as an initial counted value of the counter 162.

Although the illustration thereof is omitted in FIG. 29, an averaging means (or section) may be provided to average the counted value, and a moving average value of the counted value may be used as the signal Scale. In this case, it is possible to prevent oscillation of the control value (Scale) by the averaging. Furthermore, an insensitive band may be provided in the comparator 161, so as not to output both the signals Up and Down when the two compared signals approximately match, and effects similar to the above can also be obtained in this case.

Moreover, the full scale of the etaref DAC 159 may be set by the bias scale DAC 170. The relationship of the light Po emitted from the light source LD and the monitor signal Imon is as described by the formula (13) described above, and the coefficient Kpd varies depending on the light utilization efficiency $\alpha$ of the light receiving unit PD used with respect to the light Po emitted from the light source LD, and the inconsistency of the light receiving sensitivity S.

In other words, the reference value $\eta$target varies for each individual light source driving unit, but it is possible to absorb the inconsistencies in the reference value $\eta$target by adjusting the full scale of the etaref DAC 159 based on the output of the bias scale DAC 170. Hence, it is of course possible to compute and set the reference value $\eta$target depending on the coefficient Kpd.

As described above, the bias scale DAC 170 also adjusts the reference signal Itarget in the bias current controller 127. Thus, the adjustments of the full scale and the reference signal Itarget can be made at the same time, so as to simplify the adjusting process.

Next, a description will be given of a control method of controlling the differential quantum efficiency $\eta$.

A description will be given of the control method during the recording operation with respect to the phase change type information recording medium, by referring to the signal waveforms shown in FIG. 30.

As shown in FIG. 30(c), this control method drives the light source LD at a $\eta$-detecting power P2 during a predetermined time within the long space of the optical waveform, as indicated by a dotted line (B). The S/H circuit 157 carries out the sampling during this predetermined time. The sample signal EtaSmp is shown in FIG. 30(j).

In addition, during the irradiation at the erase power P1 thereafter, the comparator 161 compares the output difference signal of the difference unit 158 and the reference value $\eta$target in response to the signal CompCK shown in FIG. 30(k). In other words, the differential quantum efficiency $\eta$ is detected based on the difference between the powers P1 and P2.

Normally, in the case of the phase change type information recording medium such as the CD-RW disk, there is virtually no deterioration in the recording characteristic with respect to a slight variation of the erase power.

Because the variation of the differential quantum efficiency $\eta$ is mainly caused by a temperature change, the control band thereof may be slow, and the light emission at the special power P2 does not occur frequently. Hence, the recording performance is unaffected by this control method.

Furthermore, it is possible to increase the sampling frequency to increase the control speed, only in a case where there is a possibility that the initial value PScale of the scale Scale is deviated, such as immediately after the start of the recording. In this case, it is possible to automatically control the variation of the differential quantum efficiency $\eta$ without affecting the recording performance, so that the light source LD will emit the desired amount of light.

The control signals such as the signals EtaSmp and CompCK may be generated by the sequencer 121 from the LD modulating signal and the state signal in the following manner, for example.

First, the LD modulating signal WSP and the state signal STEN shown in FIGS. 30(f) and 30(e-1) are generated at timings indicated by dotted lines, as shown by a region surrounded by a one-dot chain line (C) in FIG. 30, in synchronism with the light emission timing at the desired η-detecting power P2. The state signal STEN2 shown in FIG. 30(e-2) is generated from the LD modulating signal WSP and the state signal STEN, and becomes as indicated by dotted lines within the region surrounded by the one-dot chain line (C). In this state, the state machines SMa and SMb of the sequencer 121 make the following state transitions.

{State Machine SMa}

In the state SPe, when the state signal STEN2 has the low level and the LD modulating signal WSP rises to the high level at the time t13, a transition is made to the state SPe1. In this state, the η-detecting power P2 (=Peta) is output for a predetermined time as the modulating data corresponding to the final bottom pulse power Pc1.

In other words, the light emission is made at the η-detecting power P2 for the predetermined time when the LD modulating signal WSP has the low level in this state (Peta).

In addition, the signal EtaSmp is set to the high level to indicate the sampling. A transition is made to return to the state SPe at the time t15 when the LD modulating signal WSP next rises to the high level. Moreover, the signal CompCK is set to the high level in synchronism with this state transition, and the signal CompCK is set to the low level when a transition is next made to the state SPb. The operation of the state machine SMa carried out thereafter is the same as in the normal case.

{State Machine SMb}

The state remains at the state SPe because at the time t12 when the LD modulating signal WSP falls to the low level, because the state signal STEN has the low level. The same holds true at the time t14. When the LD modulating signal WSP falls to the low level at the time t16, a transition is made to the state Ptp because the state signal STEN has the high level. The operation of the state machine SMb carried out thereafter is the same as in the normal case.

[High-Frequency Modulator]

Generally, in optical disk drives, the so-called high-frequency multiplexing is carried out to make the modulation using a high-frequency signal at the time of the reproduction, so as to suppress the noise of the light source in the light reflected from the information recording medium.

The high-frequency modulator 130 shown in FIG. 29 generates the offset current Ihfmofs which is applied to the bias current when high-frequency multiplexing wit a high-frequency multiplexing signal HFMOD. The high-frequency modulator 130 functions as a high-frequency signal generating means (or section).

In this embodiment, the high-frequency modulation itself is carried out using the data modulator 123. Accordingly, the operation of the data modulator 123 at the time of the high-frequency multiplexing will also be described below.

A VCO 164 shown in FIG. 29 generates the high-frequency multiplexing signal HFMOD having a frequency dependent on a frequency setting signal output from a Freq DAC 163.

A multiplexer (MUX) 165 selectively outputs the high-frequency modulating signal HFMOD or the output modulating signal MOD of the sequencer 121, depending on a signal HF-ON. The signal output from the multiplexer 165 is supplied to the data modulator 123.

It is assumed for the sake of convenience that the high-frequency multiplexing signal HFMOD is selectively output from the multiplexer 165, because the description is being given on the operation at the time of the high-frequency multiplexing.

The offset current Ihfmofs to be added is generated by a HFB DAC 166 and a buffer amplifier 167, and a switch 168 is switched by the signal HF-ON which determines whether or not to apply the offset current Ihfmofs to the current adder 124. The HFB DAC 166, the buffer amplifier 167, the switch 168 and the current adder 124 function as a means (or section) for adding the offset current to the bias current. Although not shown in FIG. 29, when not carrying out the high-frequency multiplexing, the VCO 164 may be instructed to stop oscillation by using the signal HF-ON, so as to suppress unnecessary power consumption.

At the time of the high-frequency multiplexing, the data modulator 123 operates as follows.

In this case, data corresponding to the bottom level and the top level are supplied as the modulating data DmodL and DmodH, and the Pb DAC 140 and the Ptp DAC 141 respectively output currents Ibtm and Itop. It is possible to change the modulation degree by changing the modulating data.

The switch 124 generates the modulating current Imod according to the high-frequency multiplexing signal HFMOD.

Figure 38:
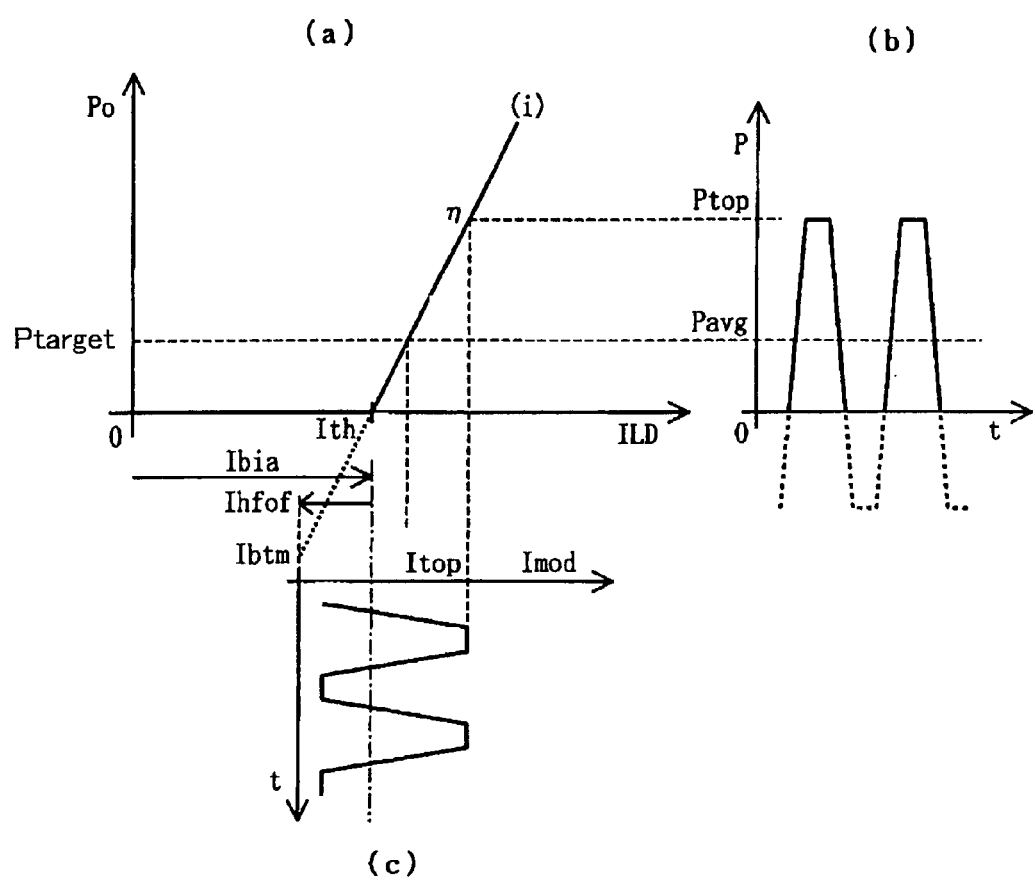
FIG. 38 is a diagram showing the optical modulated waveform at the time of high-frequency multiplexing.

The LD driving current ILD is computed based on the formula (11) described above, and the optical modulated waveform becomes as shown in FIG. 38. FIG. 38 is a diagram showing the optical modulated waveform at the time of the high-frequency multiplexing. In FIG. 38, the amplification factor Ai of the current driver 125 is omitted for the sake of convenience. Further, in FIG. 38, the same designations are used as in FIG. 31. The bias current Ibias is controlled so that Pavg, the average amount of light, becomes equal to Ptarget, the target amount of light.

In addition, if it is assumed that the full scale of the Pb DAC 140 and the Ptp DAC 141 is set by the signal Scale, similarly as described above, and the differential quantum efficiency controller 128 does not carry out a control operation during the reproduction, the initial value RScale of the signal Scale at the time of the reproduction is set to a constant value.

[DC/DC Converter]

A DC/DC converter 132 shown in FIG. 29 converts the power supply voltage supplied to the LD driving integrated circuit 3 into an internal power supply voltage to be supplied to various parts within the LD driving integrated circuit 3. The value of the internal power supply voltage is set by a signal PwrReg. The DC/DC converter 132 functions as a voltage converting means (or section).

In order to operate the LD driving integrated circuit 3 at the high speed, it is desirable to realize the LD driving integrated circuit 3 by a fine CMOS process, and to operate the LD driving integrated circuit 3 in a vicinity of a tolerable voltage of the CMOS process used.

In addition, the light source LD which is driven normally has an operating voltage of approximately 2 V to 3 V, and an optimum power supply voltage of the LD driving unit 12 is approximately 3 V to 4 V, because a high power supply voltage would increase the power consumption and also increase the heat which is generated.

Hence, in order to satisfy these conditions, it is desirable to realize the LD driving integrated circuit 3 by a 0.35 μm CMOS process, and to operate the LD driving integrated circuit 3 by a power supply voltage of approximately 3 V to 4 V.

However, the optical information recording and reproducing apparatus may not be supplied with such an optimum power supply voltage. For example, only a power supply voltage of 5 V and/or 12 V may be supplied to the optical information recording and reproducing apparatus. For this reason, it is necessary to generate the optimum power supply voltage by converting the power supply voltage, but the number of power supply lines for supplying power via the FPC would increase in this case. On the other hand, it is difficult to provide a voltage converter (or transformer) in the optical pickup because of the limited space available in the optical pickup which desirably has a small size.

Although the operation speed of a transistor having a withstand voltage of 5 V is relatively slow, the voltage converter may easily be formed by use of such a transistor at a low cost. Hence, the above described inconveniences can be eliminated by forming the DC/DC converter (voltage converter) 132 by such a transistor and providing the DC/DC converter 132 in the LD driving integrated circuit 3.

By using the DC/DC converter (or so-called switching regulator) as the voltage converter, it is possible to reduce the conversion loss, and to reduce both the power consumption and the amount of heat generated thereby.

Furthermore, since the DC/DC converter 132 can set the value of the internal power supply voltage in response to the signal PwrReg, it is possible to easily set the optimum power supply voltage.

A DC/DC converter (voltage converter) 131 shown in FIG. 29 is provided as an input/output interface with respect to external parts to the LD driving integrated circuit 3. Hence, it is possible to cope with various interface voltages without having to increase the number of power supply lines of the FCP.

In the description given heretofore, it is assumed that the optical waveform is as shown in FIG. 30(*c*). However, other optical waveforms may be obtained by appropriately modifying the state signal STEN and set values.

Figure 39:
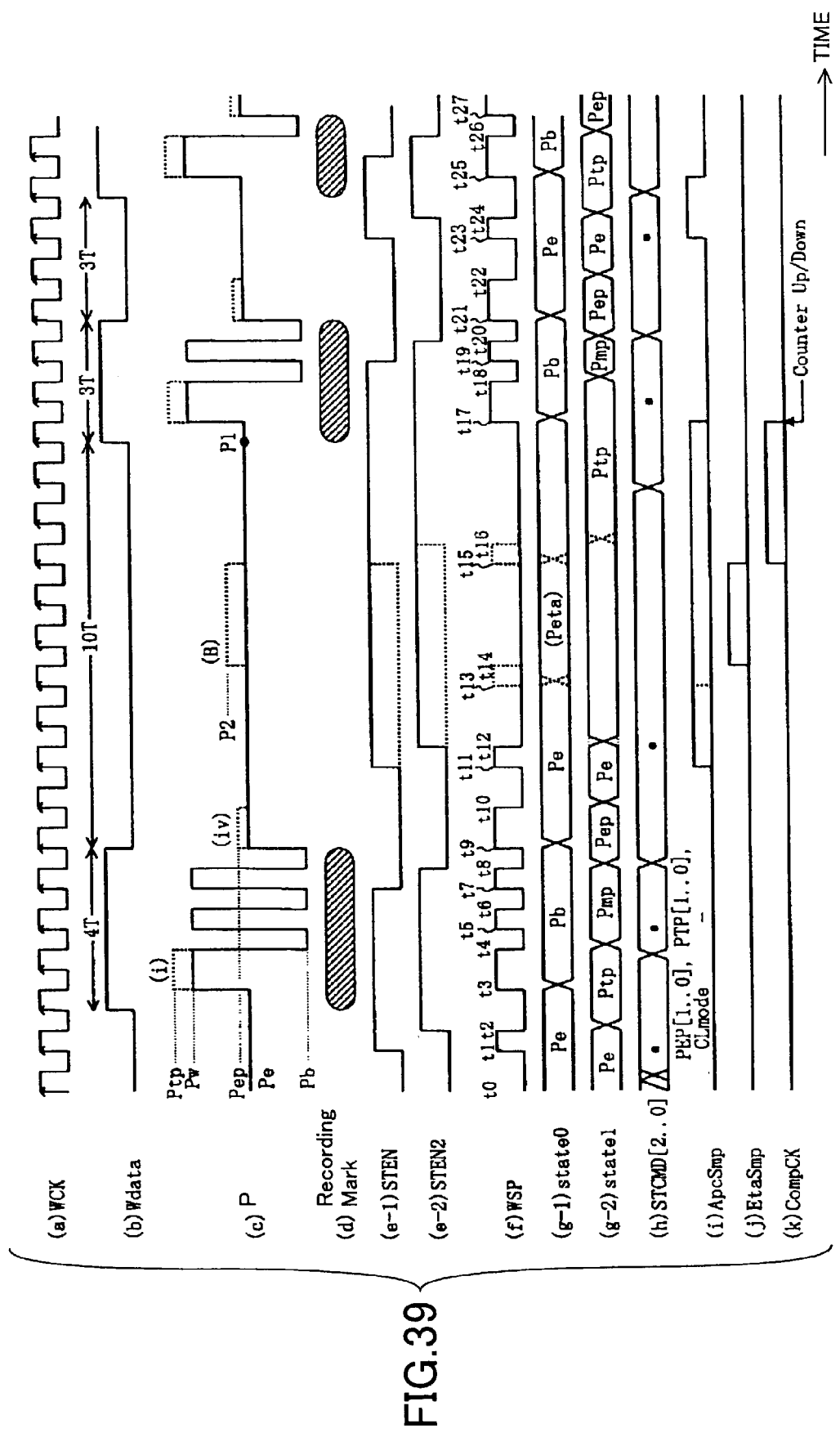
FIG. 39 is a timing chart showing different signal waveforms at the various parts of the LD driving integrated circuit shown in FIG. 4.

FIG. 39 is a timing chart showing other signal waveforms at the various parts of the LD driving integrated circuit 3 shown in FIG. 4. In FIG. 39, the same designations are used as in FIG. 30.

In the case shown in FIG. 39, when carrying out the edge position control after the recording mark, control of a first power Pep of the erase indicated by a dotted line (iv) in FIG. 39 is added to the pulse width control, instead of adding the control of the final pulse power Plp and the cooling pulse power Pcl.

The LD modulating signal WSP and the state signal STEN may be generated as shown in FIGS. 39(*f*) and 39(*e*-1).

Basically, FIG. 39 differs from FIG. 30 in that the timings of the falling edges of the state signal STEN is different from that of FIG. 30.

The state machines SMa and SMb only need to be partially modified of the transition conditions. Accordingly, it is sufficient to add the conditions of the optical waveform mode setting to the transition conditions. In other words, in the state machine SMa shown in FIG. 32, the state transition shown in (a) or (b) should be made depending on the optical waveform mode. The irradiating power Pep corresponds to the state SPlp in this case.

Therefore, it is possible to generate various optical waveforms by varying the irradiating power corresponding to each state of the state machines SMa and SMb and the transition conditions of the state machines SMa and SMb.

Figure 40:
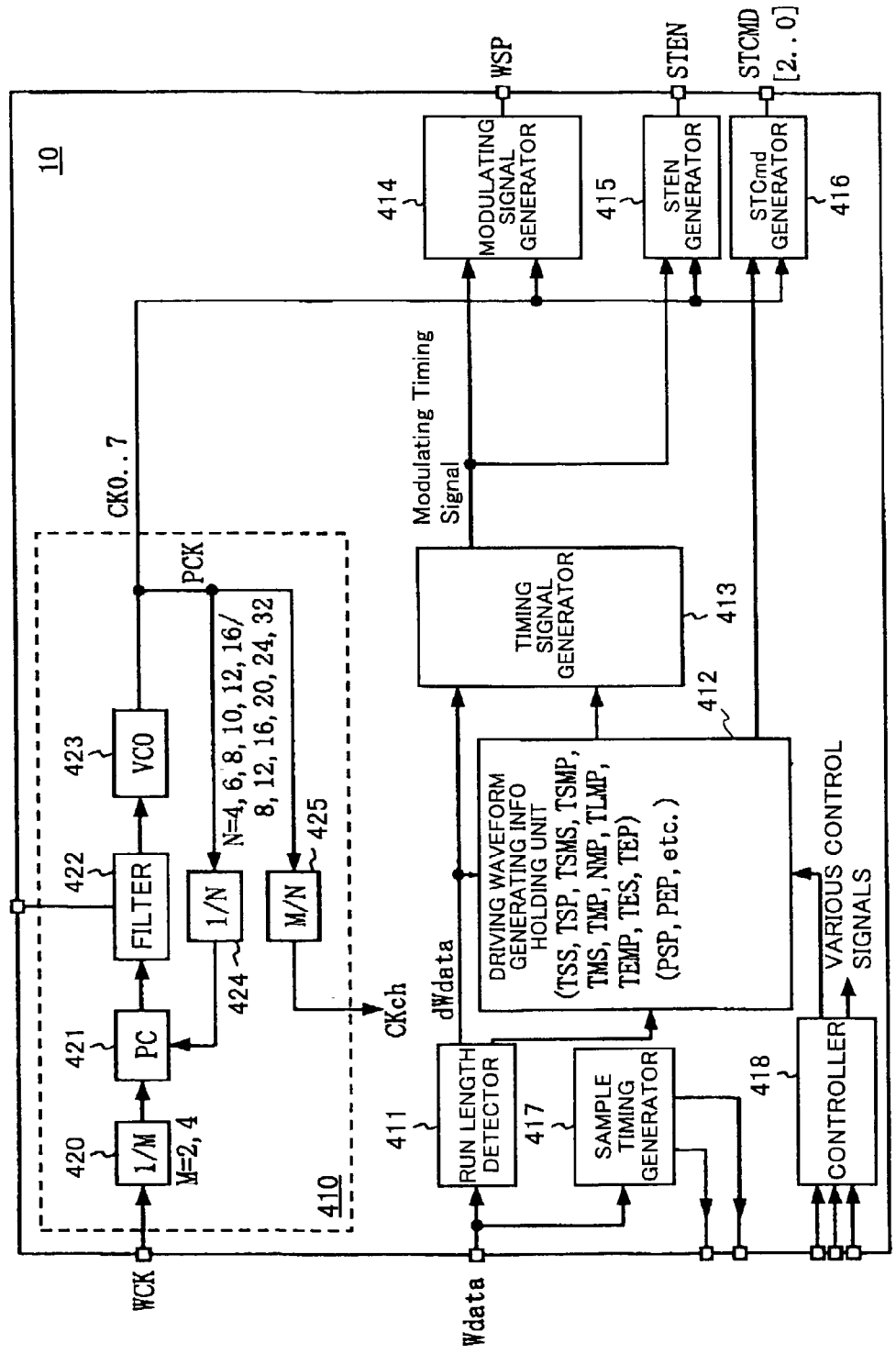
FIG. 40 is a system block diagram showing the structure of an LD modulating signal generator shown in FIG. 4.

Next, a more detailed description will be given of the LD modulating signal generator 10 within the LD modulating signal generator integrated circuit 2, by referring to FIG. 40. FIG. 40 is a system block diagram showing the structure of the LD modulating signal generator 10 shown in FIG. 4.

The LD modulating signal generator 10 shown in FIG. 40 includes a PLL section 410 for generating from the recording clock signal WCK the clock signal PCK which is frequency-multiplied by n and the plurality of clock signals having predetermined phase differences from the clock signal PCK, a run length detector 411 for detecting the run length of the recording data signal Wdata supplied from the controller 19 shown in FIG. 4 and outputting the run length data (signals) Len0 through Len2 and the delayed recording data signal dWdata which is obtained by delaying the recording data signal Wdata by a predetermined amount, and a driving waveform generating information holding unit (strategy memory) 412 for storing the driving waveform generating information and outputting the driving waveform generating information corresponding to the run length data Len0 through Len2 depending on the delayed recording data signal dWdata.

The driving waveform generating information holding unit 412 functions as a driving waveform generating information holding means (or section). The driving waveform generating information holding unit 412 may function as a timing information selecting means (or section), as will be described later.

The LD modulating signal generator 10 further includes a timing signal generator 413 for generating a modulating timing signal from the driving waveform generating information output from the driving waveform generating information holding unit 412, a modulating signal generator 414 for generating the LD modulating signal WSP from the modulating timing signal output from the timing signal generator 413, a state signal generator 415 for generating the state signal STEN from the modulating timing signal output from the timing signal generator 413, a state command generator 416 for generating the command signal STCMD from the driving waveform generating information output from the driving waveform generating information holding unit 412, a sample signal generator (or sample timing generator) 417 for generating the sample signal for the APC control according to the sample and hold system based on the recording data signal Wdata, and a controller 418 for supplying control signals to various parts of the LD modulating signal generator 10 in response to a control command received from the controller 19 shown in FIG. 4.

The timing signal generator 413 and the modulating signal generator 413 function as a modulating signal generating means (or section). In addition, the state signal generator 415 functions as a state transition signal generating means (or section). The sequencer 121 functions as a state control means (or section), and the data modulator 123 and the current driving unit 125 function as a light source driving means (or section). The sequencer 121 may also function as an irradiating level selecting means (or section) for selecting the irradiating level of the light source LD. The command signal generator 416 functions as a command signal generating means (or section).

Next, a description will be given of the internal structure and operation of the various parts of the LD modulating signal generator 10 shown in FIG. 40.

[PLL Section]

The PLL section 410 generates the clock signal PCK by frequency-multiplying the recording clock signal WCK by n, and also generates the plurality of clock signals having predetermined phase differences from the clock signal PCK. In this embodiment, 8 clock signals CK0 through CK7 are generated, and the clock signal CK0 is regarded as the clock signal PCK. The PLL section 410 also generates a recording channel clock signal CKch which corresponds to the recording channel clock signal CLK of the above described embodiments.

A 1/M frequency divider 420, a phase comparator (PC) 421, a loop filter 422, a VCO 423 and a 1/N frequency divider 424 form a PLL circuit. The operation of each part of the PLL circuit is similar to that of a generally known PLL circuit, and a detailed description thereof will be omitted.

The 1/M frequency divider 420 frequency-divides the recording clock signal WCK by M. The frequency-dividing ratio 1/M may be variably set to M=2 or 4, for example, and correspond to a case where the recording clock signal WCK is supplied by frequency-dividing the recording channel clock signal CKch. The noise generation is reduced by transferring the recording clock signal WCK at a reduced frequency.

The VCO 423 generates m clock signals having predetermined phase differences from the clock signal PCK. In this first embodiment, m=8 and the 8 clock signals CK0 through CK7 are generated. The VCO 423 may be formed by a ring oscillator, for example.

The 1/N frequency divider 424 frequency-divides one of the clock signals output from the oscillator 204, that is, the clock signal CK0, for example, by N. The frequency-dividing ratio 1/N of the 1/N frequency divider 424 may be variably set, and N/M becomes the multiplying coefficient n of the clock signal PCK with respect to the recording clock signal WCK.

The M/N frequency divider 425 frequency-divides the clock signal PCK by N/M to generate the recording channel clock signal CKch, and supplies this recording channel clock signal CKch to various parts of the LD modulating signal generator 10.

As will be described later, the LD modulating signal WSP is generated using the clock signals CK0 through CK7 as references. In other words, the pulse width setting resolving power of the LD modulating signal WSP can be set by setting the frequency-dividing ratios 1/N and 1/M.

For example, if it is assumed that the supplied recording clock signal WCK is transferred at the same frequency as the recording channel clock signal CKch and M=4 and N=16, the frequency of the clock signal PCK becomes 4 times the frequency of the recording channel clock signal CKch, and the LD modulating signal WSP can be generated at a pulse width setting resolving power which is 1/32 (=m M/N) with respect to the recording channel clock signal CKch. This will be referred to as the pulse width setting step or simply step. In this particular case, 32 steps correspond to 1 channel clock period.

[Run Length Detector]

The run length detector 411 detects the run length of the recording data signal Wdata which is supplied from the controller 19 shown in FIG. 4, and supplies the run length data Len0 through Len2 to the driving waveform generating information holding unit 412. The recording data signal Wdata is a non-return-to-zero inverted (NRZI) binary signal indicating the recording mark by a high-level period and indicating a space by a low-level period. In other words, the run length detector 411 detects the mark length and the space length of the recording data. It is assumed in this case that a run length signal Len1 indicates a mark length, a run length signal Len0 indicates an immediately preceding space length, and a run length signal Len2 indicates an immediately subsequent space length.

The run length detector 411 is constructed depending on minimum and maximum run lengths of the recording data signal Wdata. In this embodiment, it is assumed that the optical information recording and reproducing apparatus records the recording data signal Wdata on the DVD format information recording medium (DVD+RW disk, DVD-R disk, DVD-RAM disk or the like), and the recording data signal Wdata is subjected to EFM+modulation. In other words, the run length is assumed to be 3T to 11T and 14T, where T denotes the channel clock period. The run length detector 411 takes into consideration a predetermined time necessary to detect the run length, the delay times of the various circuits and the like, and delays the recording data signal Wdata by a predetermined amount so as to output the delayed recording data signal dWdata.

Figure 41:
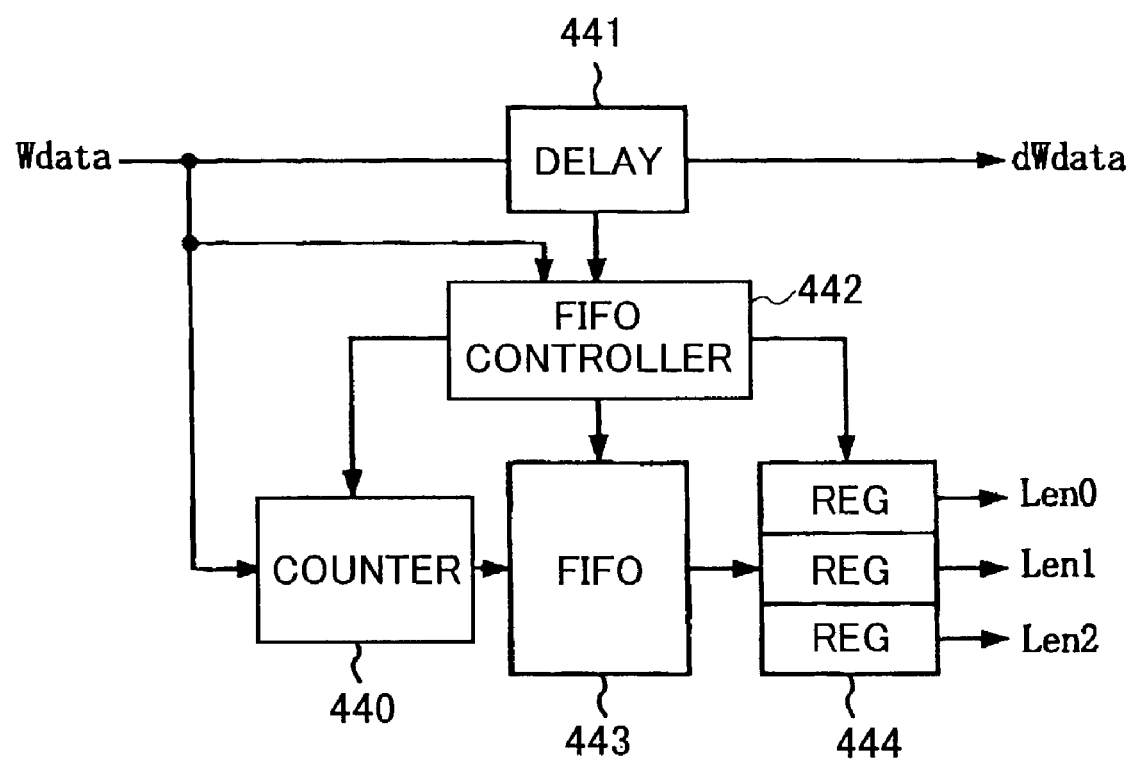
FIG. 41 is a system block diagram showing the internal structure of a run length detector shown in FIG. 40.
Figure 42:
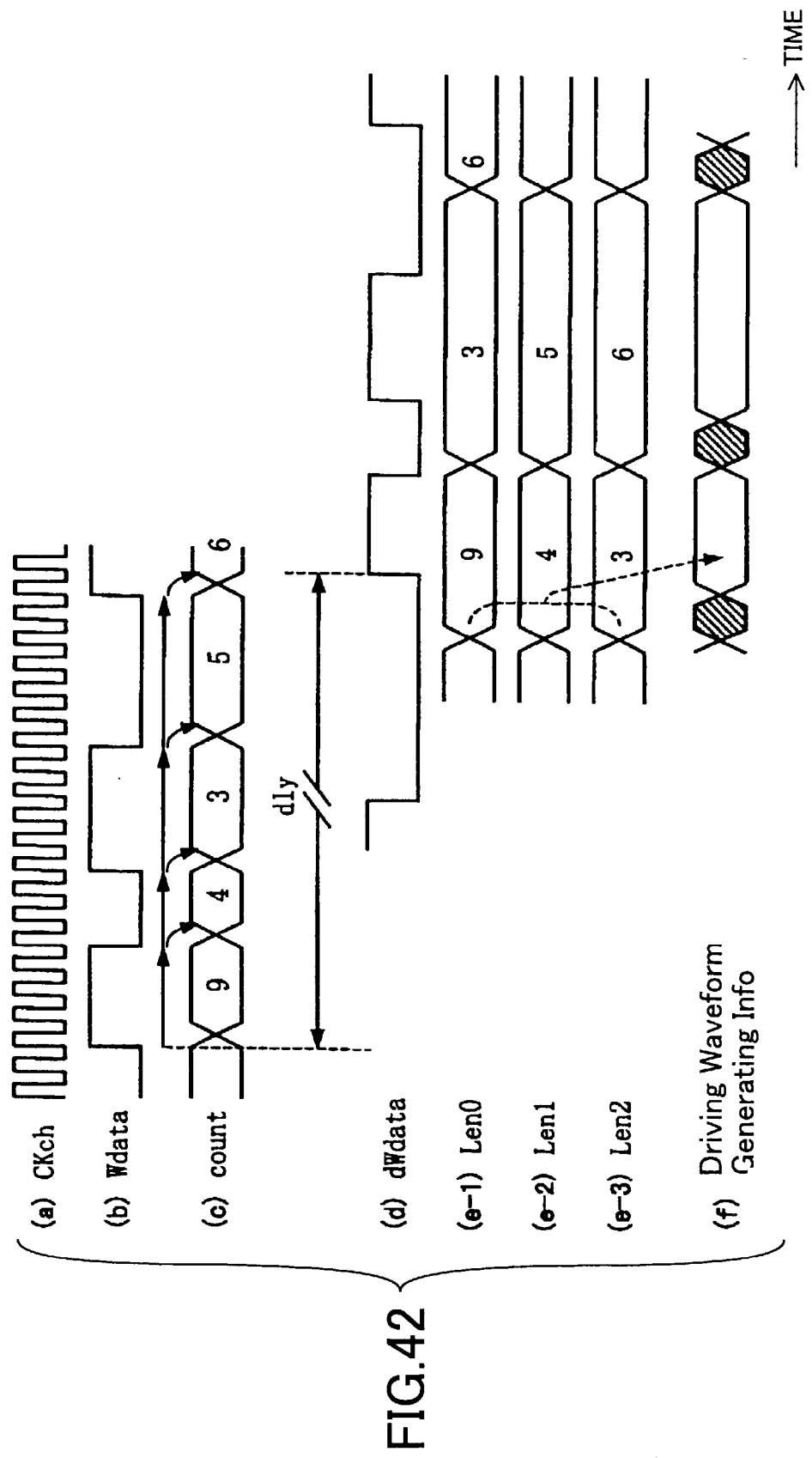
FIG. 42 is a timing chart showing signal waveforms at various parts of the run length detector shown in FIG. 41.

FIG. 41 is a system block diagram showing the internal structure of the run length detector 411 shown in FIG. 40. In addition, FIG. 42 is a timing chart showing signal waveforms at various parts of the run length detector 411 shown in FIG. 41.

As shown in FIG. 41, the run length detector 411 includes a delay circuit 441, a first-in-first-out (FIFO) controller 442, a counter 440, a FIFO 443, and a register 444.

The counter 440 counts a run length, that is, the high-level period and the low-level period of the recording data signal Wdata shown in FIG. 42(b), in response to the recording channel clock signal CKch shown in FIG. 42(a), and outputs a count signal (count) shown in FIG. 42(c).

The run length data counted by the counter 440 is temporarily and successively held by the FIFO 443.

The delay circuit 441 is made up of a shift register and the like, and delays the recording data signal Wdata by a predetermined delay time dly, so as to output the delayed recording data signal dWdata shown in FIG. 42(d). In addition, the delay circuit 441 also generates signals having different delay times for generating the various control signals, and supplies these signals to the FIFO controller 442.

The FIFO controller 442 generates control signals for controlling write and read of the FIFO 443 and for controlling various parts of the run length detector 411. The register 444 holds and outputs the run length data (Len0, Len1 and Len2) read from the FIFO 443.

The FIFO controller 442 supplies the control signals so that the read timing of the FIFO 443 (hold timing of the register 444) matches that of the delayed recording data signal dWdata.

In other words, as shown in FIGS. 42(e-1), 42(e-2) and 42(e-3), the mark length Len1, the immediately preceding space length Len0 and the immediately subsequent space length Len2 are adjusted so as to match the delayed recording data signal dWdata. Alternatively, the driving waveform generating information which is converted by the run length data Len0 through Len2 is adjusted so as to match the delayed recording data signal dWdata, as shown in FIG. 42(f).

The delay time dly and the size of the FIFO 443 may be determined by taking into consideration the minimum and maximum run lengths of the recording data signal Wdata and the delay times of the various circuits, so that no empty or full state of the FIFO 443 occurs.

[Driving Waveform Generating Information Holding Unit]

The driving waveform generating information holding unit 412 is formed by a memory which stores the driving waveform generating information. The driving waveform generating information holding unit 412 outputs driving waveform generating information corresponding to the run length data Len0 through Len2 which are received from the run length detector 411, depending on the delayed recording data signal dWdata.

Figure 43:
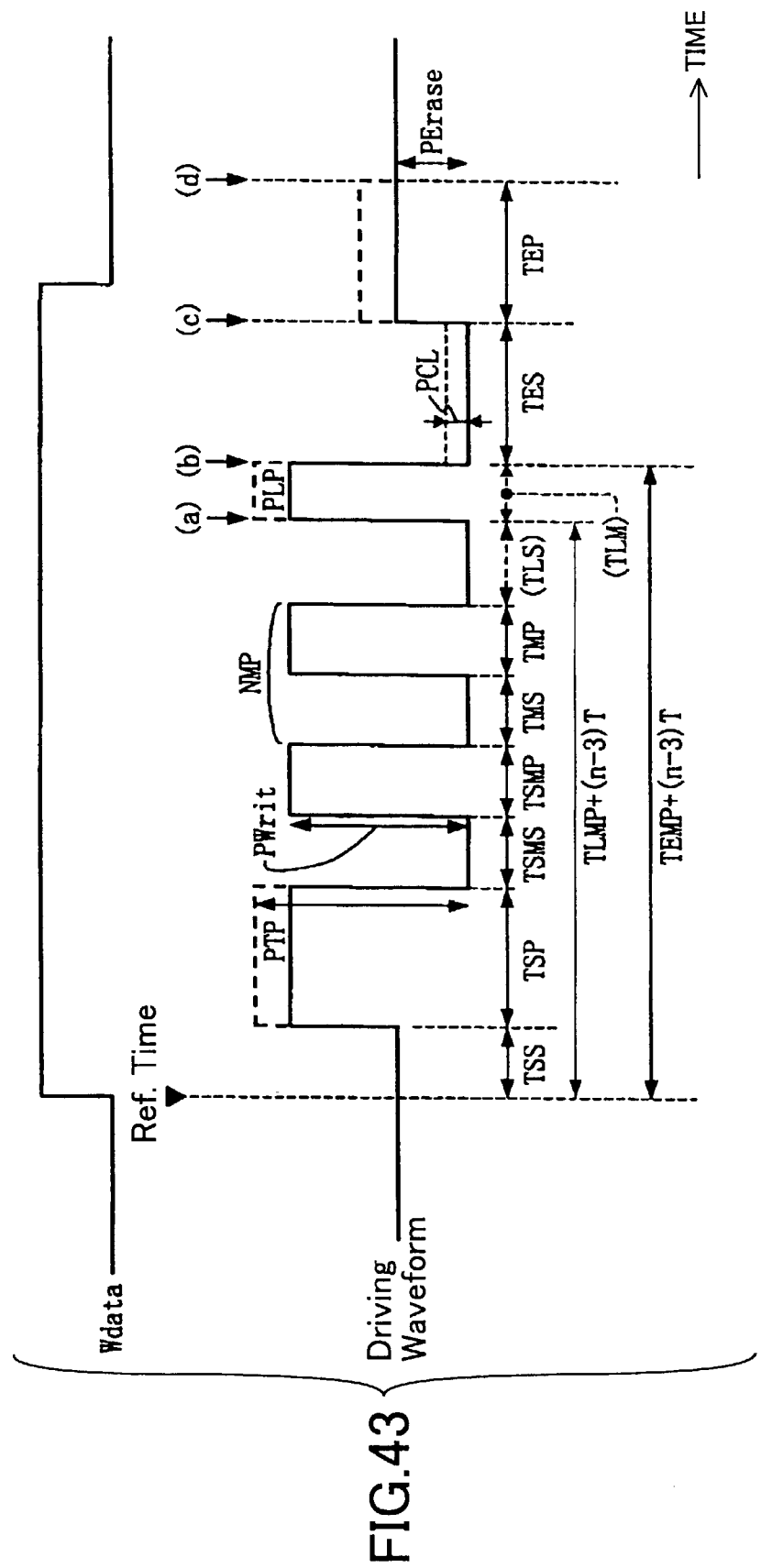
FIG. 43 is a timing chart for explaining a relationship of the driving waveform generating information and the optical waveform.

FIG. 43 is a timing chart for explaining a relationship of the driving waveform generating information and the optical waveform. Further, FIG. 44 is a diagram showing a table of combinations of the driving waveform generating information for each of a plurality of timing information.

The driving waveform generating information includes timing information and command information. The timing information indicates irradiation level changing timings of the optical waveform, that is, the changing timings of the LD modulating signal WSP. The command information transfers the command signal STCMD related to the irradiating level and the like.

The timing information is described by the number of the pulse width setting steps, and as shown in FIG. 43, the changing timings are determined by accumulating each timing information (TSS, TSP, . . . ) from a reference time. For example, the reference time may be the rising edge of the delayed recording data signal dWdata. In FIG. 43, NMP indicates the repetition number of the timing information TMS and TMP.

Accordingly, it is possible to arbitrarily set the multi-pulse period and duty cycle (or duty ratio) in the above described manner.

Complex light modulating waveforms (optical waveforms) are required depending on the kind and recording linear velocity of the information recording media. For example, when carrying out a high-speed recording, the passing time of the irradiated light beam on the information recording medium becomes short, and the amount of energy irradiated on the information recording medium decreases, and the amount of heat generated may become smaller than that required to form the recording marks on the information recording medium. Hence, in order to accurately carry out the recording, the recording should be made using a pulse train having an extremely narrow pulse width, but such a narrow pulse width would require a high laser power of the light source. Accordingly, the recording may be carried out in such a case at a relatively low laser power by decreasing the frequency of the multi-pulse train (or sequence).

On the other hand, when the recording is carried out at a low speed with respect to the information recording medium which has an improved recording sensitivity for use in the high-speed recording, the heat generated may become excessively large to make it impossible to accurately form the recording marks on the information recording medium. Hence, the recording may be carried out in such a case by increasing the frequency of the multi-pulse train.

Therefore, it is possible to generate the optimum optical waveform for the kind and the recording linear velocity of the information recording medium, by changing the timing information, the number of pulse repetitions, and the frequency and the duty cycle (ratio) of the multi-pulses depending on the kind and the recording linear velocity of the information recording medium.

In this embodiment, the rising edge (a) and the falling edge (b) of the last pulse of the driving waveform shown in FIG. 43 is set independently and not from an accumulation from the reference time. Timings (c) and (d) of the driving waveform are set from an accumulation from the timing (b) shown in FIG. 43. In various kinds of information recording media, these timings (a) and (b) of the driving waveform greatly affect the trailing edge position control of the recording mark formed thereby.

On the other hand, the timing information such as TSS and TSP are important for the leading edge position control of the recording mark. By independently setting the main parameters for the edge position control before and after this leading edge position, the last pulse timing is unaffected by the set values of the parameters, thereby limiting the effects on the recording mark edge position.

In other words, when changing the set values of the parameters during the recording operation, the effects on the shape of the recording mark are small even when the set values of the parameters are successively changed.

For example, it is necessary to change the parameters depending on the recording linear velocity in order to control the shape of the recording mark with a high accuracy, and when making a CAV recording, the set values of the parameters are changed depending on the recording linear velocity during the recording. Thus, the above described control is particularly suited for this case.

In order to simplify the circuit, the timings (a) and (b) shown in FIG. 43 may be determined by accumulating the timing information TLS and TLM as indicated by dotted lines in FIG. 43.

In this embodiment, the driving waveform is varied depending on the mark length and the adjacent space lengths of the recording data signal Wdata, so as to control the edge positions of the recording marks which are to be formed with a high accuracy.

When the recording mark is formed on the information recording medium, thermal effects may cause the edges of the recording mark to vary according to the adjacent space length. Hence, this embodiment varies the driving waveform by taking into consideration the adjacent space lengths, so as to avoid the edges of the recording mark from varying.

In other words, the driving waveform generating information corresponding to combinations of the mark length and the immediately preceding and immediately subsequent space lengths is stored in the driving waveform generating information holding unit 412, and the driving waveform generating information corresponding to the run length data Len0 through Len2 detected by the run length detector 411 is output from the driving waveform generating information holding unit 412.

In a case where the mark lengths and the adjacent space lengths are greater than a predetermined value, the thermal effects and variations of the edges of the recording marks caused thereby are small. For this reason, it is unnecessary to prepare the driving waveform generating information for all combinations of the mark length and the immediately preceding and immediately subsequent space lengths, and the required memory capacity of the driving waveform generating information holding unit 412 can be reduced by preparing and storing (or registering) only the driving waveform generating information with respect to the combinations which have large effects on the edges of the recording marks in the form of a table as shown in FIG. 44. In addition, this embodiment also changes the combinations which are prepared depending on the parameters, so as to simultaneously reduce the required memory capacity of the driving waveform generating information holding unit 412 and accurately control the shape of the recording marks.

Figure 45:
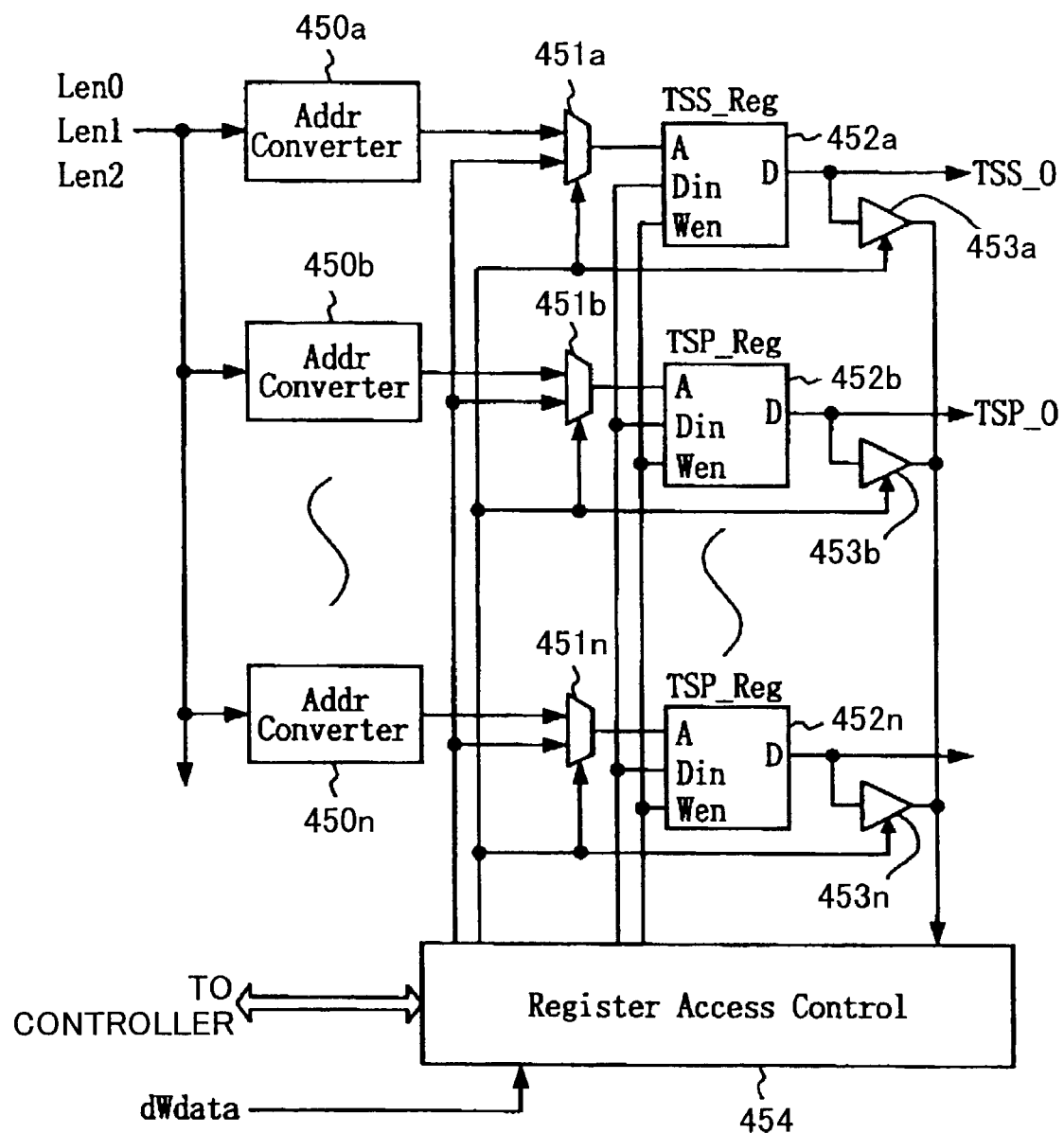
FIG. 45 is a system block diagram showing the internal structure of a driving waveform generating information holding unit shown in FIG. 40.

FIG. 45 is a system block diagram showing the internal structure of the driving waveform generating information holding unit 412 shown in FIG. 40.

In FIG. 45, memories 452a through 452n for storing parameters operate independently. Address converters 450a through 450n convert the run length data Len0 through Len2, and address signals of the memories 452a through 452n are output via selectors 451a through 451n.

Output buffers 453a through 453n control output of a read data corresponding to one of the memories 452a through 452n which receives a read request from the controller 418 shown in FIG. 40. A register access controller 454 generates output enable signals which are supplied to the output buffers 453a through 453n.

The register access controller 454 controls access to each of the memories 452a through 452n with respect to a write/read request from the controller 418 shown in FIG. 40. When the access is made from the register access controller 454 to one of the memories 452a through 452n, the selectors 451a through 451n switches between the address signal supplied from a corresponding one of the address converters 450a through 450n and an address signal supplied from the register access controller 454. In addition, the register access controller 454 makes the access to one of the memories 452a through 452n in response to the memory access request during the recording operation.

[Timing Signal Generator and Modulating Signal Generator]

The timing signal generator 413 generates the modulating timing signal from the driving waveform generating information (timing information). The modulating timing signal is made up of a timing pulse signal which is synchronized to the clock signal PCK having n times the frequency of the recording clock signal WCK, and a phase selection signal.

The modulating signal generator 414 generates the LD modulating signal WSP from the modulating timing signal which is supplied from the timing signal generator 413. The LD modulating signal WSP is generated with reference to the clock signals CK0 through CK7, and the times corresponding to the phase differences of the clock signals CK0 through CK7 determine the pulse width setting resolving power.

Figure 46:
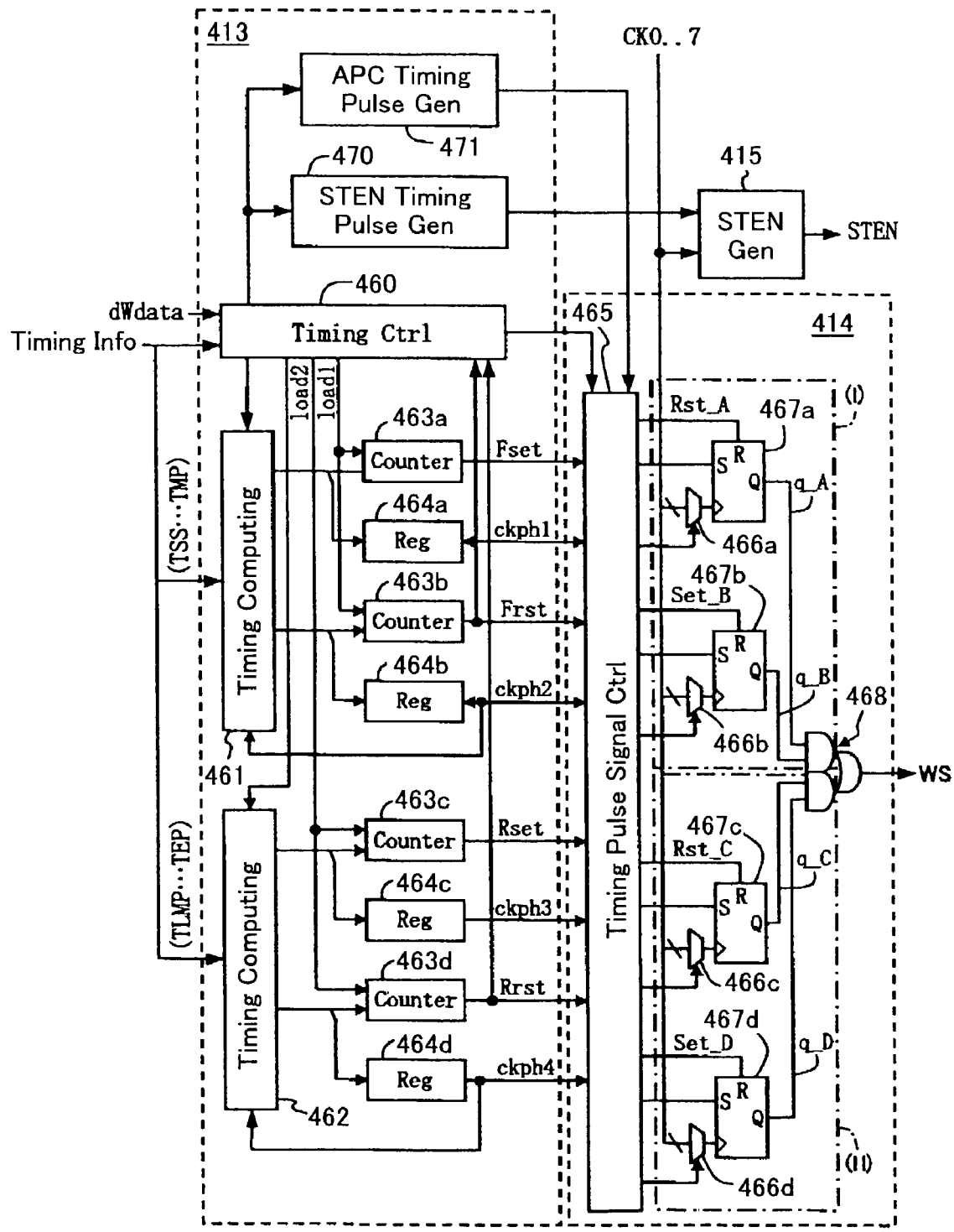
FIG. 46 is a system block diagram showing the internal structure of a timing signal generator and a modulating signal generator shown in FIG. 40.
Figure 47:
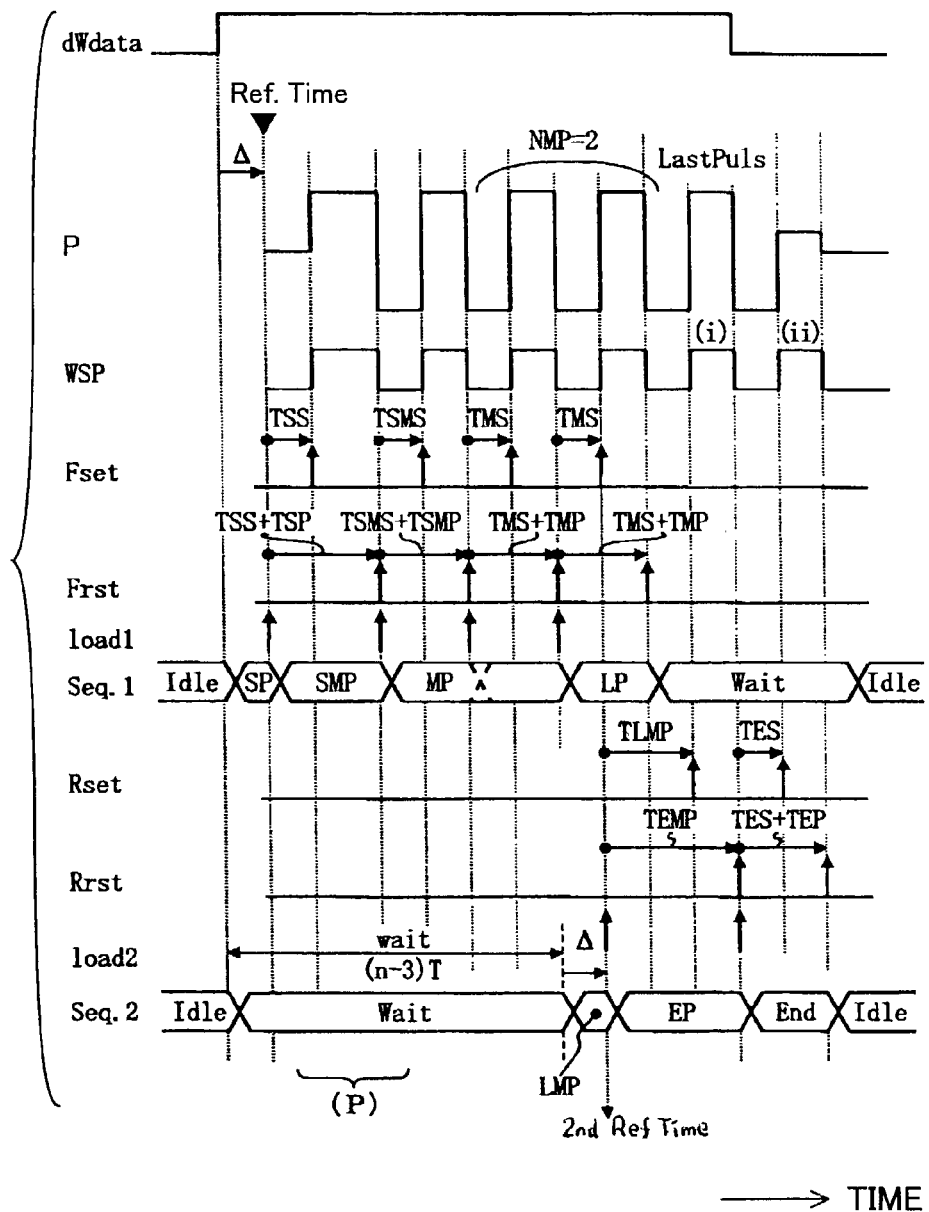
FIG. 47 is a timing chart showing signal waveforms at various parts of the timing signal generator and the modulating signal generator shown in FIG. 46.
Figure 48:
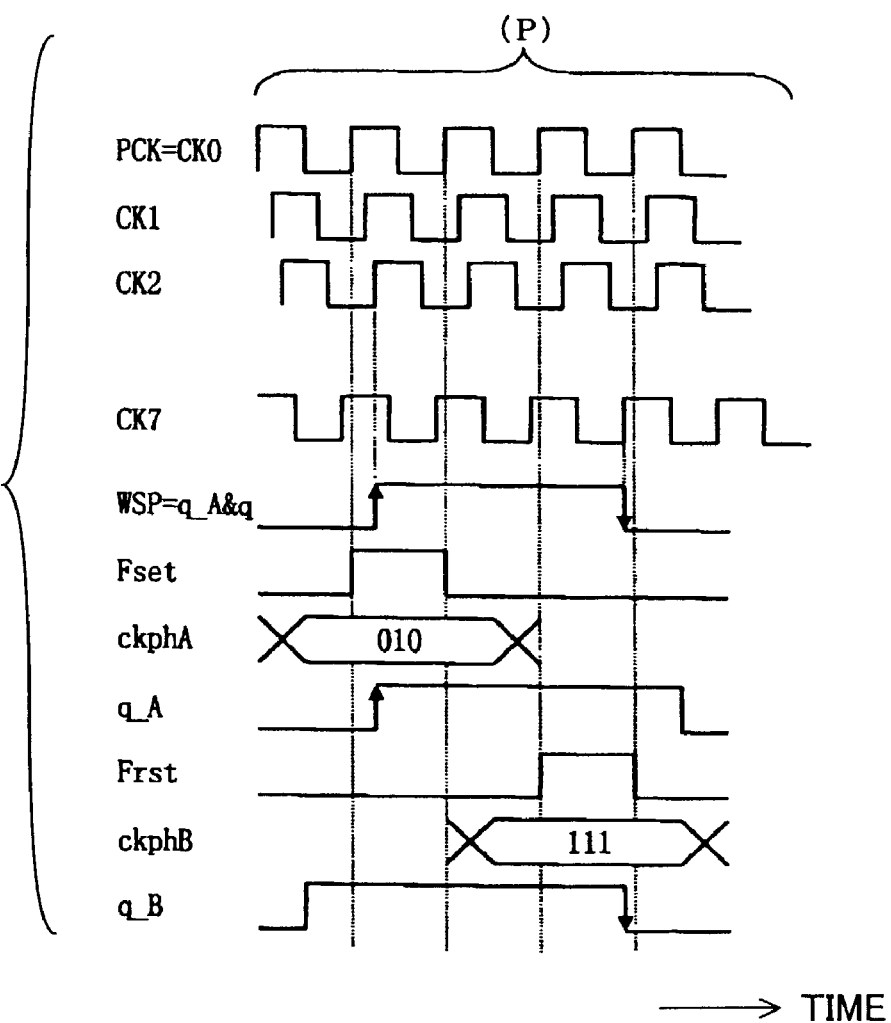
FIG. 48 is a timing chart showing signal waveforms at various parts of the timing signal generator and the modulating signal generator shown in FIG. 46.
Figure 49A:
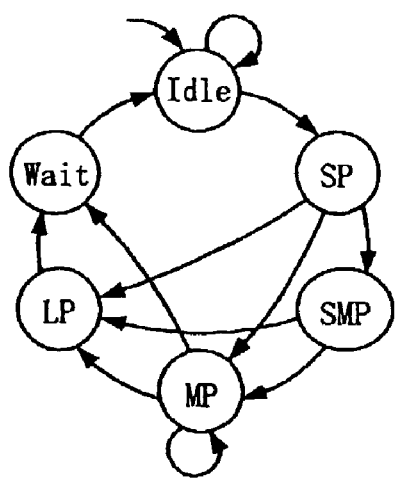
FIGS. 49A and 49B are diagrams for explaining the operation of two sequencers within a timing controller shown in FIG. 46.
Figure 49B:
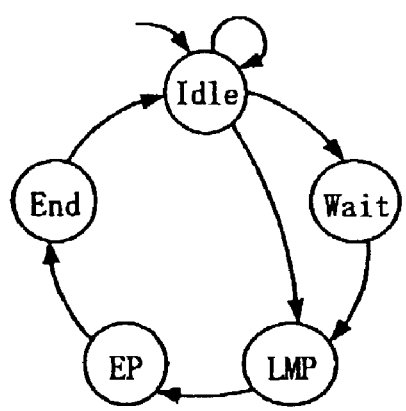

FIG. 46 is a system block diagram showing the internal structure of the timing signal generator 413 and the modulating signal generator 414 shown in FIG. 40. FIGS. 47 and 48 are timing charts showing signal waveforms at various parts of the timing signal generator 413 and the modulating signal generator 414 shown in FIG. 46. Further, FIGS. 49A and 49B are diagrams for explaining the operation of two sequencers within a timing controller 460 shown in FIG. 46.

A description will be given of the operation of generating the LD modulating signal WSP by generating the timing pulse signal and the phase selection signal from the driving waveform generating information, by referring to FIGS. 46 through 48, 49A and 49B.

The timing controller 460 shown in FIG. 46 generates the control signals which are supplied to various parts of the LD modulating signal generator 10 shown in FIG. 40 as will be described later, based on the operation of the two sequencers shown in FIGS. 49A and 49B. In addition, the timing controller 460 generates the reference time of the pulse train of the LD modulating signal WSP which is obtained by delaying the delayed recording data signal dWdata by a predetermined time Δ (units of PCK).

A timing computing unit 461 computes the number of pulse width setting steps to the next modulating timing, from the timing information supplied from the driving waveform generating information holding unit 412, based on a computing instruction signal supplied from the timing controller 460. In this embodiment, the rise modulating timing and the fall modulating timing are processed independently in order to realize a high-speed circuit operation. Hence, the timing computing unit 461 computes a next rise modulating timing signal NextTiming1 and a next fall modulating timing signal NextTiming2.

Of the number of steps to the computed next rise modulating timing signal NextTiming1, the upper 5 bits are supplied to a counter 463a, and the lower 3 bits are supplied to a phase selection signal holding unit (register) 464a as a phase selection signal. In this case, it is assumed for the sake of convenience that the number of pulse width setting steps is described by 8 bits. Similarly, of the number of steps to the next fall modulating timing signal NextTiming2, the upper 5 bites are supplied to a counter 463a, and the lower 3 bits are supplied to a phase selection signal holding unit (register) 464b as a phase selection signal.

In addition, the timing computing unit 462 computes the rise and fall modulating timings of pulses (i) and (ii) of the LD modulating signal WSP shown in FIG. 47, and supplies a rise modulating timing signal NextTiming3 and a fall modulating timing signal NextTiming4 to counters 463c and 463d and phase selection signal holding units (registers) 464c and 464d.

The timing controller 460 also generates a second reference time which is delayed by (n−3) channel clocks and the predetermined time Δ from the delayed recording data signal dWdata, where n denotes the mark length of the delayed recording data signal dWdata. The modulating timing signals NextTiming3 and NextTiming4 are generated with reference to this second reference time.

The counters 463a through 463d count the time to the next modulating timing, based on the clock signal PCK. The counters 463a through 463d input the number of steps to the next modulating timings computed by the timing-computing units 461 and 462, in response to a load signal load1 or load2 shown in FIG. 47 which is supplied form the timing controller 460, and counts down in response to the clock signal PCK. The counters 463a, 463c, 463b and 463d respectively output set pulse signals Fset and Rset and reset pulse signals Frst and Rrst shown in FIG. 47 when the counted value becomes zero. The set pulse signals Fset and Rset and the reset pulse signals Frst and Rrst will be referred to as timing pulse signals.

The phase selection signal holding units 464a through 464d respectively hold and output to the next stage phase selection signals ckph1 through ckph4. The hold timings of the phase selection signal holding units 464a through 464d are determined based on the signals supplied from the timing controller 460.

A timing pulse signal controller 465 generates set/reset signals with respect to flip-flops 467a through 467d from the timing pulse signals Fset, Rset, Frst and Rrst supplied from the counters 463a through 463d. In addition, the timing pulse signal controller 465 supplies the phase selection signals ckph1 through ckph4 supplied from the phase selection signal holding units 464a through 464d to clock selectors 466a through 466d.

The flip-flop 467a sets an output signal q_A shown in FIG. 48 to a high level in response to the set pulse signal Fset (or Rset). In this state, the rise modulating timing signal is determined by one of the clock signals CK0 through CK7 which is selected by the clock selector 466a depending on the phase selection signal ckphA shown in FIG. 48.

For example, FIG. 48 shows a portion (P) of FIG. 47 on an expanded time base, and the clock CK2 is selected in FIG. 48.

On the other hand, the flip-flop 467b sets an output signal q_B shown in FIG. 48 to a low level in response to the reset pulse signal Frst (or Rrst). In this state, the fall modulating timing signal is determined by one of the clock signals CK0 through CK7 which is selected by the clock selector 466b depending on the phase selection signal ckphB shown in FIG. 48. The LD modulating signal WSP is generated by obtaining a logical product of the output signals q_A and q_B.

The reset pulse signal Rst_A of the flip-flop 467a and the set pulse signal Set_B of the flip-flop 467b are generated depending on the set pulse signal Fset (or Rset) and the reset pulse signal Rrst (or Rrst).

Similarly, the LD modulating signal WSP is generated by the flip-flops 467c and 467d and the clock selectors 466c and 466d. In order to realize a high-speed circuit operation, portions (I) and (II) surrounded by one-dot chain lines in FIG. 46 operate alternately, and a logical sum is finally obtained so as to generate the LD modulating signal WSP.

The timing pulse signal controller 465 also as a function of distributing the timing signals Fset, Rset, Frst and Rrst and the phase selection signals ckph1 through ckph4.

A logic circuit 468 obtains the logical. product of the output signals q_A and q_B, obtains a logical product of output signals q_C and q_D, and obtains the logical sum of the two logical products so as to generate the LD modulating signal WSP.

FIGS. 49A and 49B respectively are state transition diagrams of two sequencers Seq.1 and Seq.2 provided within the timing controller 460 shown in FIG. 46. Various parts of the LD modulating signal generator 10 shown in FIG. 40 are controlled by the two sequencers Seq.1 and Seq.2.

Next, a description will be given of the transition conditions of the two sequencers Seq.1 and Seq.2 shown in FIGS. 49A and 49B, by referring to FIGS. 47 and 48 which show an example of the state transitions.

(a) Sequencer Seq.1

State Idle: This state Idle is an initial state. A transition is made to a state SP in response to a rising edge of the delayed-recording data signal dWdata.

State SP: A transition is made to a next state in response to the load signal load1 issued at the reference time. Otherwise, the state remains at the state SP. In this state, the next state to which the transition is made differs depending on the driving waveform generating information (TSMS and TMS). In other words, the transition is made to a state SMP if TSMS≈0, to a state MP if TSMS=0 and TMS≈0, and to a step LP if otherwise (that is, TSMS=0 and TMS=0).

State SMP: A transition is made to a next state in response to the load signal load1 which is issued simultaneously as the reset pulse signal Frst. Otherwise, the state remains at the state SMP. In this state, the next state to which the transition is made differs depending on the driving waveform generating information (TMS). In other words, the transition is made to the state MP if TMS≈0, and to the state LP if TMS=0.

State MP: A transition is made to the state LP in response to the load signal load1 which is issued simultaneously as the reset pulse signal Frst. However, the repetition number of MP specified by NMP is maintained in this state. FIG. 47 shows a case where NMP=2.

State LP: A transition is made to a state Wait in response to the reset pulse signal Frst.

State Wait: This state Wait is a waiting state when various parts are controlled by the sequencer Seq.2. A transition is made to the state Idle after the sequencer Seq.2 makes a transition to the initial state.

(b) Sequencer Seq.2

State Idle: This state Idle is an initial state. A transition is made to a next state in response to a rising edge of the delayed recording data signal dWdata. A wait signal is output for a time (n−3)T from the rising edge of the delayed recording data signal dWdata, where n denotes the mark length and T denotes the channel clock period, and a transition is made to the state Wait in this case. On the other hand, when N=3 and no wait signal is output, the transition is made to a state LMP.

State Wait: This state Wait is maintained while the wait signal is output. A transition is made to the state LMP in response to a cancellation of the wait signal.

State LMP: A transition is made to a state EP in response to a load signal load2 which is issued after the predetermined time Δ from the cancellation of the wait signal.

State EP: A transition is made to a state End in response to the load signal load2 which is issued simultaneously as the reset pulse signal Rrst.

State End: A state transition is made to the state Idle in response to the reset pulse signal Rrst.

Next, a description will be given of the following formulas (15) through (18) which are used to compute the timings for each state of the sequencers Seq.1 and Seq.2 in the timing computing units 461 and 462.

[Timing Computing Unit 461] (15)

$$NextTiming1 = \begin{matrix} TSS & @\text{Idle or } SP \\ TSMS + ckph2 & @SMP \\ TMS + ckph2 & @MP \end{matrix}$$

$$NextTiming2 = \begin{matrix} TSS + TSP & @\text{Idle or } SP \\ TSMS + TSMP + ckph2 & @SMP \\ TMS + TMP + ckph2 & @MP \end{matrix} \quad (16)$$

[Timing Computing Unit 462] (17)

$$NextTiming3 = \begin{matrix} TLMP & @\text{Idle or Wait of } LMP \\ TES + ckph4 & @EP \end{matrix}$$

$$NextTiming4 = \begin{matrix} TEMP & @\text{Idle or Wait or } LMP \\ TES + TEP + ckph4 & @EP \\ TMS + TMP + ckph2 & @MP \end{matrix} \quad (18)$$

FIG. 50 is a timing chart showing signal waveforms for explaining a signal delete process of the timing pulse signal controller 465 shown in FIG. 46.

The generation of the set pulse signal Fset and the reset pulse signal Frst and the generation of the set pulse signal Rset and the reset pulse signal Rrst are carried out independently. Hence, a pulse signal WSP_P generated from the set pulse signal Fset and the reset pulse signal Frst and a pulse signal WSP_R generated from the set pulse signal Rset and the reset pulse signal Rrst may overlap as shown in FIG. 50.

In such a case, the timing pulse signal controller 465 deletes the reset pulse signal Frst and the set pulse signal Rset as indicated by DELETE in FIG. 50, and the signals are supplied to the next stage so that the LD modulating signal WSP is generated using the set pulse signal Fset and the reset pulse signal Rrst.

For the sake of convenience, the delay of each circuit is neglected in the description given above, so as to simplify the description. However, in the actual circuits, a hold circuit responsive to the clock signal PCK is inserted with respect to each signal line, thereby causing a delay amounting to several clocks (pulses) of the clock signal PCK.

Accordingly, the LD modulating signal WSP which is output, that is, the optical waveform, is delayed by several clocks ($\Delta'$) of the clock signal PCK, and delayed by a total of $\Delta+\Delta'$ from the delayed recording data signal dWdata which is synchronized to the recording channel clock signal CKch.

As described above, it is possible to set the frequency multiplying coefficient of the clock signal PCK with respect to the recording channel clock signal CKch. For this reason, when the frequency multiplying coefficient is varied at the time of additional writing or rewriting, the recording marks become shifted with respect to the recording channel clock signal CKch. Hence, in such a case, the delay time $\Delta$ used to generate the reference time may be set depending on the frequency multiplying coefficient with respect to the clock signal PCK.

For example, if $\Delta'=3$ PCK and $\Delta+\Delta'=2$CKch, the delay time $\Delta$ is set to $\Delta=1$ PCK when the frequency multiplying coefficient is 2 (1CKch=2PCK), and is set to $\Delta=5$PCK when the frequency multiplying coefficient is 4.

In addition, the timing signal generator 413 also includes a STEN timing pulse generator 470 shown in FIG. 46 for generating a modulating timing signal for generating the state signal STEN.

Furthermore, in order to control the irradiating level of the light source LD which is driven by the bias current controller 127 and the differential quantum efficiency controller 128 shown in FIG. 29, pulses indicating the sampling timing is inserted into the LD modulating signal WSP in order to generate the various sample signals such as the sample signals ApcSmp, EtaSmp. For example, in the signal waveforms shown in FIGS. 30 and 39, such pulses are inserted from time t11 to t12, from time t13 to t14, and from time t15 to t16.

An APC timing pulse generator 471 shown in FIG. 47 generates the modulating timing signal for this purpose. The modulating timing signal from the APC timing pulse generator 471 is supplied to the timing pulse signal controller 465, so as to generate the LD modulating signal WSP similarly as described above. The modulating timing signal may be generated by the APC timing pulse generator 471 based on the control signal from the timing controller 460.

By inserting the pulses indicating the sampling timing into the LD modulating signal WSP in this manner, it is possible to instruct the sampling timing without having to additionally provide signal lines therefor, and the number of signal lines for transmitting signals on the FPC can be reduced.

Figure 51:
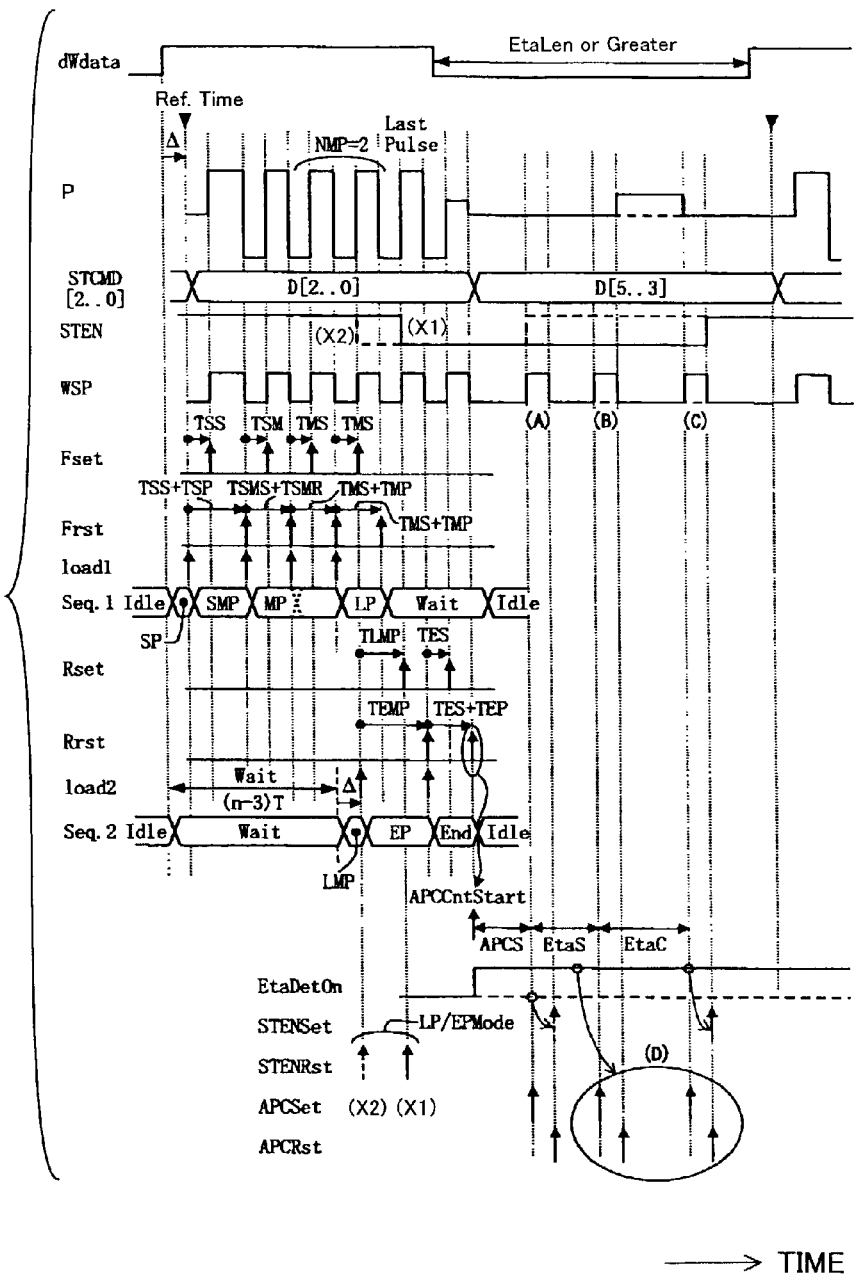
FIG. 51 is a timing chart showing signal waveforms for explaining the generation of an STEN timing pulse signal and an APC timing pulse signal.

FIG. 51 is a timing chart showing signal waveforms for explaining the generation of an STEN timing pulse signal by the STEN timing pulse generator 470 and the generation of an APC timing pulse signal by the APC timing pulse generator 471.

[APC Timing Pulse Generator]

The timing controller 460 outputs an APC count start signal simultaneously as a second reset pulse signal Rrst. An internal counter of the APC timing pulse generator 471 counts a predetermined value APCS (units of PCK) in response to the APC count start signal, and outputs a pulse signal APCSet shown in FIG. 51 after the predetermined value APCS is counted. In addition, A pulse signal APCRst shown in FIG. 51 is output a predetermined time (for example, 1PCK) after the pulse signal APCSet.

At the time of the η-detection, a signal EtaDetOn assumes a high level, and this high-level signal EtaDetOn is supplied to the APC timing pulse generator 471. The internal counter of the APC timing pulse generator 471 continuously counts predetermined values EtaS and EtaC, and outputs the pulse signal APCSet when the predetermined values EtaS and EtaC are counted. The pulse signal APCRst is output a predetermined time (for example, 1PCK) after the pulse signal APCSet, similarly as described above.

The signal EtaDetOn assumes the high level when a η-detection instruction which is output from the controller 19 shown in FIG. 4 is output at predetermined intervals exists and the space length is greater than or equal to a predetermined value EtaLen. This signal EtaDetOn automatically clears the η-detection instruction after the timing pulse signal generating process.

On the other hand, when the signal EtaDetOn has a low level, the pulse signal APCSet and the pulse signal APCRst within a portion surrounded by a solid line (D) in FIG. 51 are not generated, and the pulses indicated by (B) and (C) in FIG. 51 do not appear in the LD modulating signal WSP.

[STEN Timing Pulse Generator]

As described above, this embodiment varies the optical waveform by varying the rise modulating timing of the state signal STEN.

The signal waveforms shown in FIG. 30 corresponding to an LP mode (LPMode), and the signal waveforms shown in FIG. 39 correspond to an EP mode (EPMode). A description will now be given of the generation of the STEN timing pulse signal in each of the LP and EP modes.

As shown in FIG. 51, a pulse signal STENRst is output simultaneously as the set pulse signal Rset as indicated by (X1) in FIG. 51 when Seq.2=EP, during the EP mode. The pulse signal STENRst is output simultaneously as the set pulse signal Fset as indicated by (X2) in FIG. 51 when Seq.1=LP, during the LP mode.

The output timing of the pulse signal STENSet varies depending on the signal EtaDeton, as shown in FIG. 51.

Furthermore, similarly to the sampling timing, it is possible to transfer the commands and the like without additionally providing signals lines therefor.

[State Signal Generator]

The state signal generator 415 shown in FIG. 40 generates the state signal STEN from the STEN timing signal which is the modulating timing signal generated from the driving waveform generating information (timing information) in the timing signal generator 413.

The internal structure of the state signal generator 415 may be similar to that within the portion indicated by the one-dot chain line (I) in FIG. 46. The generation of the state signal STEN does not require a high-speed operation as in the case of the LD modulating signal WSP, and thus, it is unnecessary to utilize alternate operation of the portions indicated by the one-dot chain lines (I) and (II) in FIG. 46.

In addition, the required accuracy of the edge positions of the state signal STEN is not as high compared to that required for the LD modulating signal. For this reason, it is unnecessary to use all 3 bits of the phase selection signal, and it is possible to fixedly use one of the clock signals CK0 through CK7 or to reduce the number of bits of the phase selection signal used.

[State Command Generator]

The state command generator 416 generates the command signal STCMD from the driving waveform generating information (command information).

As described above, the command signal STCMD is input by the command decoder 122 shown in FIG. 29 in response to both rising and falling edges of the state signal STEN. Accordingly, the data changing timing of the command signal STCMD only needs to secure a sufficiently long input time before and after the edges of the state signal STEN.

In this particular case, the reference time and the APC count start time are used as the switching timings, and the supplied command information is successively supplied to the LD driving integrated circuit 3.

[Sample Signal Generator]

The sample signal generator 417 generates the sample signal for the APC control according to the sample and hold system, based on the recording data signal Wdata. Since the light emission waveform of the light source LD is delayed with respect to the recording data signal Wdata by an amount corresponding to the delay in the run length detector 411, the sample signal is generated depending on the light emission waveform.

But as described above, the sample signal is not used if the APC control is carried out in the arrangement shown in FIG. 29.

[Error Detector and Error Processor]

When improper data is stored as the driving waveform generating information due to an accident or, the combination of the driving waveform generating information is improper, the LD modulating signal WSP and the state signal STEN can no longer be used to generate the pulse signals at the desired timings. As a result, a desired optical waveform cannot be obtained in the LD driving integrated circuit 3, and there is a possibility that an erroneous information will be recorded-on the information recording medium.

Moreover, the error may propagate to the next and subsequent recording marks. Further, the light source LD may become damaged or destroyed due to continuous light emission at a high power.

Figure 52:
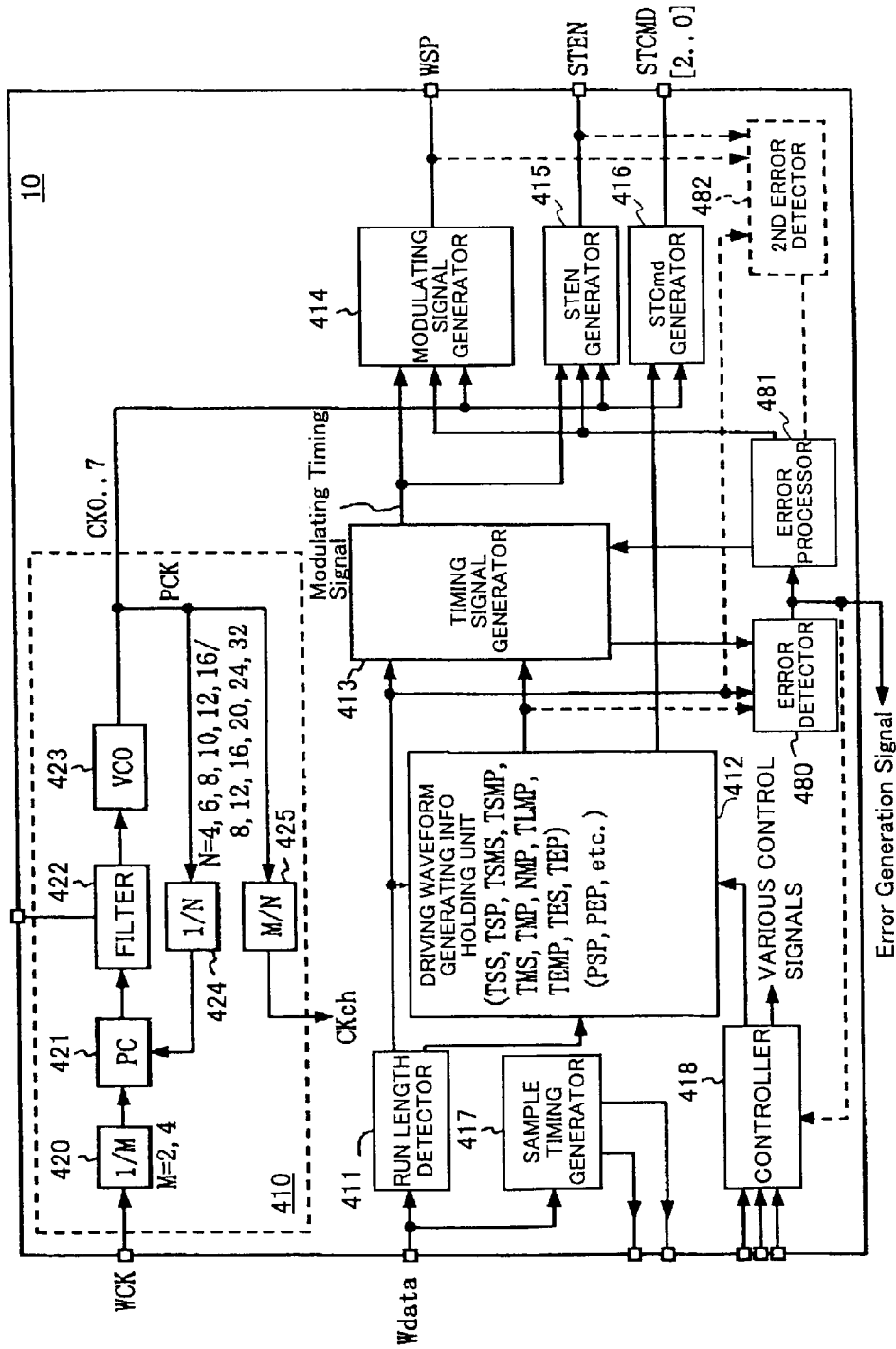
FIG. 52 is a system block diagram showing the structure of the LD modulating signal generator which is additionally provided with an error detector and an error processor.

FIG. 52 is a system block diagram showing the structure of the LD modulating signal generator 10 which is additionally provided with an error detecting means (or section) and an error processing means (or section). In FIG. 52, those parts which are the same as those corresponding parts in FIG. 40 are designated by the same reference numerals, and a description thereof will be omitted.

In FIG. 52, an error detector 480 detects the generation of an error based on the states of the sequencers Seq.1 and Seq.2 in the timing controller 460 within the timing signal generator 413 and the delayed recording data signal dWdata. For example, the error detector 480 outputs an error generation signal which indicates the generation of the error when the delayed recording data signal dWdata becomes a space and the sequencers Seq.1 and Seq.2 do not return to the state Idle. In addition, it is also possible to judge the error by computation based on the driving waveform generating information (timing information). The error detector 480 functions as an error detecting means (or section).

An error processor 481 instructs the return of the sequencer 121 to the initial state and the stopping of the supply of the modulating timing signal to the timing signal generator 413, in response to the error generation signal. In order to generate the LD modulating signal WSP and the state signal STEN so as to reset the sequencer 121 within the LD driving integrated circuit 3, the error processor 481 also supplies an error process pulse (or state correction pulse) to the modulating signal generator 414 and the state signal generator 415, so as to insert the state correction pulse in the modulating signal and the state transition signal and make a state transition to a predetermined state. The error processor 481 functions as an error processing means (or section).

The correction of the driving waveform generating information (timing information) may be instructed by further supplying the error generation signal to the controller 19 shown in FIG. 4 directly or via the controller 418. In this case, it is possible to prevent the error propagation, and to prevent continuous recording of the erroneous data.

A second error detector 482 indicated by phantom lines in FIG. 52 shows another embodiment of the error detection. In this case, a sequencer similar to the sequencer 121 is provided and input with the LD modulating signal WSP and the state signal STEN, so as to realize a pseudo-monitoring of the irradiating level state in the LD driving integrated circuit 3. As a result, it is possible to detect the generation of the error and carry out the error processing similarly to the above described case. In this case, the second error detector 482 functions as an error detecting means (or section).

[Further Embodiment of Command Signal and Command Decoder]

Figure 53:
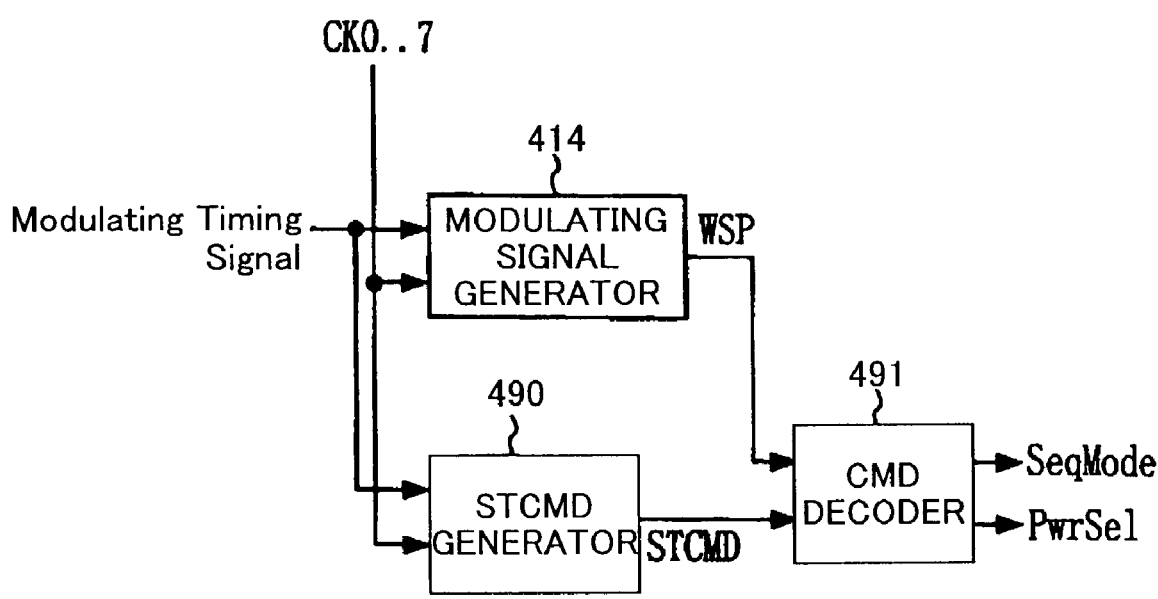
FIG. 53 is a system block diagram showing another embodiment of the structure of a state command generator and a command decoder.
Figure 54:
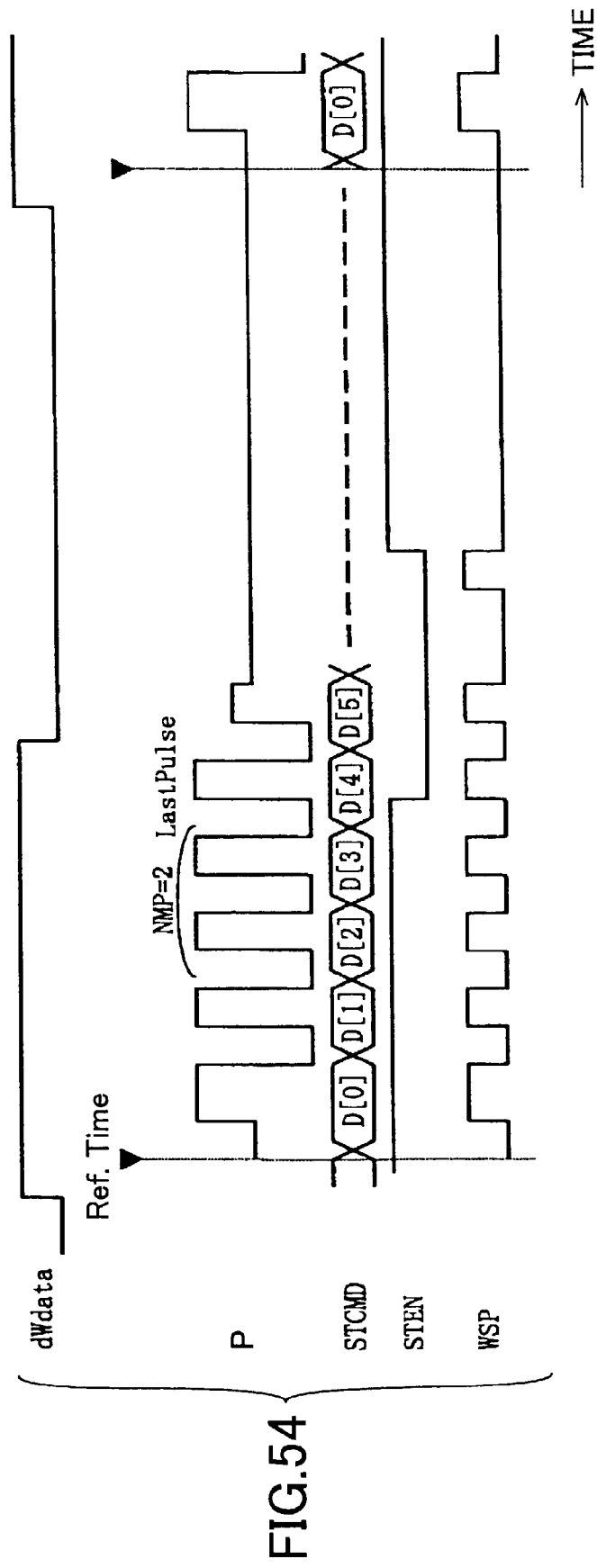
FIG. 54 is a timing chart showing signal waveforms at various parts of the state command generator and the command decoder shown in FIG. 53.

FIG. 53 is a system block diagram showing another embodiment of the structure of the state command generator and the command decoder to replace the state command generator 416 and the command decoder 122. FIG. 54 is a timing chart showing signal waveforms at various parts of the state command generator and the command decoder shown in FIG. 53.

As shown in FIG. 53, a state command generator 490 outputs the command signal STCMD in synchronism with the LD modulating signal WSP, based on the modulating timing signal. A command decoder 491 converts the LD modulating signal WSP and the command signal STCMD into the mode control signal SeqMode which specifies the irradiating level and the irradiating mode of the light source LD.

According to this other embodiment of the structure, it is possible to reduce the number of signal lines of the command signal STCMD.

Further, the present invention is not limited to these embodiments, but various variations and modifications may be made without departing from the scope of the present invention.

What is claimed is:

1. A light source driving unit comprising:
   a modulating signal generating section generating a plurality of modulating signals based on driving waveform generating information of a light source;
   a current source selecting section selecting one or a plurality of currents output from a plurality of current sources based on the plurality of modulating signals generated by said modulating signal generating section;
   a light source driving section generating a current having multi-levels based on the one or plurality of currents selected by said current source selecting section, and supplying the generated current to the light source to drive the light source so that light in multi-levels is generated from the light source; and a cancelling section adding a signal error amount which cancels differences in amounts of signal delays generated between said modulating signal generating section and said light source driving section at a stage prior to said current source selecting section.

2. A light source driving unit comprising:

a driving waveform generating information holding section holding driving waveform generating information based on a driving waveform of a light source;

a modulating signal generating section generating a plurality of modulating signals for selecting one or a plurality of currents output from a plurality of current sources based on the driving waveform generating information held in said driving waveform generating information holding section;

a light source driving section generating a current having multi-levels based on the one or plurality of currents selected by the plurality of modulating signals generated by said modulating signal generating section, and supplying the generated current to the light source to drive the light source so that light in multi-levels is generated from the light source; and a delay adjusting section delaying each of the plurality of modulating signals generated by said modulating signal generating section by a predetermined amount, so as not to delay a selecting timing of the one or plurality of currents by the plurality of modulating signals generated by said modulating signal generating section.

3. The light source driving unit as claimed in claim 1, 2, wherein:

said light source driving section is provided on a first integrated circuit;

said driving waveform generating information holding section and said modulating signal generating section are provided on a second integrated circuit; and said first and second integrated circuits are mounted within a single package.

4. An optical storage apparatus comprising:

a light source irradiating light on an information recording medium to record information on and/or reproduce information from the information recording medium; and a light source driving unit which drives the light source, said light source driving unit comprising:

a modulating signal generating section generating a plurality of modulating signals based on driving waveform generating information of the light source;

a current source selecting section selecting one or a plurality of currents output from a plurality of current sources based on the plurality of modulating signals generated by said modulating signal generating section;

a light source driving section generating a current having multi-levels based on the one or plurality of currents selected by said current source selecting section, and supplying the generated current to the light source to drive the light source so that light in multi-levels is generated from the light source; and a cancelling section adding a signal error amount which cancels differences in amounts of signal delays generated between said modulating signal generating section and said light source driving section at a stage prior to said current source selecting section.

5. An optical storage apparatus comprising:

a light source irradiating light on an information recording medium to record information on and/or reproduce information from the information recording medium; and a light source driving unit which drives the light source, said light source driving unit comprising:

a driving waveform generating information holding section holding driving waveform generating information based on a driving waveform of the light source;

a modulating signal generating section generating a plurality of modulating signals for selecting one or a plurality of currents output from a plurality of current sources based on the driving waveform generating information held in said driving waveform generating information holding section;

a light source driving section generating a current having multi-levels based on the one or plurality of currents selected by the plurality of modulating signals generated by said modulating signal generating section, and supplying the generated current to the light source to drive the light source so that light in multi-levels is generated from the light source; and a delay adjusting section delaying each of the plurality of modulating signals generated by said modulating signal generating section by a predetermined amount, so as not to delay a selecting timing of the one or plurality of currents by the plurality of modulating signals generated by said modulating signal generating section.

6. The optical storage apparatus as claimed in claim 4 to 5, further comprising:

an optical pickup having the light source mounted thereon, said light source driving section is provided on a first integrated circuit, said driving waveform generating information holding section and said modulating signal generating section are provided on a second integrated circuit, and said first and second integrated circuits are mounted on said optical pickup.

* * * * *